US012771288B2

(12) United States Patent
Lee et al.

(10) Patent No.: US 12,771,288 B2
(45) Date of Patent: Oct. 20, 2026

(54) SOLAR PANEL STRUCTURE AND SOLAR PANEL ASSEMBLY COMPRISING SAME

(71) Applicant: HANVIXOLAR INC., Gunpo-si (KR)

(72) Inventors: Joonsung Lee, Gunpo-si (KR); Jin Ho Park, Gunpo-si (KR); Young Min Park, Gunpo-si (KR)

(73) Assignee: HANVIXOLAR INC., Gunpo-si (KR)

( * ) Notice: Subject to any disclaimer, the term of this patent is extended or adjusted under 35 U.S.C. 154(b) by 149 days.

(21) Appl. No.: 18/839,939

(22) PCT Filed: May 10, 2023

(86) PCT No.: PCT/KR2023/006364

§ 371 (c)(1),
(2) Date: Aug. 20, 2024

(87) PCT Pub. No.: WO2023/219421

PCT Pub. Date: Nov. 16, 2023

(65) Prior Publication Data

US 2025/0175120 A1 May 29, 2025

(30) Foreign Application Priority Data

| | | |
|---|---|---|
| May 12, 2022 | (KR) | 10-2022-0058311 |
| Sep. 15, 2022 | (KR) | 10-2022-0116484 |
| Oct. 11, 2022 | (KR) | 10-2022-0129389 |
| Feb. 2, 2023 | (KR) | 10-2023-0014189 |
| May 8, 2023 | (KR) | 10-2023-0059231 |

(51) Int. Cl.

| | |
|---|---|
| ***H02S 30/10*** | (2014.01) |
| ***H02S 40/34*** | (2014.01) |
| ***H02S 40/36*** | (2014.01) |

(52) U.S. Cl.
CPC .............. *H02S 30/10* (2014.12); *H02S 40/34* (2014.12); *H02S 40/36* (2014.12)

(58) Field of Classification Search
None
See application file for complete search history.

(56) References Cited

U.S. PATENT DOCUMENTS

| | | | | |
|---|---|---|---|---|
| 2014/0090694 A1 | 4/2014 | Bolanos | | |
| 2015/0243822 A1* | 8/2015 | Karam | H02S 20/32 | 136/246 |
| 2017/0331425 A1 | 11/2017 | Allen | | |

FOREIGN PATENT DOCUMENTS

| | | |
|---|---|---|
| JP | 2017-034850 A | 2/2017 |
| KR | 10-1700955 B1 | 1/2017 |
| KR | 10-1952824 B1 | 2/2019 |
| KR | 10-2021-0109938 A | 9/2021 |

* cited by examiner

*Primary Examiner* — Dustin Q Dam
(74) *Attorney, Agent, or Firm* — Bridgeway IP Law Group, PLLC; Jihun Kim

(57) ABSTRACT

An embodiment of a solar panel structure includes a solar panel configured to receive sunlight to generate energy, a panel frame configured to cover a portion of the solar panel other than a light-receiving surface of the solar panel, the light-receiving surface being configured to receive sunlight, a first magnet located in a corner portion of the panel frame, a second magnet located in a corner portion of the panel frame, but located at a position higher than a position of the first magnet, and wiring configured to connect the first magnet and the second magnet to a positive electrode and a negative electrode disposed on an electrode surface of the solar panel, respectively.

14 Claims, 49 Drawing Sheets

SOLAR PANEL STRUCTURE AND SOLAR PANEL ASSEMBLY COMPRISING SAME

TECHNICAL FIELD

The present disclosure relates to a solar panel structure and a solar panel assembly including the same, and more particularly, to a solar panel structure which allows simple structural and electrical connections and variable installations, and a solar power generation system having a solar panel structure including the solar panel structure.

BACKGROUND ART

As reserves of existing energy resources such as oil or coal are decreasing and environmental pollution caused by existing energy resources becomes serious, an interest in alternative energy sources to replace the existing energy resources is increasing. Among the alternative energy sources, solar cells are eco-friendly energy devices that utilize infinitely provided sunlight and do not cause environmental pollution, and research on relevant technologies is being actively conducted.

Solar cells are electrical devices configured to convert solar energy into electricity, and currently, a crystalline silicon-based material is mainly used.

Recently, not only various technologies for increasing efficiency of solar cells, but also technologies utilizing solar cells, i.e., technologies relevant to various devices and services using solar panels are being variously proposed. As examples, technologies of connecting a plurality of solar cells with each other to implement solar panel products for charging smartphones, solar panel products for charging auxiliary batteries, foldable-type solar panels, flat-type solar panels, etc. are being introduced.

According to Korean Patent Publication No. 10-1952824, a mono-facial light-receiving solar cell applicable to small-scale power-consuming devices such as a sign device is disclosed. According to this technology, a solar panel structure configured to include a structure providing a mounting space of a solar cell panel and the solar cell panel mounted in the structure is provided. It is disclosed that this technology allows to perform stable solar power generation regardless of a position of the sun, and simultaneously, improve convenience of installation and maintenance. According to Korean Patent Publication No. 10-1700955, a hand-held type solar cell panel held by a person and capable of charging various portable devices has been proposed. The hand-held type solar cell panel includes a printed circuit board on which a circuit pattern is provided, and a substrate for a solar cell panel including a first plated layer having a shape of a discontinuous strip disposed along an upper surface, a lower surface, and side surfaces of edges of the printed circuit board.

Such general solar power generation devices (solar charging devices, solar panels, etc.) may help to improve convenience to a certain degree, but may still have various problems.

In detail, since general solar power generation devices generate electricity by receiving sunlight, a power generation output is determined in proportion to conversion efficiency and a size of a panel capable of absorbing sunlight. However, since light-receiving areas are determined constantly in the general solar power generation devices, an amount of power generation is fixed. Thus, an amount of power generation cannot be changed or is structurally very difficult to change.

In addition, due to a standardized shape of a solar panel, an area receiving sunlight cannot be increased, and when there is an obstacle, the solar panel cannot be installed, and installation can be performed only when a space having a certain size is secured. Therefore, efficient use of a space cannot be performed or is very difficult to perform.

In addition, it is also difficult to cope with a change in a demand for power as needed. That is, since it is difficult to increase or decrease an amount of power generated, a solar panel needs to be replaced when power is to be generated in correspondence with an amount other than a determined power generation amount. This eventually causes an increase in waste of resources such as generation of waste panels, and an increase in costs of management such as maintenance, etc.

Therefore, to obviate those problems, there is a need to develop a new concept of a solar panel structure which allows simple mechanical and electrical connections and variable installations as needed.

DISCLOSURE OF INVENTION

Technical Problem

Therefore, the present disclosure has been made in view of the above problems, and it is an object of the present disclosure to provide a solar panel structure that allows simple structural and electrical connections and various installations as needed.

The present disclosure may be embodied in many different forms and should not be construed as being limited to the embodiments set forth herein. Additional aspects will be set forth in part in the description which follows and, in part, will be apparent from the description, or may be learned by practice of the presented embodiments.

Technical Solution

To accomplish the above object, according to one aspect of the present invention, there is provided a solar panel structure including: a solar panel configured to receive sunlight to generate energy; a panel frame configured to cover a portion of the solar panel other than a light-receiving surface of the solar panel, the light-receiving surface being configured to receive sunlight; a first magnet located in a corner portion of the panel frame; a second magnet located in a corner portion of the panel frame, but located at a position higher than a position of the first magnet; wiring configured to connect the first magnet and the second magnet to a positive electrode and a negative electrode disposed on an electrode surface of the solar panel, respectively; a first metal plate positioned at a same height as the first magnet and located in a corner portion of the panel frame, the corner portion corresponding to the corner portion in which the second magnet is located; and a second metal plate positioned at a same height as the second magnet and located in a corner portion of the panel frame, the corner portion corresponding to the corner portion in which the first magnet is located.

In an embodiment of the present disclosure, the first magnet and the second magnet may be located in the corner portions of the panel frame, respectively, to be arranged in different corner portions that do not cross each other.

In an embodiment of the present disclosure, the wiring may include first wiring for connecting the first magnet to the positive electrode or the negative electrode disposed on the electrode surface of the solar panel, and second wiring for connecting the second magnet to the positive electrode or the negative electrode disposed on the electrode surface of the solar panel, the solar panel structure may further include an insulating material disposed between the first magnet and the first wiring and between the second magnet and the second wiring to insulate between the first wiring and the second wiring, and the insulating material may include first insertion pockets in a corner portion at a first height and second insertion pockets in a corner portion at a second height greater than the first height, wherein the first magnet and the first metal plate are capable of being partially inserted into the first insertion pockets and the second magnet and the second metal plate are capable of being arranged in the second insertion pockets.

In an embodiment of the present disclosure, the panel frame may include first corner pockets in corner portions at a first height and second corner pockets in corner portions at a second height greater than the first height, wherein the first magnet and the first metal plate are capable of being arranged in the first corner pockets and the second magnet and the second metal plate are capable of being arranged in the second corner pockets, the panel frame may be configured to have a rectangular shape, the first magnet may be arranged in first corner pockets in a diagonal direction, among the first corner pockets, the first metal plate may be arranged in first corner pockets in a diagonal direction among first corner pockets in which the first magnet is not arranged, the second magnet may be arranged in second corner pockets in a diagonal direction among the second corner pockets, and the second metal plate may be arranged in second corner pockets in a diagonal direction, among second corner pockets in which the second magnet is not arranged.

To accomplish the above object, according to another aspect of the present invention, there is provided a solar panel assembly including: a solar panel including a plurality of solar cell pieces; a panel frame configured to cover a portion of the solar panel other than a light-receiving surface of the solar panel, the light-receiving surface being configured to receive sunlight; magnets located in an edge portion of the solar panel to be combined with another solar panel; a plurality of electrodes arranged in an edge portion of an electrode surface of the solar panel and located between the solar panel and the magnets; and conductor pads arranged in the edge portion of the solar panel to be spaced apart from each other by a certain distance and being in contact with the plurality of electrodes.

In an embodiment of the present disclosure, pattern grooves may be disposed in a rear surface of the panel frame, the rear surface covering the electrode surface of the solar panel, and the solar panel structure may further include an assembly block capable of being separated from or coupled into the pattern grooves.

In an embodiment of the present disclosure, the assembly block may include a plurality of protruding convex portions disposed on one surface, the assembly block may connect different solar panel structures with each other by inserting and coupling some of the plurality of protruding convex portions into concave grooves in the panel frame, and inserting and coupling others of the plurality of protruding convex portions into pattern grooves in a rear surface of a panel frame of another solar panel structure, and the pattern grooves may be disposed at a predetermined interval in an area of the rear surface of the panel frame other than an area in which the plurality of electrodes are disposed, among a whole area of the rear surface of the panel frame.

In an embodiment of the present disclosure, the plurality of electrodes may include first electrodes and second electrodes having different polarities, arranged alternately with each other, and disposed in a same corner portion of the solar panel, and the magnets may include a first magnet and a second magnet provided on one surfaces of the first electrodes in contact with a conductor pad disposed in the same corner portion of the solar panel, respectively, to be thereby arranged in the same corner portion of the solar panel.

In an embodiment of the present disclosure, a plurality of exposure grooves exposing the plurality of electrodes arranged in the edge portion of the solar panel to outside may be included in a side surface of the solar panel.

In an embodiment of the present disclosure, magnet pockets disposed in a side surface to have the magnets arranged therein and exposure grooves disposed in a side surface to be open so that the magnets are exposed to outside and combined with another solar panel may be included, and the magnet pockets may be configured to have a circular shape in an inward direction of the panel frame to correspond to a shape of the magnets and a flat shape with respect to a side surface of the panel frame, and inner spaces of the magnet pockets in which the magnets are arranged may be configured to have a larger size than a size of the magnets to cause positions of the magnets to move depending on whether the magnets are combined with another solar panel.

In an embodiment of the present disclosure, the magnets arranged in the magnetic pocket may be each configured to: when combined with the another solar panel, move within the magnet pockets in an outward direction due to an attractive force generated with a magnet in the another solar panel; and when the combination with the another solar panel is released, move within the magnet pockets in an inward direction due to an attractive force generated with a magnet within another magnet pocket disposed on one side.

In an embodiment of the present disclosure, the conductor pads may be nickel strips arranged between the electrode surface of the solar panel and the panel frame to connect the plurality of electrodes to the magnets, the magnets, when combined with another solar panel, may have one portion protruding toward outside of the panel frame, and when the combination with the another solar panel is released, move in an inward direction of the panel frame, and adjacent magnets arranged in the edge portion of the panel frame may be arranged alternately so that respective contact surfaces in contact with the conductor pads have different polarities.

In an embodiment of the present disclosure, the plurality of electrodes may include first electrodes and second electrodes having different polarities, and at least one first electrode and at least one second electrode may be arranged on each edge portion of the electrode surface of the solar panel.

In an embodiment of the present disclosure, the first electrodes may be arranged at corners of the electrode surface of the solar panel, respectively, and the second electrodes may be arranged between the first electrodes arranged at the corners.

In an embodiment of the present disclosure, the conductor pads may be disposed in positions corresponding to positions of the first electrodes arranged on the electrode surface of the solar panel and positions of the second electrodes, respectively, to be spaced apart from each other such that conductor pads in contact with the first electrodes are separated from conductor pads in contact with the second electrodes.

In an embodiment of the present disclosure, the solar panel assembly may further include a controller coupled to one side of the panel frame to supply electric energy generated from the solar panel to an external charging device, a controller magnet configured to perform electrical coupling and structural coupling to magnets arranged on a side surface of the panel frame may be arranged on one side of the controller, and a connection terminal configured to supply electric energy to the external charging device may be disposed on another side of the controller.

In an embodiment of the present disclosure, the controller may further include a display unit disposed on an upper surface and configured to display a voltage measurement value or a power measurement value with respect to electric energy transmitted from the solar panel.

In an embodiment of the present disclosure, the controller may be a non-fixed type controller positioned selectively on one side of at least one solar panel structure in a solar panel assembly in which a plurality of solar panel structure are arranged by being connected in parallel to each other, to be capable of receiving electric energy, and a multi-connected type controller disposed one side of the solar panel assembly together with another controller, to be capable of receiving electric energy.

Advantageous Effects

According to an embodiment of the present disclosure, a solar panel structure may be used to easily adjust a light-receiving area according to a required amount of power generation. In addition, when an obstacle is present or according to various needs (e.g., for an aesthetic reason or for implementation of various functions using non-power generation units), panels may be combined with each other in various forms, thereby greatly improving space utilization. In addition, since a combination between panels is simple and stable fixing may be performed, convenience of installation and maintenance may be greatly improved.

Effects of the present disclosure are not limited to the effects described above, and should be understood to include all effects that may be inferred from configurations described in the description or recited in claims of the present disclosure.

BEST MODE FOR CARRYING OUT THE INVENTION

Hereinafter, the present disclosure will be described in detail with reference to the accompanying drawings. The present disclosure may, however, be implemented in many different forms and should not be construed as being limited to the embodiments set forth herein. In the description of the present disclosure, certain detailed explanations are omitted when it is deemed that they may unnecessarily obscure the essence of the present disclosure. Like numbers refer to like elements throughout the description of the figures.

It will be understood that when an element is referred to as being "connected to (combined with, in contact with, or coupled to)" another element, it may be "directly connected" to the other element, or "indirectly connected to" the other element with intervening elements therebetween. In addition, it will be further understood that the terms "comprises," "comprising," "includes," and/or "including," when used herein, specify the presence of components, but do not preclude the presence or addition of one or more other components, unless otherwise specified.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, an embodiment of the present disclosure will be described in detail with reference to the accompanying drawings.

Figure 1:
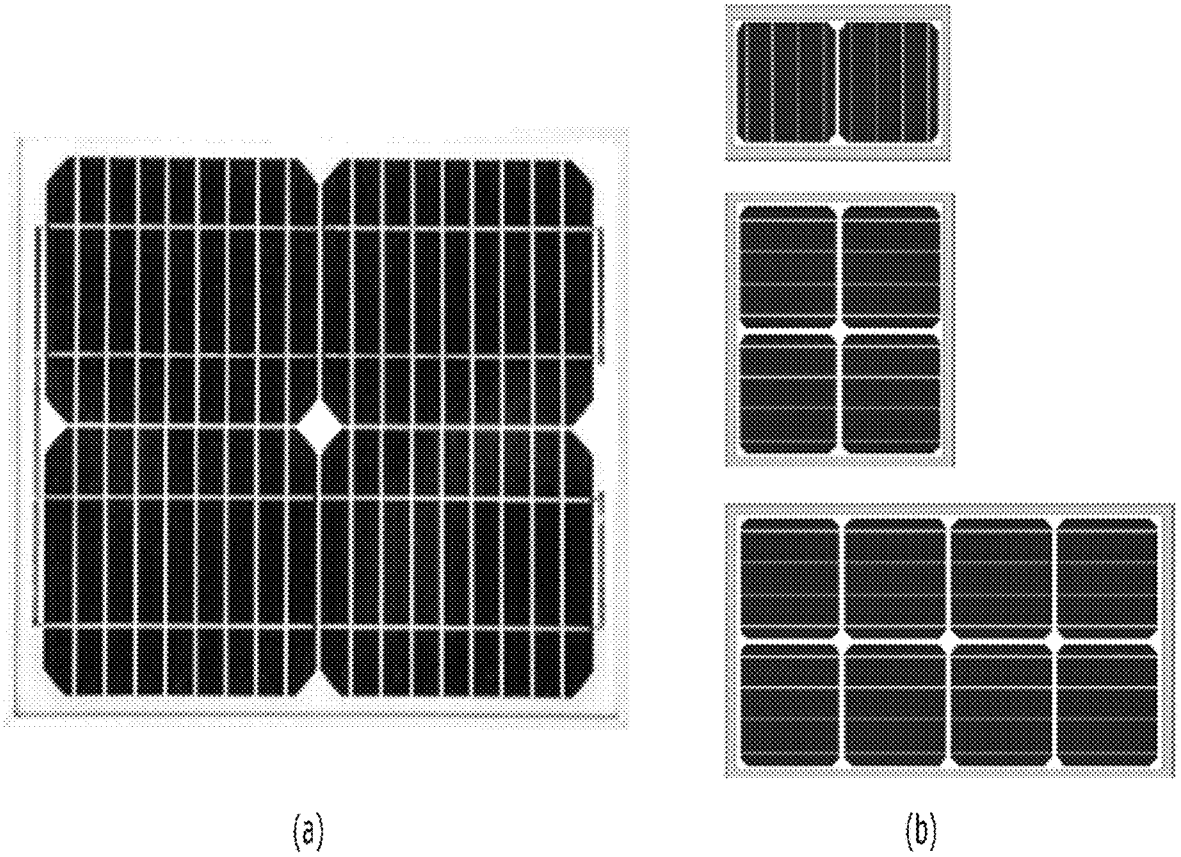
FIG. 1 is a diagram illustrating a shape of a general solar panel.

FIG. 1 is a diagram illustrating a shape of a general solar panel. FIGS. 2 to 4 are schematic configuration diagrams of a solar power generation structure according to an embodiment of the present disclosure.

As illustrated in FIG. 1A, general solar panels are provided to have a flat plate form having approximately a square or rectangular shape. The solar panels constitute a panel module through various combinations, and may be provided, for example, in a matrix form as shown in FIG. 1B.

Figure 2A:
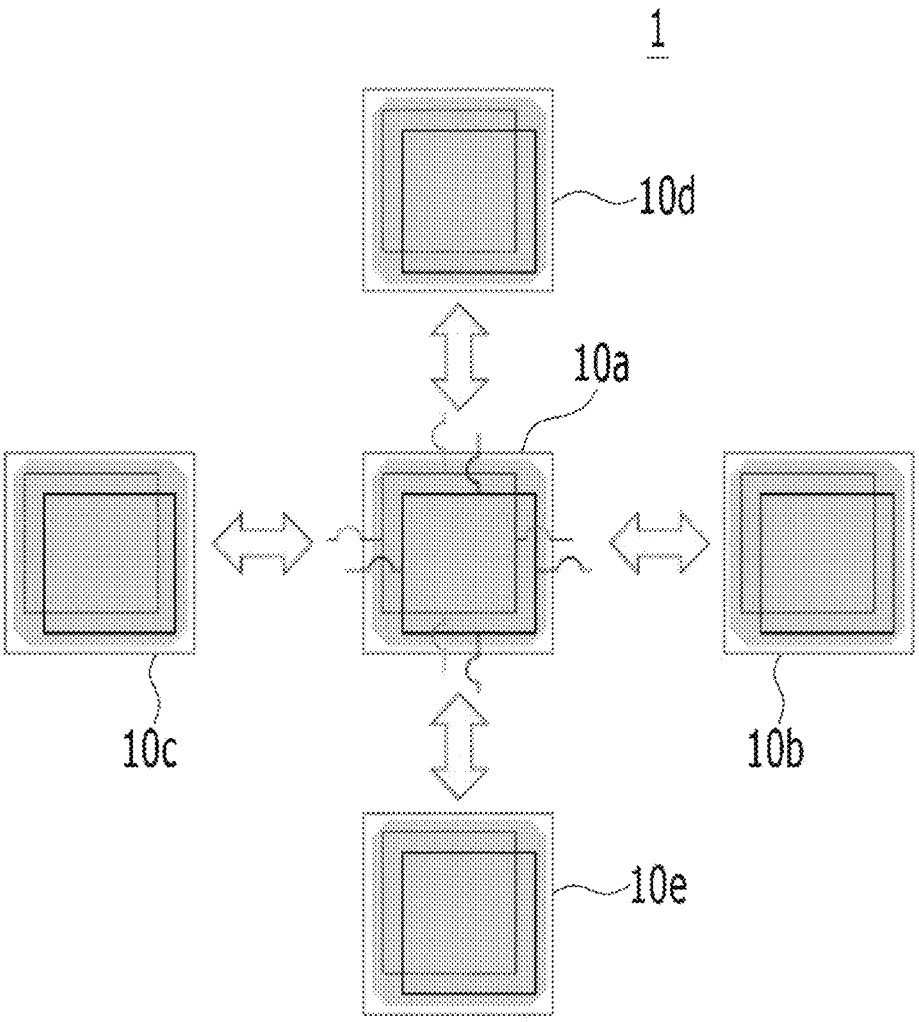
FIGS. 2A to 4D are schematic configuration diagrams of a solar power generation structure according to an embodiment of the present disclosure.
Figure 2B:
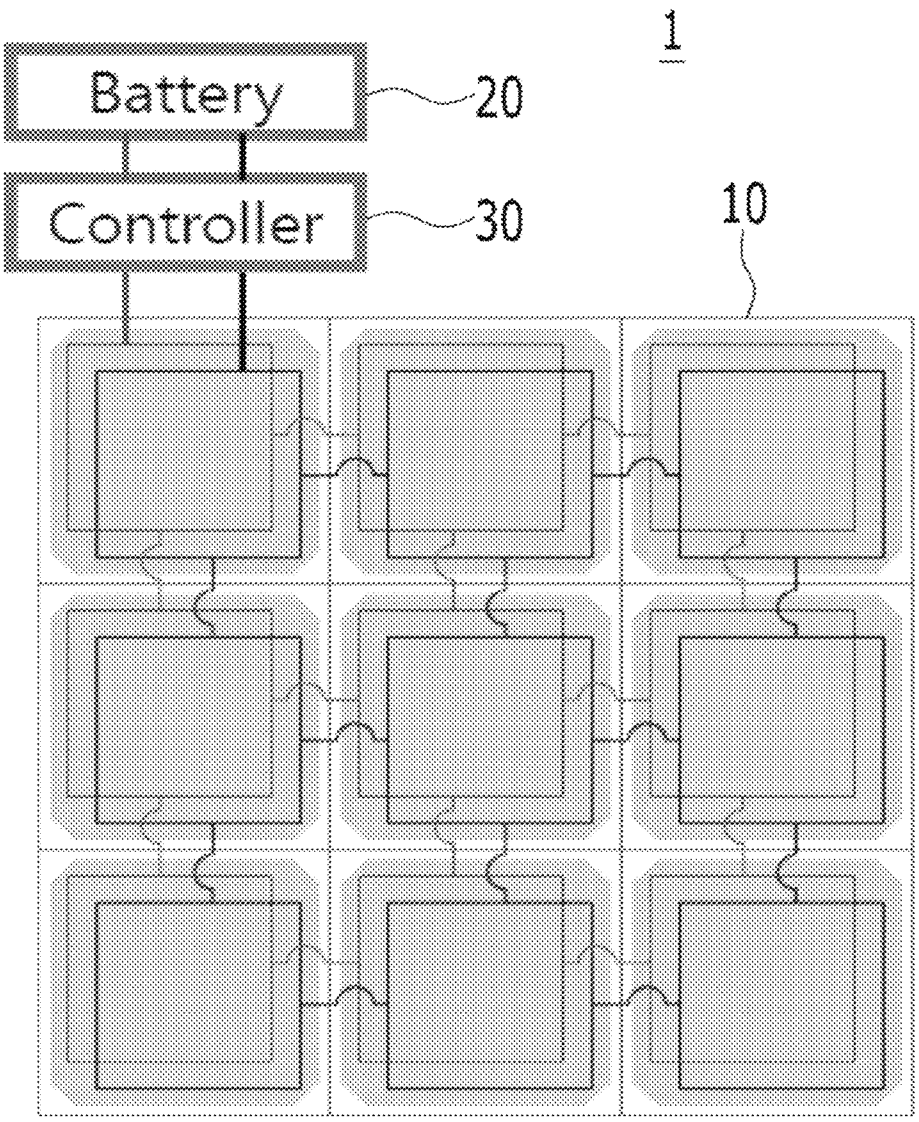
Figure 3A:
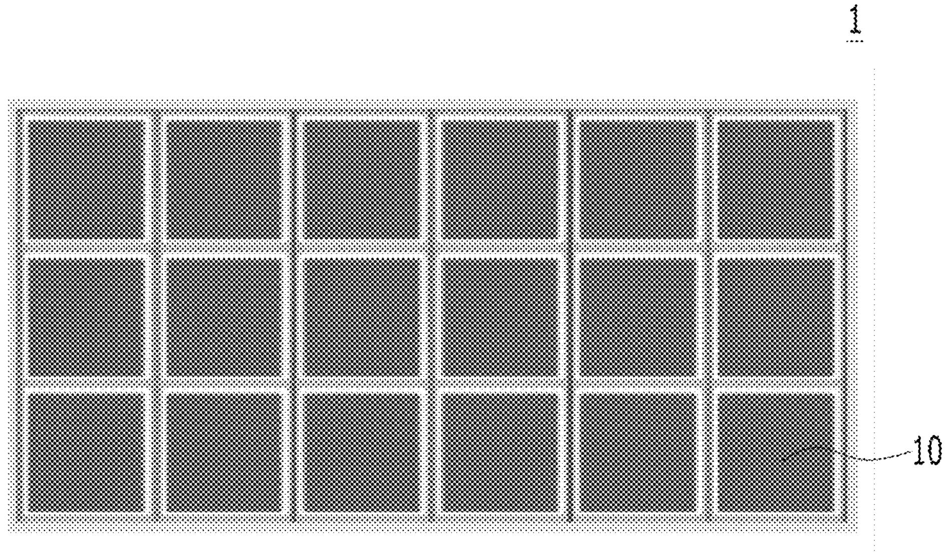

FIG. 2 is a schematic configuration diagram illustrating a concept of a solar power generation structure according to an embodiment of the present disclosure. As shown in FIG. 2A, a solar panel assembly 1 may include a plurality of panel structures 10 combined with each other. Additionally, as shown in FIG. 2B, in addition to the combination of the panel structures 10, a power supply unit 20 and a controller 30 may be further included.

The power supply unit 20 may be, for example, a secondary battery, and there is no particular limit in a type and a form of the power supply unit 20. The controller 30 is a device configured to collect direct current electricity generated by solar power to connect to an external output terminal at a constant voltage. For example, the junction box 14 may be a controller.

In addition, for example, as shown in FIG. 2A, a second side panel structure 10*b*, a third side panel structure 10*c*, a fourth side panel structure 10*d*, and a fifth side panel structure 10*e* may be combined with side surfaces of the first side panel structure 10*a*, respectively. Forms and functions of the first to fifth panel structures 10*a*, 10*b*, 10*c*, 10*d*, and 10*e* are identical to each other and methods of combining between the first to fifth panel structures 10*a*, 10*b*, 10*c*, 10*d*, and 10*e* are also identical to each other. Thus, hereinafter, unless otherwise specified, only forms, functions, combination relationships, etc. of the first side panel structure 10*a* and the second side panel structure 10*b* will be described.

As shown in FIG. 3, the solar panel assembly 1 according to an embodiment of the present disclosure may be implemented by assembling the plurality of panel structures 10 into various forms as needed. General solar panels could not be installed in an area smaller than a panel. In addition, when an obstacle was present, there was a restriction in installation, and in severe cases, installation could not be performed.

However, the solar panel assembly 1 according to an embodiment of the present disclosure may be used by combining the plurality of panel structures 10 with each other in correspondence with a desired form and number, thus allowing efficient use of an area. Accordingly, a light receiving area may be maximized or optimized.

Figure 3B:
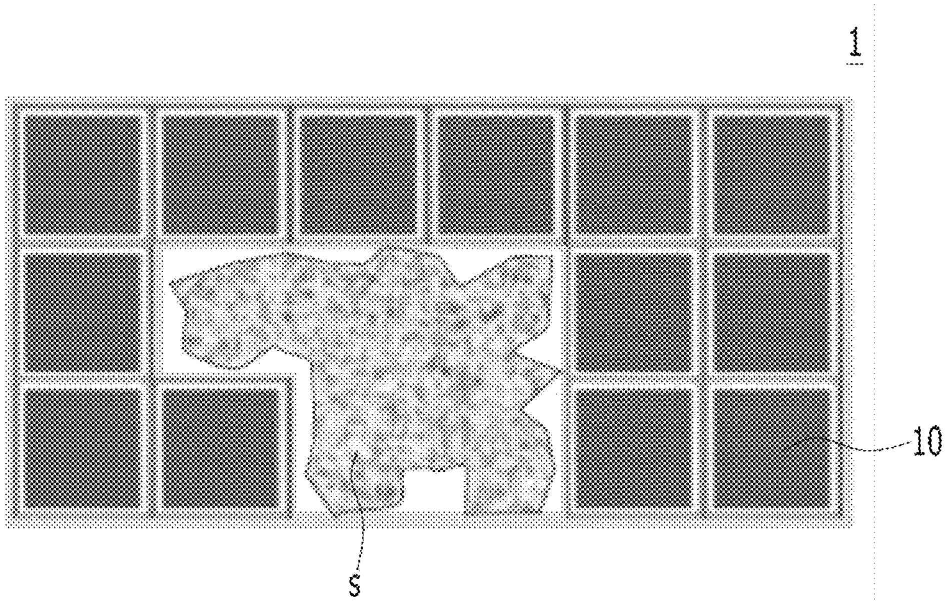
Figure 3C:
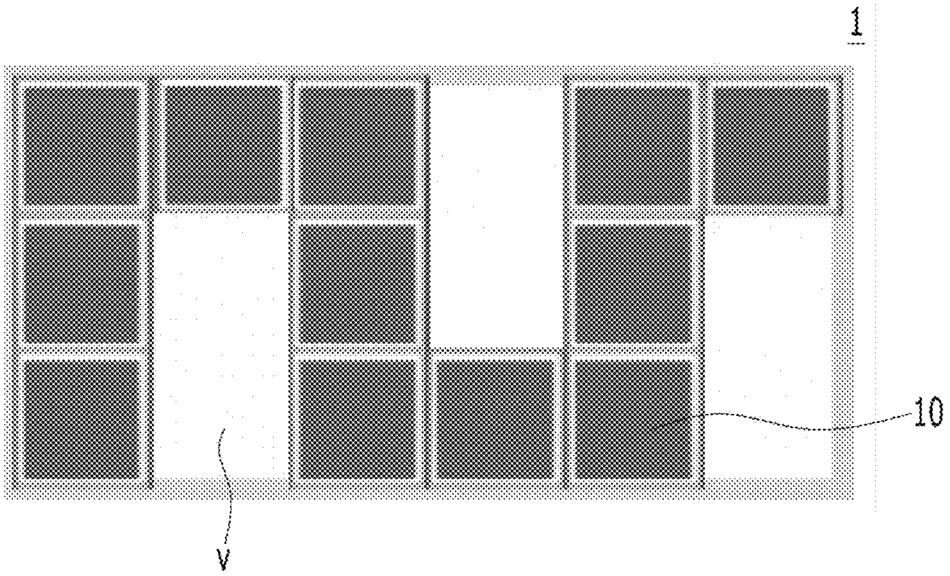
Figure 4A:
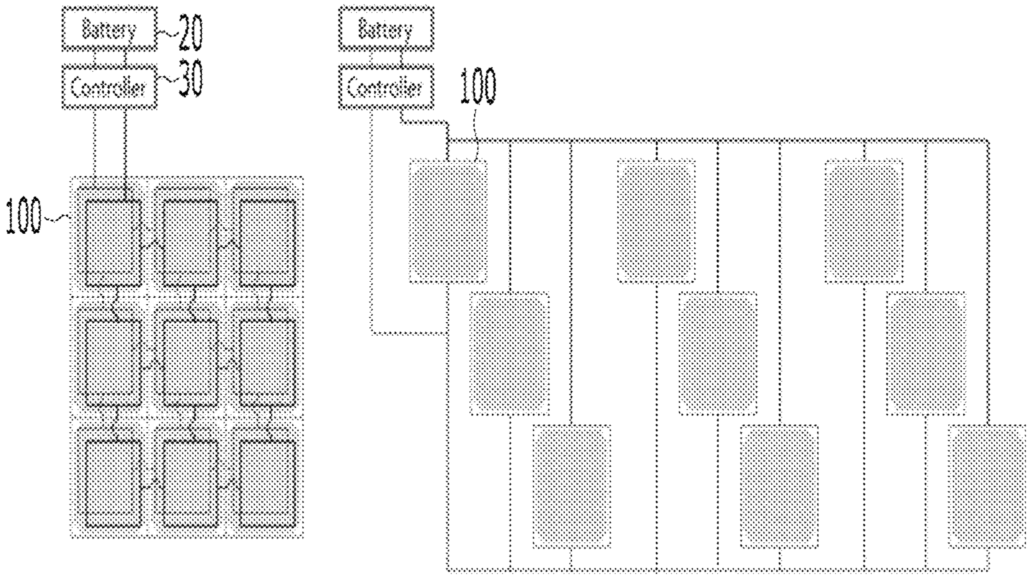
Figure 4B:
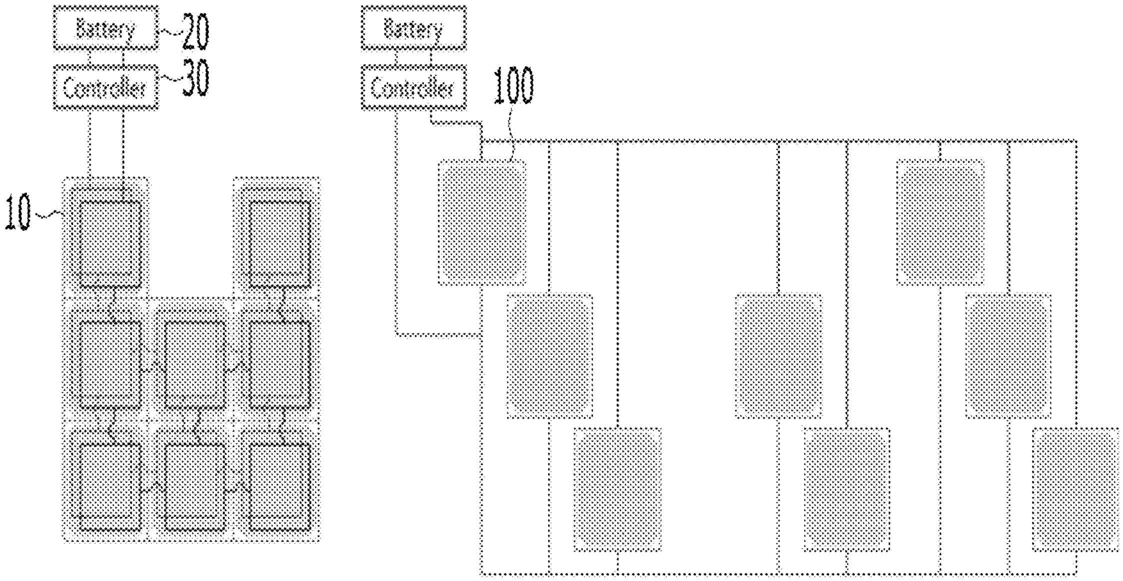
Figure 4C:
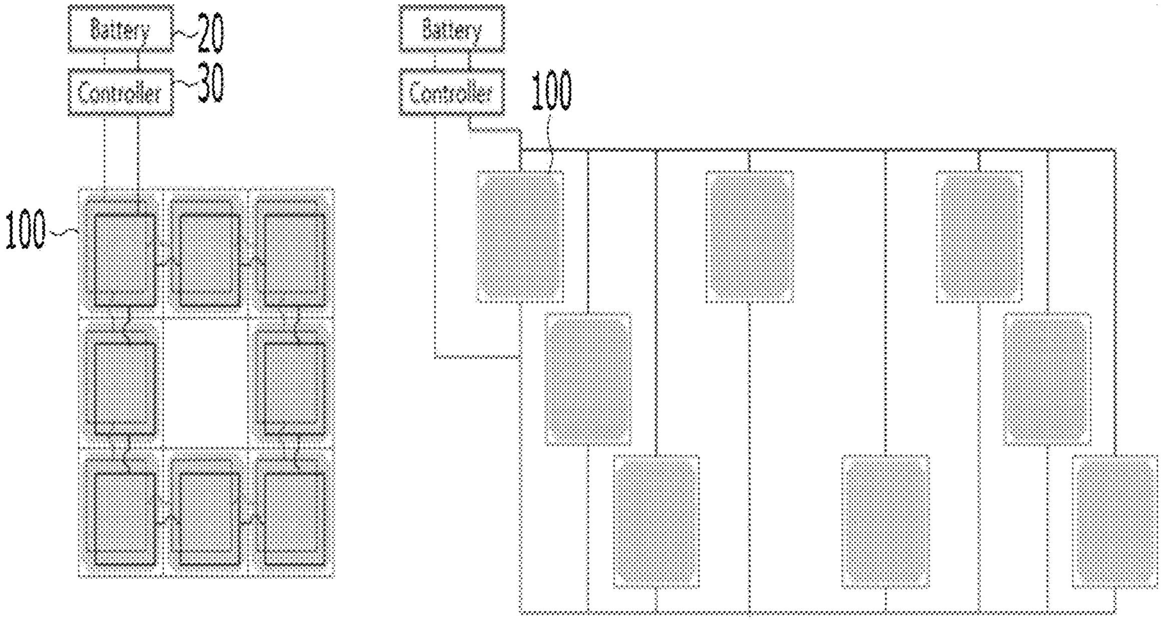
Figure 4D:
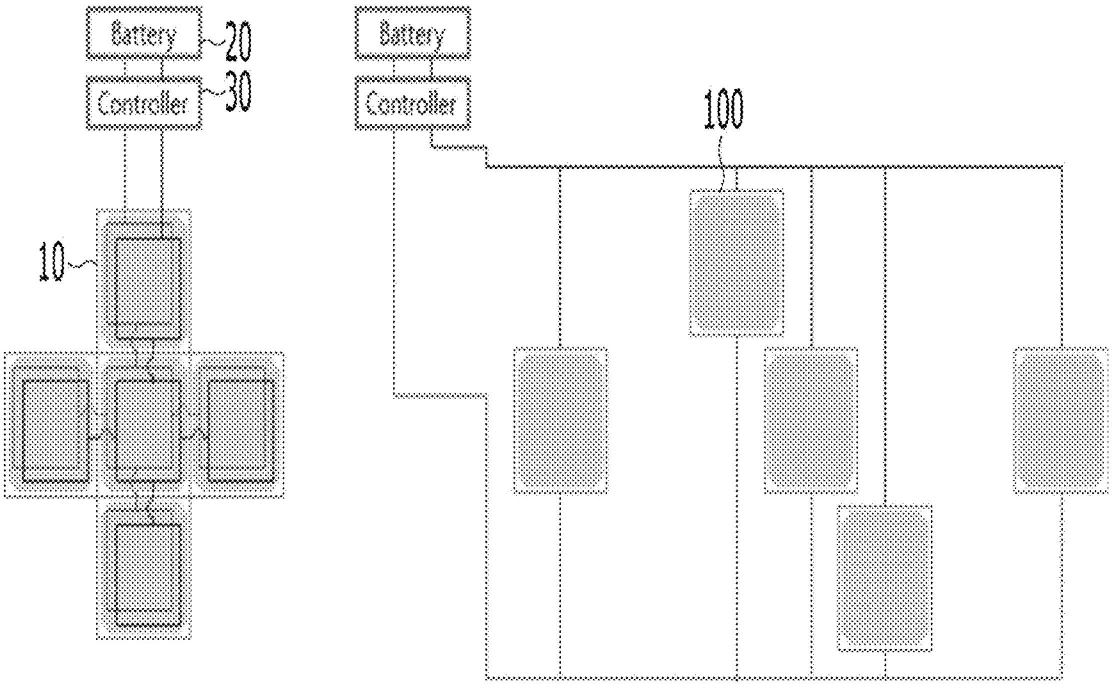

In addition, as shown in FIG. 3B, when an obstacle (or obstacles) is located in a space in which installation is to performed, the installation may be performed by avoiding the obstacle (or the obstacles) through assembling of the panel structures 10. In addition, as shown in FIG. 3B, the panel structures 10 may be assembled to have a hollow area v to obtain an aesthetic design of a shape. A sign board, an information board, a transparent panel, a mirror, etc. may be installed in the hollow area v. That is, the solar panel assembly 1 according to an embodiment of the present disclosure may be a power generation structure including the panel structures 10, and various functions may be implemented by installing a non-power generation structure together with the power generation structure in the hollow region v.

FIG. 4 illustrates a form of combination between various panel structures 10 in the solar panel assembly 1 according to an embodiment of the present disclosure. General photovoltaic modules have a serial connection structure. However, the solar panel assembly 1 according to an embodiment of the present disclosure may have a structure in which the panel structures 10 are electrically connected in parallel to each other.

Hereinafter, a structure of a panel structure capable of constituting a solar panel assembly through connection between a plurality of panel structures is described in detail.

Hereinafter, a solar panel structure according to the first embodiment is described with reference to FIGS. 5 to 11. A solar panel structure according to the second embodiment is described with reference to FIGS. 12 to 18. A solar panel structure according to the third embodiment is described with reference to FIGS. 19 to 34. A solar controller according to an embodiment of the present disclosure is described with reference to FIGS. 35 to 40.

Figure 5:
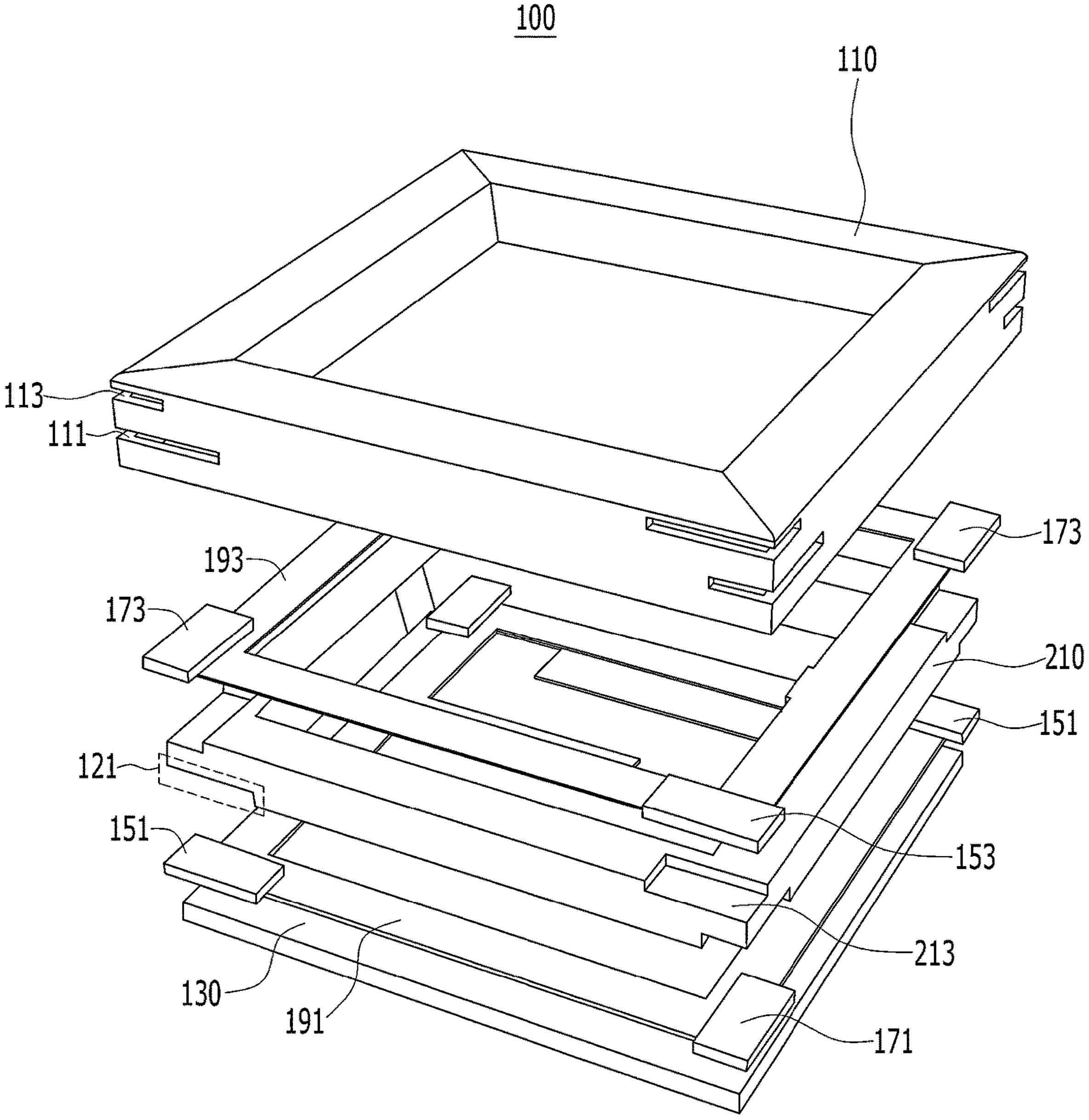
FIGS. 5 to 11 are diagrams related to a solar panel structure according to the first embodiment.
Figure 6:
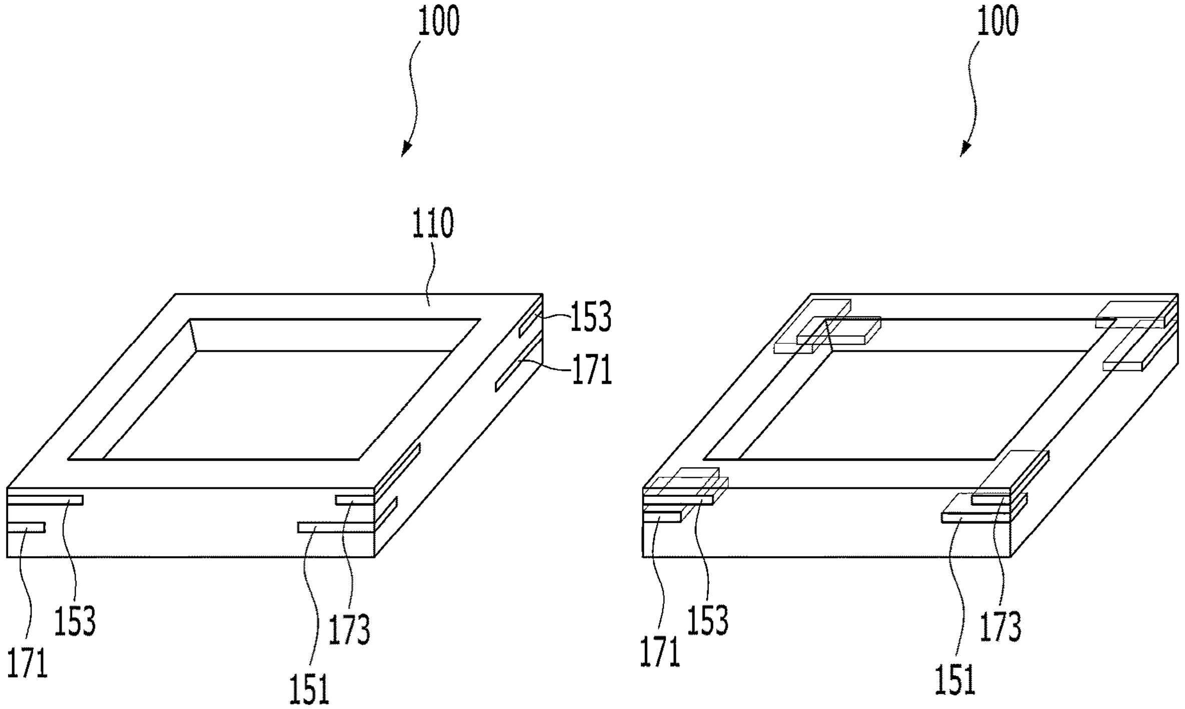

FIG. 5 is an exploded view for explaining a structure of a solar panel structure according to an embodiment of the present disclosure. FIG. 6 is a diagram illustrating the solar panel structure according to an embodiment of the present disclosure.

Referring to FIG. 5, a solar panel structure 100 according to an embodiment of the present disclosure may be configured to include a panel frame 110, a solar panel 130, a magnet 150, a metal plate 170, wiring 190, and an insulating material 210.

The panel frame 110 is a frame which covers the solar panel 130 configured to receive sunlight, and other elements such as the magnet 150, the metal plate 170, the wiring 190, and the insulating material 210.

The solar panel 130 is provided below or above the panel frame 110 and functions to generate energy by receiving sunlight.

The magnet 150 according to an embodiment of the present disclosure may include a first magnet 151 and a second magnet 153. Here, the first magnet 151 may have an S pole, and the second magnet 153 may have an N pole. However, this is only an example. Conversely, the first magnet 151 may be implemented to have an N pole, and the second magnet 153 may be implemented to have an S pole.

The first magnet 151 and the second magnet 153 may be located in corner areas of the panel frame 110, respectively. The second magnet 153 according to the present embodiment may be arranged at a position a higher than that of the first magnet 151.

The first magnet 151 and the second magnet 153 each in the present disclosure may be implemented in a form of a rectangular parallelepiped or a cylinder.

The metal plate 170 according to an embodiment of the present disclosure is configured to generate an attractive force with a magnet in another solar panel structure combined with one side, and may include a first metal plate 171 and a second metal plate 173.

Referring to FIG. 6, the first metal plate 171 may be positioned at a same height as the first magnet 151 and is located in a corner area of the panel frame 110 corresponding to the corner area in which the second magnet 153 is located.

In addition, the second metal plate 173 may be positioned at a same height as the second magnet 153 and may be located in a corner area of the panel frame 110 corresponding to a corner area in which the first magnet 151 is located.

The wiring 190 according to an embodiment of the present disclosure is configured to connect the first magnet 151 and the second magnet 153 to a positive electrode and a negative electrode on an electrode surface of the solar panel 130, respectively, and may include first wiring 191 and second wiring 193.

Figure 7:
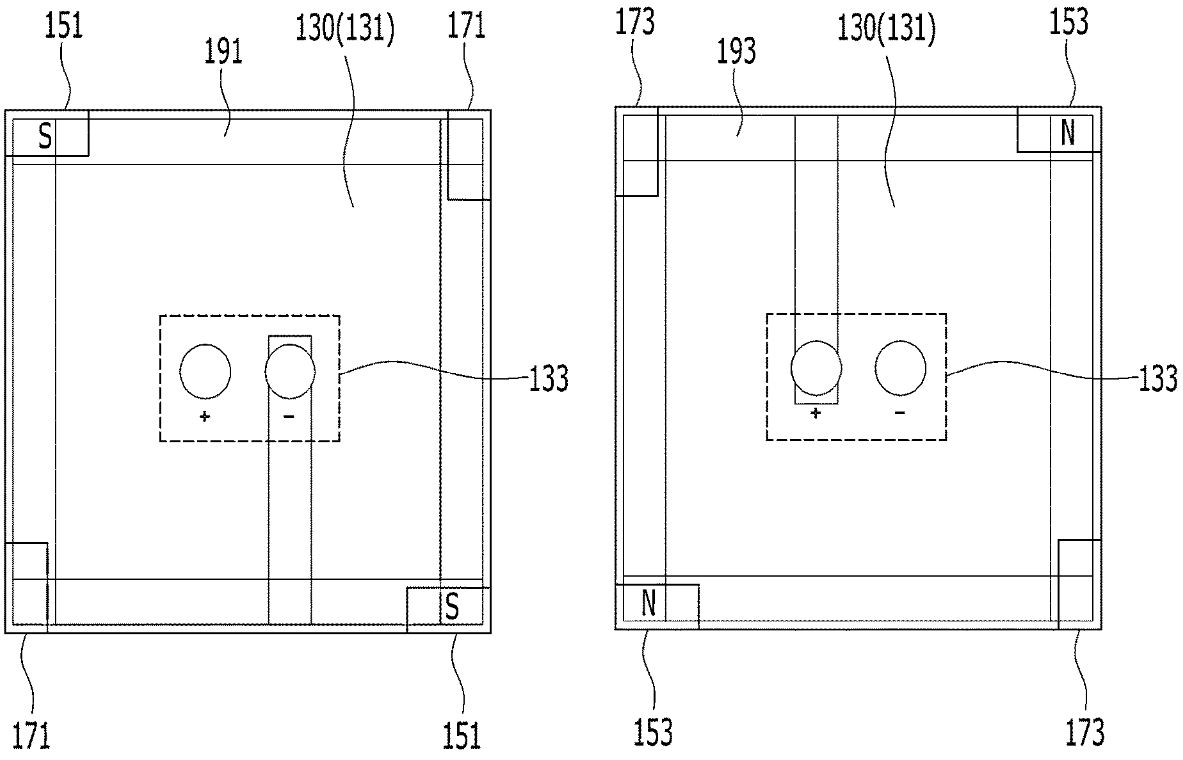
Figure 8:
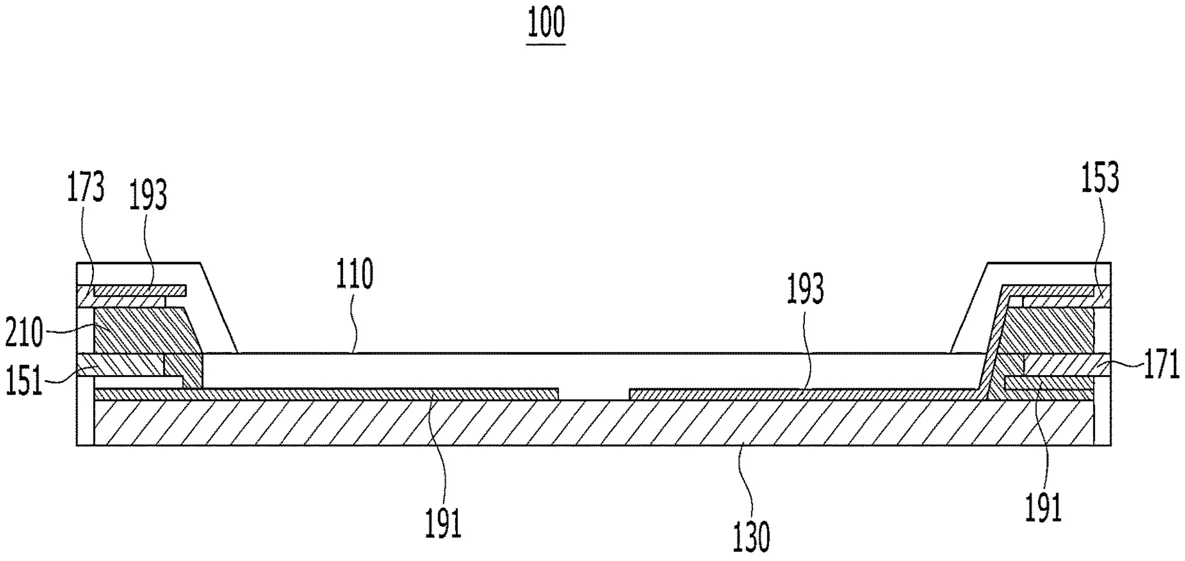

FIG. 7 is a Y-axis sectional view of the solar panel structure according to an embodiment of the present disclosure. FIG. 8 is an X-axis sectional view of the solar panel structure according to an embodiment of the present disclosure.

In detail, FIG. 7A shows a Y-axis section of the solar panel structure 100 according to a first height at which the first wiring 191 is disposed. FIG. 7B shows a Y-axis section of the solar panel structure 100 according to a second height at which the second wiring 193 is disposed.

Referring to FIG. 7A, the first wiring 191 according to the present embodiment may connect the first magnet 151 to a negative (−) electrode among electrodes 133 disposed on an electrode surface 131 of the solar panel 130.

As shown in FIG. 7B, the second wiring 193 may connect the second magnet 153 to a positive (+) electrode among the electrodes 133 disposed on the electrode surface 131 of the solar panel 130.

The first wiring 191 and the second wiring 193 according to the present embodiment may be implemented to be disposed along an edge of the solar panel 130 to extend to the electrodes 133 via the magnets 151 and 153 and the metal plates 171 and 173 by coming in contact with the magnets 151 and 153 and the metal plates 171 and 173.

For example, the first wiring 191 and the second wiring 193 according to an embodiment of the present disclosure may be implemented as a nickel or copper strip.

In addition, as shown in FIG. 8, in the second wiring 193 located at the second height according to the present embodiment, a stepped portion for a connection with respect to a height difference between the second height in the panel frame 110 and a height of the solar panel 130 below the panel frame 110 may be provided to connect an electrode on the electrode surface 131 to the second magnet 153.

Referring back to FIG. 5, the insulating material 210 according to an embodiment of the present disclosure is made of an insulating material, and may be disposed between the first magnet 151 and the first wiring 191, and between the second magnet 153 and the second wiring 193, to insulate between the first wiring 191 and the second wiring 193.

The panel frame 110 in the present disclosure may include first corner pockets 111 in a corner portion at the first height, and second corner pockets 113 in a corner portion at the second height above the first height, wherein the first magnet 151 and the first metal plate 171 may be arranged in the first corner pockets 111 and the second magnet 153 and the second metal plate 173 may be arranged in the second corner pockets 113.

The insulating material 210 may constitute first insertion pockets 211 in a corner portion at a first height corresponding to the first height of the panel frame 110, and second insertion pockets 213 in a corner portion at a second height corresponding to the second height in the panel frame 110, wherein the first magnet 151 and the first metal plate 171 may be at least partially inserted into the first insertion pockets 211, and the second magnet 153 and the second metal plate 173 may be at least partially inserted into the second insertion pockets 213.

The panel frame 110, the solar panel 130, the magnet 150, the metal plate 170, the wiring 190, and the insulating material 210 in the present disclosure may all be configured to have a quadrilateral form. The magnet 150, the metal plate 170, the wiring 190, and the insulating material 210 may be stacked between the panel frame 110 and the solar panel 130. As shown in FIG. 6, the wiring 190 and the insulating material 210 are not viewable as being covered by the panel frame 110 when viewed from outside. A light-receiving surface of the solar panel 130 is disposed to have an exposed form in a lower surface of the solar panel structure 100 to receive sunlight.

FIG. 8 is an X-axis sectional view of the solar panel structure according to an embodiment of the present disclosure.

Referring to FIGS. 6 to 8, the first magnet 151 may be disposed in first corner pockets in a diagonal direction, among the first corner pockets 111. That is, four first corner pockets 111 are disposed in corner portions at the first height in the panel frame 110 having a quadrilateral shape. The first magnet 151 is disposed in two first corner pockets 111 in a diagonal direction, among the four first corner pockets 111, and the first metal plate 171 is disposed in other two first corner pockets 111 (see FIG. 7).

Likewise, the second magnet 153 may be disposed in second corner pockets in a diagonal direction, among the second corner pockets 113. Four second corner pockets 113 are disposed in corner portions at the second height of the panel frame 110 having a quadrilateral shape. In this case, the second magnet 153 is disposed in two second corner pockets 113 in a diagonal direction, among the four second corner pockets 113. The second metal plate 173 is disposed in other two second corner pockets 113 (see FIG. 7).

At this time, the first magnet 151 and the second magnet 153 in the present disclosure are both located in the corner portions of the panel frame 110, but need to be implemented to be arranged in different corner portions in a vertical direction.

As shown in FIG. 6, the second metal plate 173, other than the second magnet 153, is disposed on the first magnet 151 in the corner portion of the panel frame 110 in which the first magnet 151 is disposed. Likewise, the first metal plate 171, other than the first magnet 151, is disposed below the second magnet 153 in the corner portion of the panel frame 110 in which the second magnet 153 is disposed.

The above-described arrangement of the first magnet 151, the second magnet 153, the first metal plate 171, and the second metal plate 173 may prevent generation of a repulsive force and generate only an attractive force to facilitate a combination between different solar panel structures 100 when the different solar structures 100 are to be combined with each other.

Figure 9:
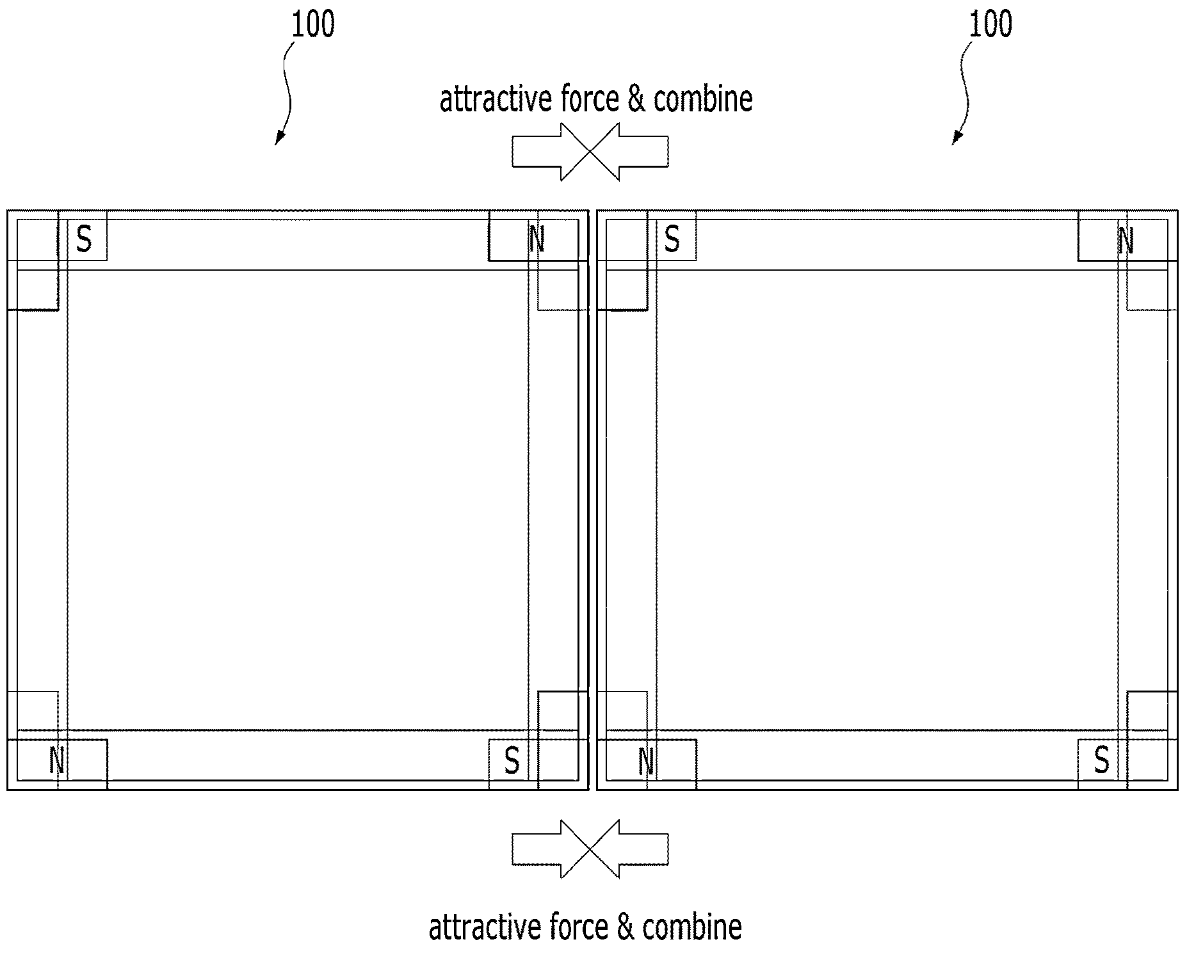

FIG. 9 is a schematic diagram illustrating a combination between solar panel structures according to an embodiment of the present disclosure.

As shown in FIG. 9, the first magnet 151 and the second magnet 153 according to an embodiment of the present disclosure are alternately arranged in four corner portions. Thus, when combination with another solar panel assembly is performed, an attractive force is generated. Therefore, the combination may be easily performed.

In detail, the first magnet 151 may create a strong attractive force with the second magnet 153 and the first metal plate 171 of another solar panel structure combined with one side, and the second magnet 153 may create a strong attractive force with the first magnet 151 and the second metal plate 173 of the another solar panel structure combined with one side.

Figure 10:
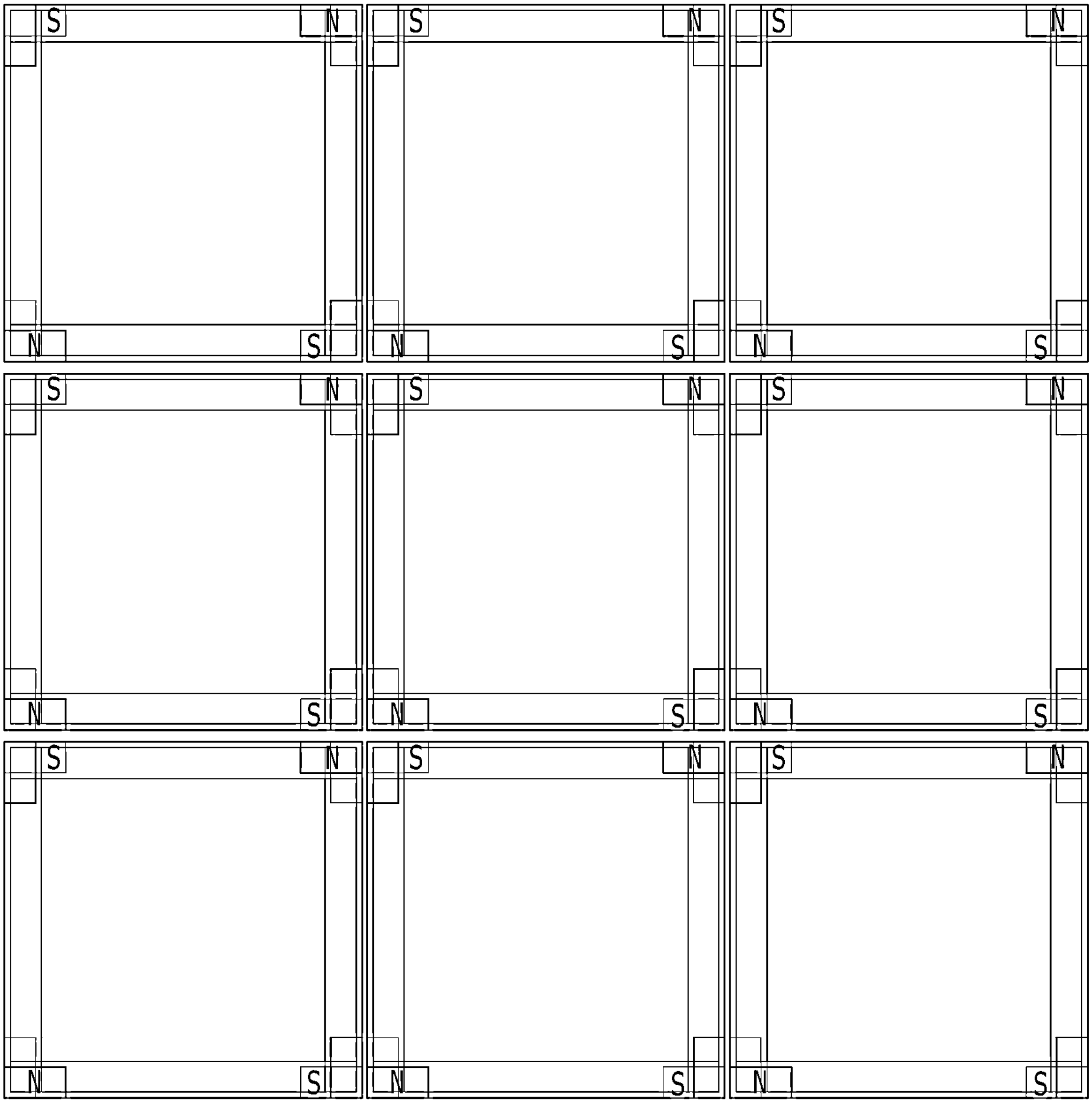

FIG. 10 is a diagram illustrating a shape of an assembled-type solar panel assembly constituted by combining a plurality of solar panel structures with each other according to an embodiment of the present disclosure.

As shown in FIG. 10, since the solar panel structure in the present disclosure has magnets arranged in the four corner portions, respectively, an attractive force is generated at all of four corner points. Thus, the solar panel structure may not be easily separated from, but may be stably combined with solar panel assemblies arranged in all directions.

Figure 11:
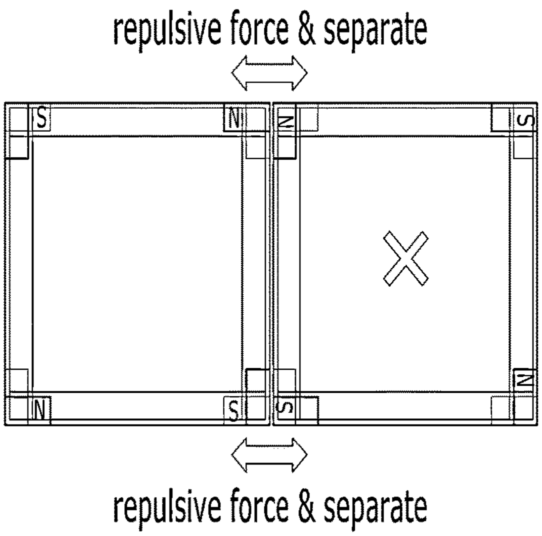

FIG. 11 illustrates an example of a combination between solar panel structures according to an undesirable embodiment.

A left drawing in FIG. 11 illustrates a state in which a repulsive force is generated due to incorrect setting of a combination direction of solar panel structures in the present disclosure, and thus, the solar panel structures are not combined with each other.

A right picture of FIG. 11 illustrates a state in which a first magnet (an S pole) and a second magnet (an N pole) are not alternately arranged in four corner portions of a solar panel structure but the first magnet (an S pole) is on a left side and the second magnet is on a right side, and accordingly, in combination between different solar panel structures, an attractive force is generated in one corner portion, but a repulsive force is generated in another corner portion since two magnets with a same polarity meet (an N-pole).

In addition, the assembled-type solar panel assembly according to an embodiment of the present disclosure may include only a plurality of solar panel structures, but may also be implemented to have a combination structure of a non-power generation panel structure and a solar panel structure (a power generation panel structure). In this case, the non-power generation panel structure does not include a solar panel only, and arrangement of magnets (S-pole, N-pole) to be combined with other structures may be performed identically.

Figure 12:
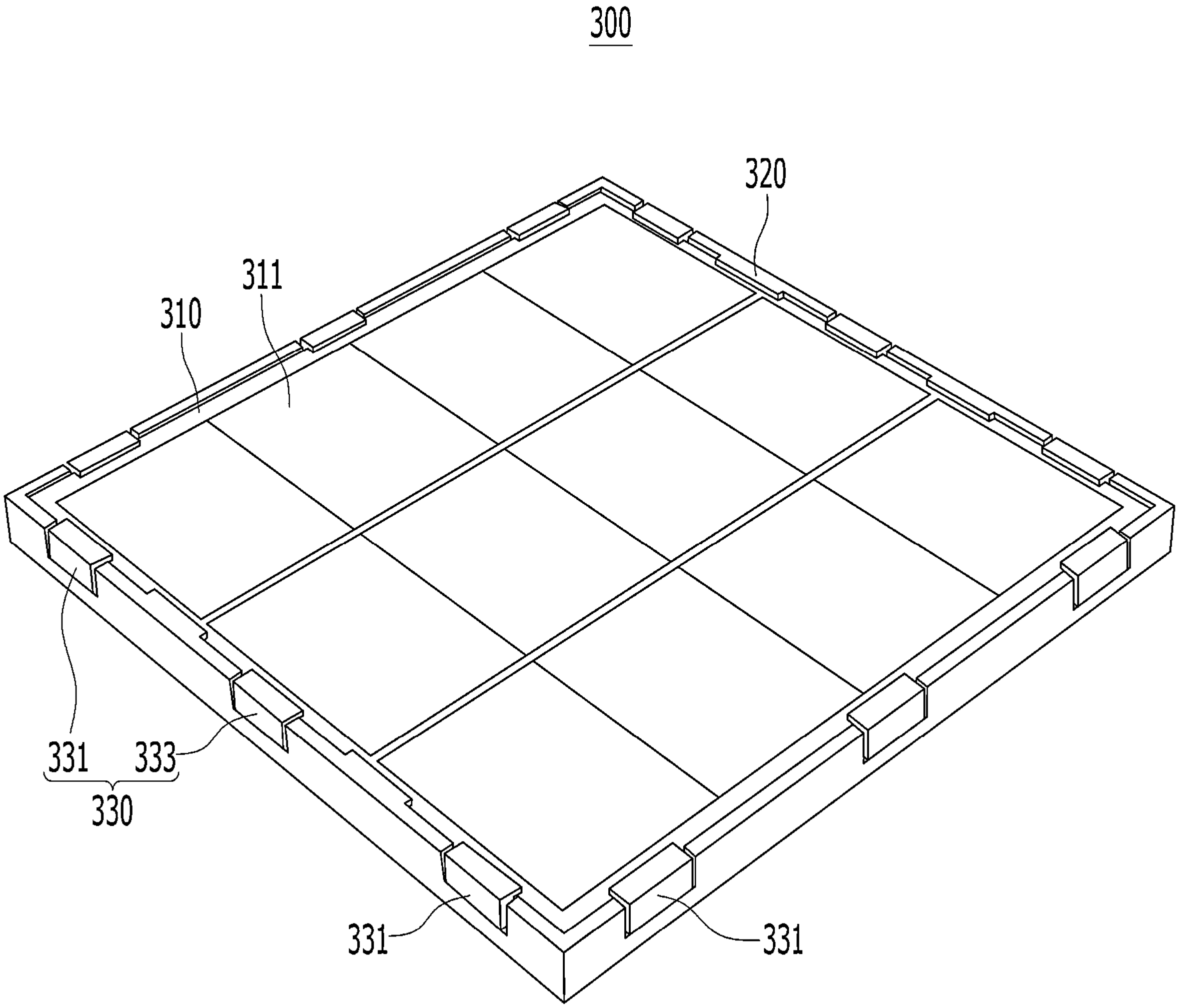
FIGS. 12 to 18 are diagrams related to a solar panel structure according to the second embodiment.
Figure 13:
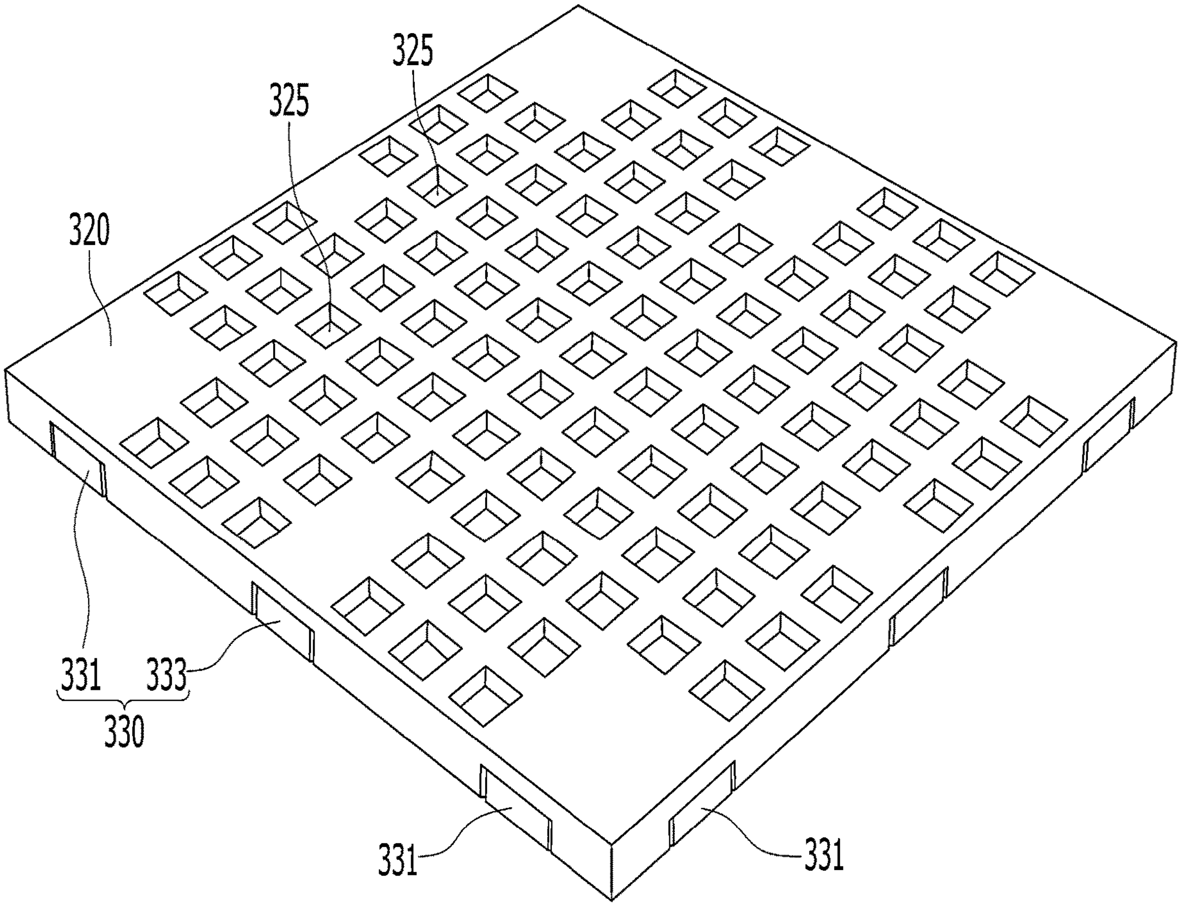
Figure 14:
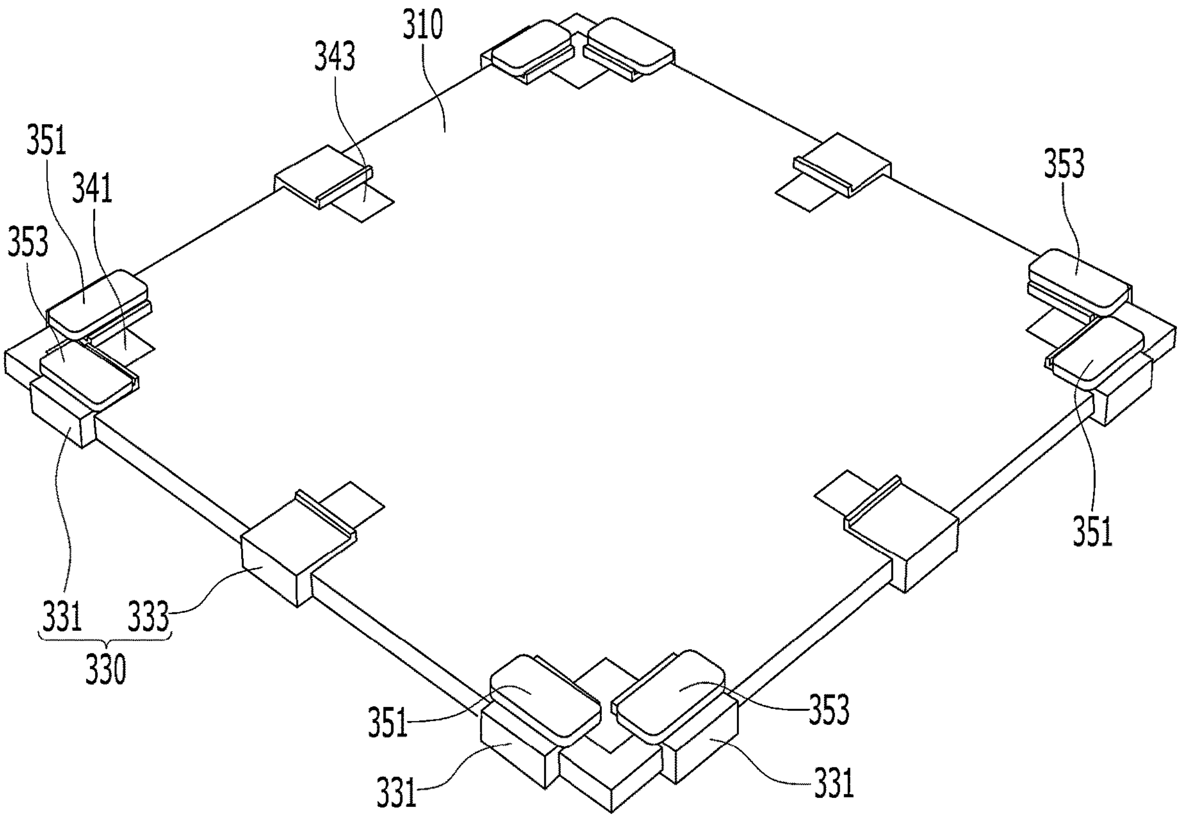
Figure 15:
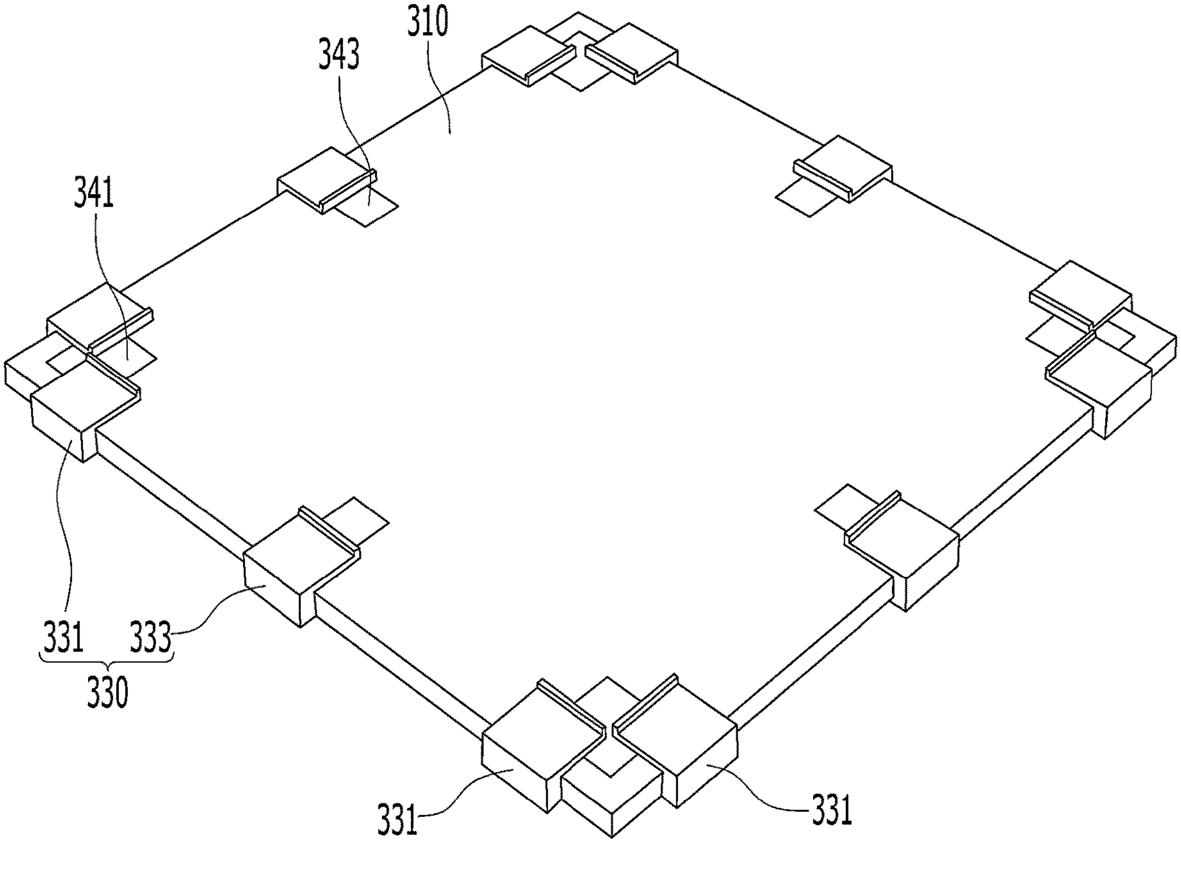
Figure 16:
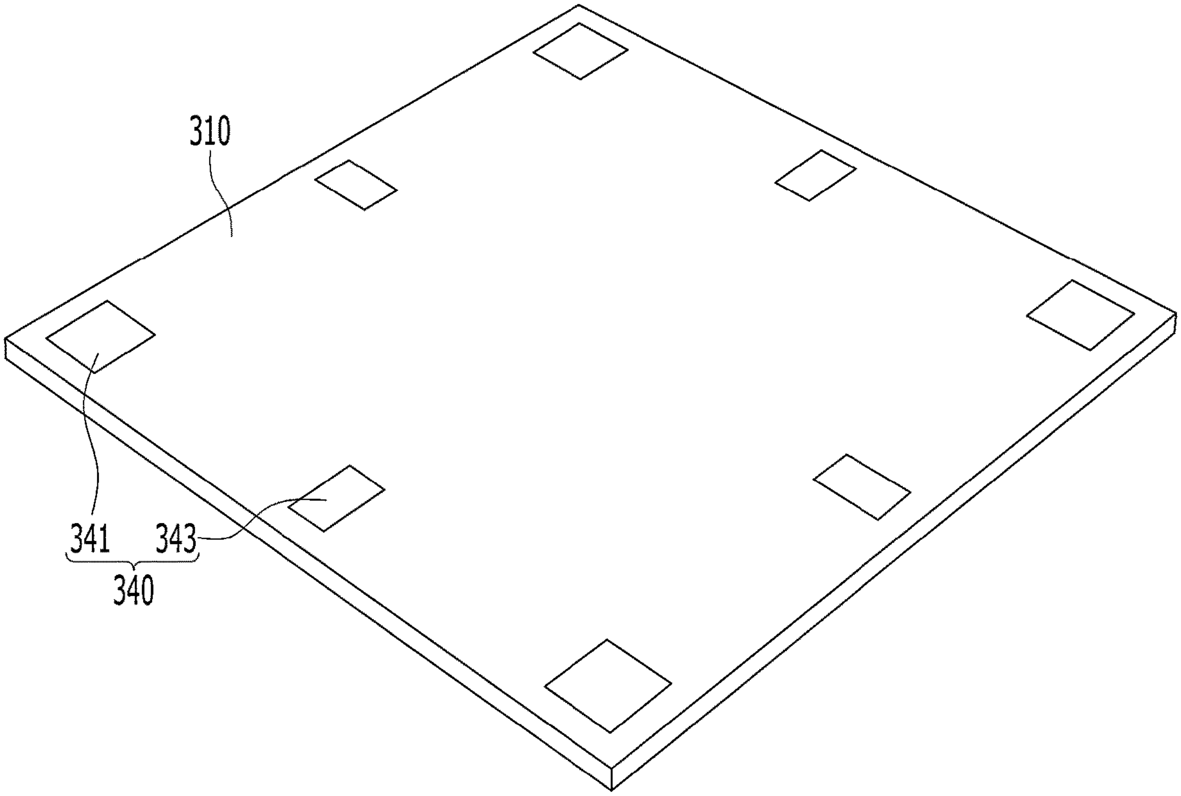

FIG. 12 is a diagram illustrating a solar panel structure using an assembly block according to an embodiment of the present disclosure. FIG. 13 is a diagram illustrating a rear surface of the solar panel structure using the assembly block according to an embodiment of the present disclosure. FIGS. 14 to 16 are diagrams for explaining a configuration of the solar panel structure according to an embodiment of the present disclosure.

Referring to FIGS. 12 to 16, a solar panel structure 300 according to an embodiment of the present disclosure may be configured to include a solar panel 310, a panel frame 320, a plurality of electrodes 330, a conductor pad 340, a magnet 350, and an assembly block 400.

The solar panel 310 is disposed below or above the panel frame 320 and functions to generate energy by receiving sunlight. As shown in FIG. 12, the solar panel 310 may be configured to include a plurality of solar cell pieces 311 arranged on one surface.

The panel frame 320 is a frame which covers all elements including the solar panel 310 configured to receive sunlight, the electrodes 330, the conductor pad 340, and the magnet 350. In detail, the panel frame 320 in the present disclosure covers a portion (a side surface and an electrode surface) of the solar panel 310, other than a light-receiving surface configured to receive sunlight. A plurality of pattern grooves 325 may be disposed in a rear surface covering the electrode surface of the solar panel 310.

Referring to FIG. 13, the pattern grooves 325 which may be coupled to the assembly block 400 are disposed to be apart from each other in the rear surface of the panel frame 320 according to an embodiment of the present disclosure, and the pattern grooves 325 may be arranged in a whole area of the rear surface of the panel frame 320 other than an area in which the electrodes 330 are disposed.

Meanwhile, a plurality of exposure grooves for exposing the plurality of electrodes 330 arranged in an edge portion of the solar panel 310 to outside may be disposed in a side surface of the panel frame 320. The electrodes 330 are exposed to outside through the exposure grooves to be connected to a control device to transmit direct current electricity to the control device. Thus, the control device may collect direct current electricity generated by solar power to connect to an external output terminal at a constant voltage.

The electrodes 330 may be disposed to be apart from each other by a certain distance in an edge portion of the panel frame 320. The electrodes 330 in the present disclosure may include first electrodes 331 and second electrodes 333 having different polarities. The first electrodes 331 and the second electrodes 333 may be arranged alternately with each other.

For example, in the present embodiment, the first electrodes 331 may be positive electrodes and the second electrodes 333 may be negative electrodes.

Referring to FIGS. 12 and 13, the first electrodes 331 may be arranged in both side portions of each side of the solar panel 310 and the panel frame 320 each having a rectangular shape, and the second electrodes 333 may be arranged between the first electrodes 331 arranged in the both side portions.

That is, the first electrodes 331 may be implemented to be disposed in corner portions of the solar panel 310 and the panel frame 320, and the second electrodes 333 may be implemented to be disposed at a center of edge portions of the solar panel 310 and the panel frame 320.

FIG. 14 is a schematic diagram illustrating arrangement of a solar panel, electrodes, and magnets according to an embodiment of the present disclosure.

Magnets 350 according to an embodiment of the present disclosure may be arranged in corner portions of the solar panel 310 and include first magnets 351 and second magnets 353 having different polarities.

According to the present embodiment, as shown in FIG. 14, one first magnet 351 and one second magnet 353 may be arranged in a same corner portion of the solar panel 310.

As an example, the first magnets 351 may have an N pole, and the second magnets 353 may have an S pole. However, this is only an example. Conversely, the first magnets 351 may be implemented to have an N pole, and the second magnets 353 may be implemented to have an S pole.

A first magnet 351 and a second magnet 353 may be disposed on surfaces of two first electrodes 331 in contact with a first conductor pad 341 disposed in a corner portion of the solar panel 310, respectively.

The magnets 350 may function to facilitate combination with other solar panel structures and guide alignment of a plurality of solar panel structures arranged in parallel.

For example, as an attractive force occurs between a first magnet 351 located at an upper right end of a first solar panel structure, and a second magnet 353 located at an upper left end of a second solar panel structure to be combined with a right side of the first solar panel structure, positional alignment of the first solar panel structure and the second solar panel structure may be smoothly performed.

The magnets 350 only functions to assist in combining between different solar panel structures, and the combination between the solar panel structures may be firmly performed using the assembly block 400.

In addition, as shown in FIG. 14, the magnets 350 in the present disclosure has a structure in which the first magnets 351 and the second magnets 353 are arranged symmetrically to each other at each corner. Thus, when combination with another solar panel structure is performed, any of four surfaces may be combined with the another solar panel structure without any restriction.

FIG. 15 is a diagram illustrating arrangement of the solar panel structure and the electrodes according to an embodiment of the present disclosure.

Referring to FIG. 15, the first conductor pad 341 disposed in each corner portion of the solar panel 310 may be in contact with first electrodes 331 disposed on different sides of one corner portion of the solar panel 310, and the second conductor pad 343 may be in contact with one second electrode 333 disposed at a center of an edge portion of the solar panel 310.

FIG. 16 is a schematic diagram illustrating a solar panel from which a panel frame on a rear surface according to an embodiment of the present disclosure is removed. Referring to FIG. 16, a plurality of conductor pads 340 disposed to be apart from each other by a certain distance may be arranged in an edge portion of the solar panel 310 according to an embodiment of the present disclosure.

The conductor pad 340 according to an embodiment of the present disclosure may be configured to include the first conductor pad 341 and the second conductor pad 343. The first conductor pad 341 may be a positive (+) pad in contact with the first electrode 331 to transmit solar energy received from the solar panel 310 to the first electrode 331 (a positive (+) electrode). The second conductor pad 343 may be a negative (−) pad in contact with the second electrode 333 to transmit solar energy received from the solar panel 310 to the second electrode 333 (a negative (−) electrode).

That is, like an electrode, the conductor pad 340 may be implemented such that the first conductor pad 341 is arranged in a corner portion of the solar panel 310, and the second conductor pad 343 is arranged at a center of an edge portion of the solar panel 310.

The assembly block 400 according to the present disclosure may be inserted and coupled into the pattern grooves 325 to be coupled into or separated from the panel frame 320.

Figure 17:
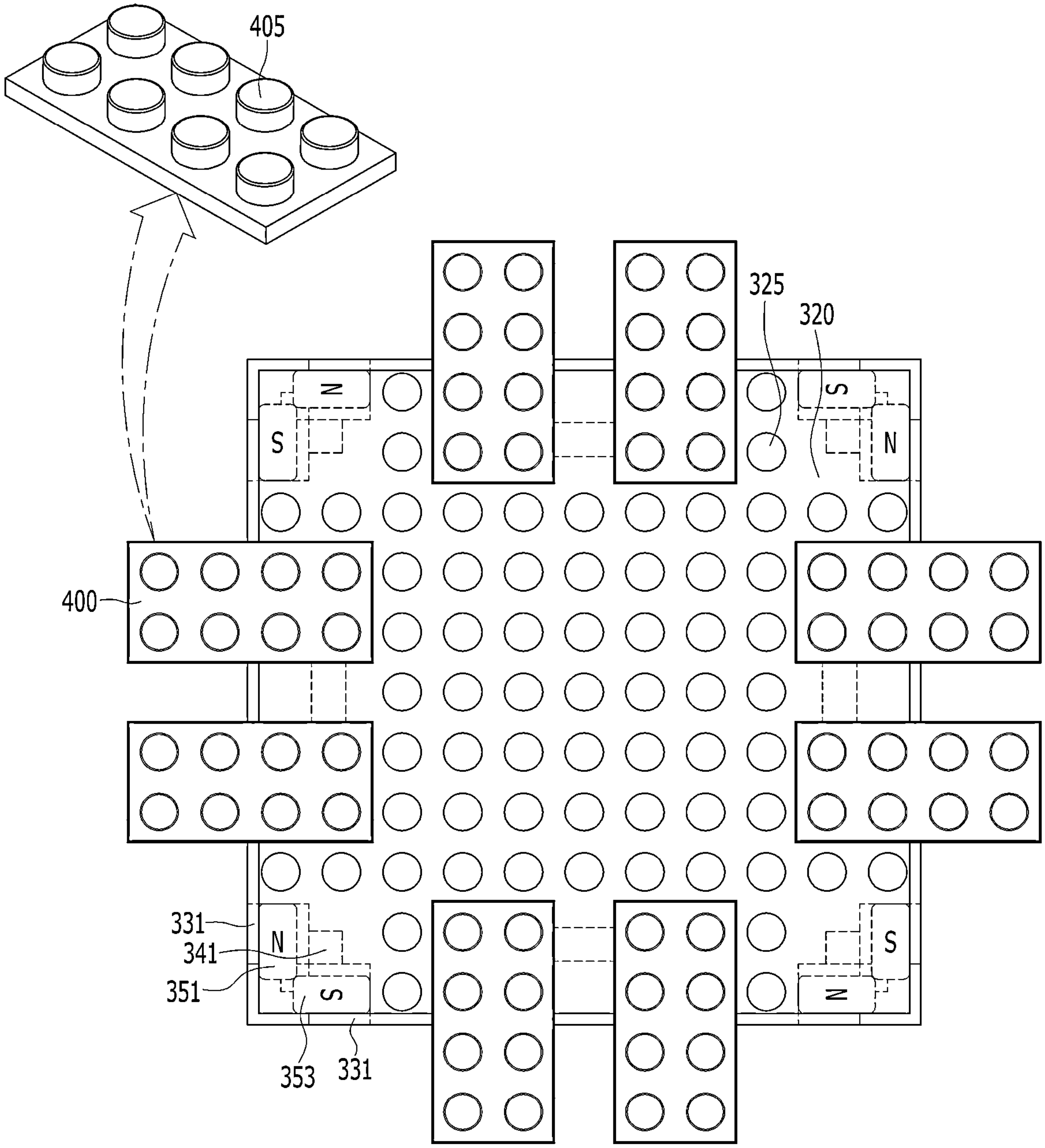

FIG. 17 is a schematic diagram illustrating a rear surface of a solar panel structure to which an assembly block is coupled according to an embodiment of the present disclosure.

Referring to FIG. 17, the assembly block 400 according to an embodiment of the present disclosure may have a plurality of protruding convex portions 405 disposed on one surface (an upper surface). The protruding convex portions 405 may be fastened to the panel frame 320 by being inserted and coupled to be fit into the pattern grooves 325 in a rear surface of the panel frame 320. For example, the assembly block 400 in the present disclosure may be implemented as a Lego block.

In addition, the pattern grooves 325 may be configured to have a quadrilateral shape or a circular shape. Shapes of the pattern grooves 325 and the protruding convex portions may be implemented variously in any symmetrical form.

As some of the plurality of protruding convex portions 405 on the assembly block 400 are inserted and coupled into the pattern grooves 325 in a rear surface of the panel frame 320 and remaining portions of the plurality of protruding convex portions 405 are inserted and coupled into pattern grooves in a rear surface of a panel frame of another solar panel structure, the assembly block 400 may connect different solar panel structures to each other.

Figure 18:
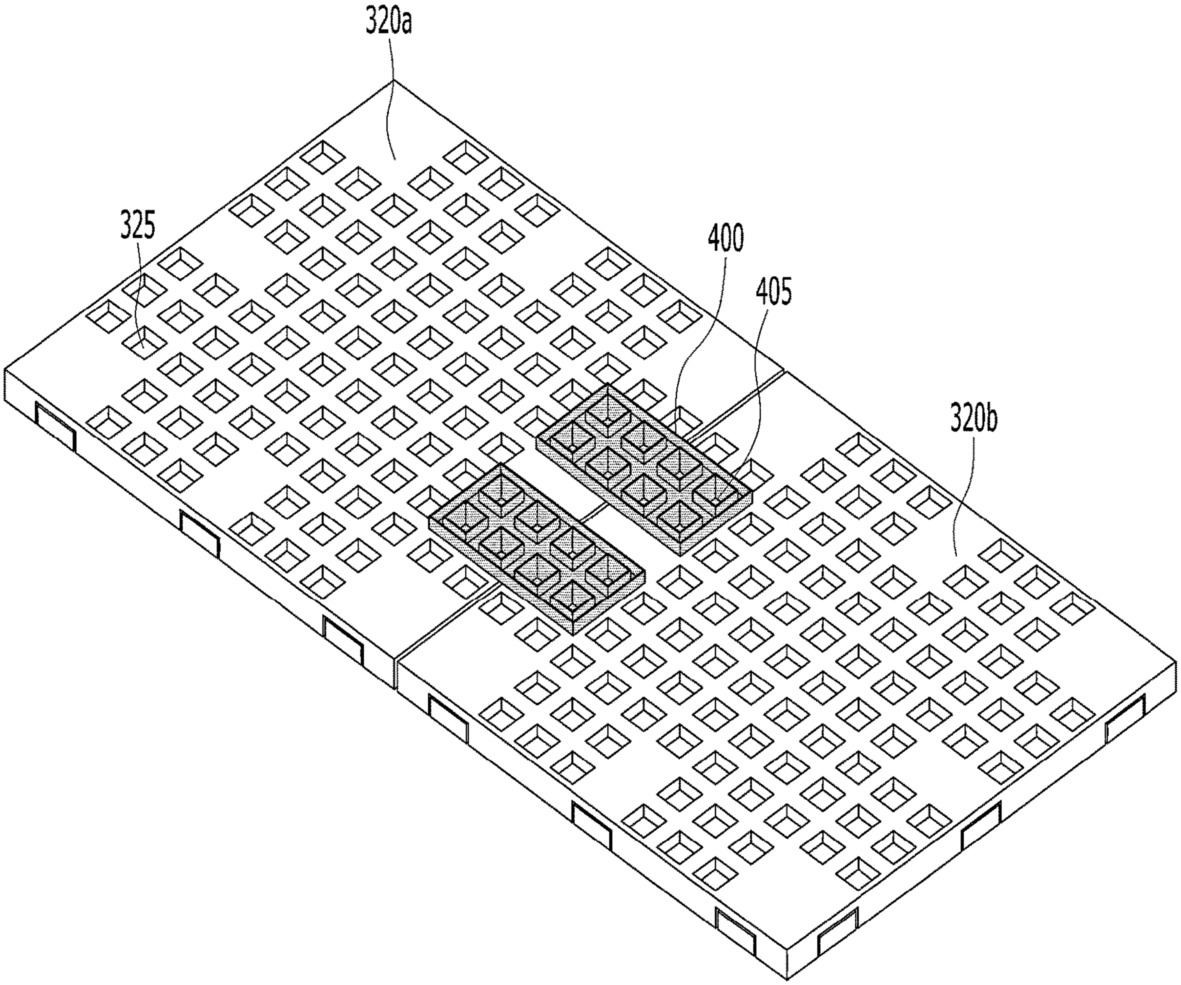

FIG. 18 is a schematical diagram illustrating combination between different solar panel structures by an assembly block according to an embodiment of the present disclosure.

As shown in FIG. 18, the assembly block 400 may combine a plurality of solar panel structures with each other by being simultaneously inserted into pattern grooves disposed in a rear surface of each of panel frames 320*a* and 320*b* included in different solar panel structures.

The solar panel structures (solar panel assemblies) combined by the assembly block 400 are implemented in a form such that the assembly block is inserted into each pattern groove in panel frames on a rear surface, instead of a form of simply using a magnet or a connector. Thus, the solar panel structures may be erected not only horizontally but also vertically, and thus, may be easily installed in various environments.

Figure 19:
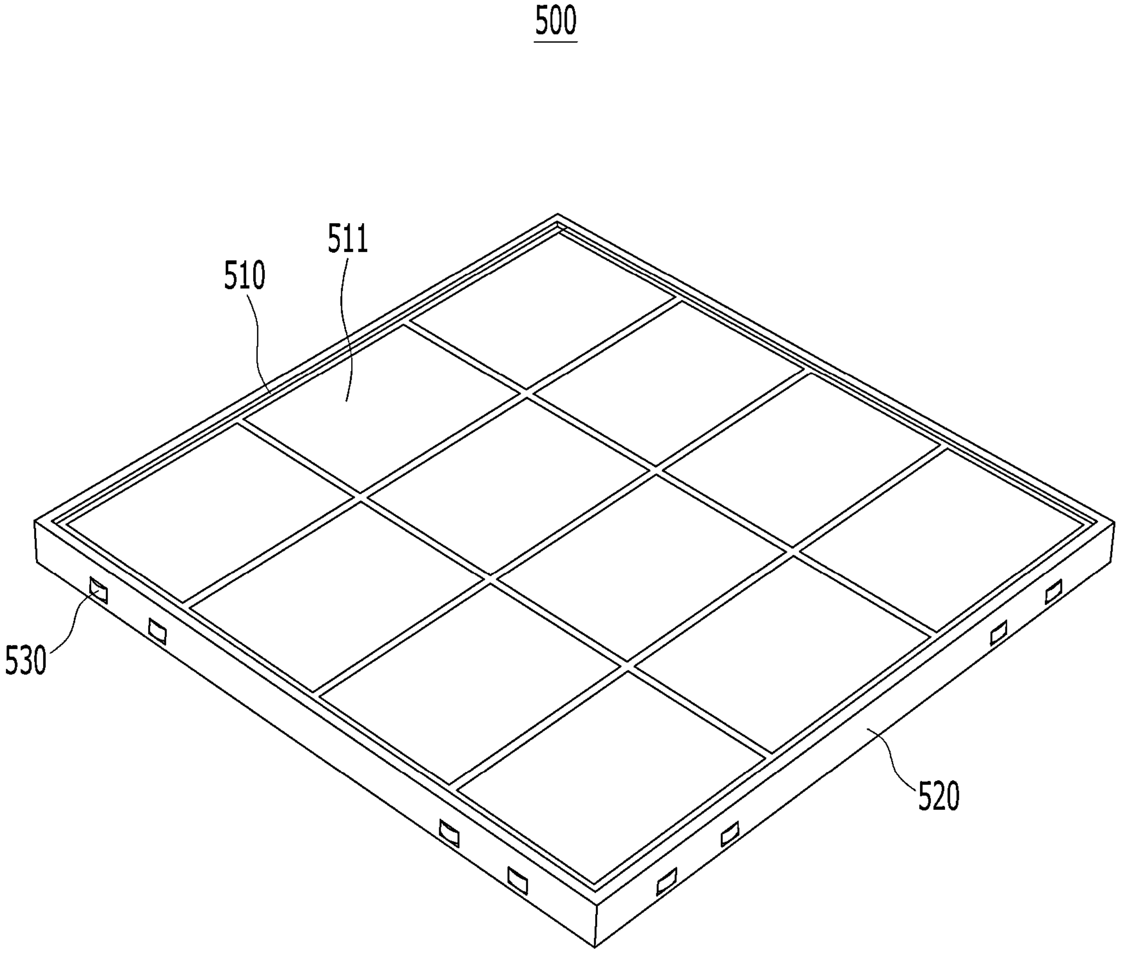
FIGS. 19 to 35 are diagrams related to a solar panel structure according to the third embodiment.
Figure 20:
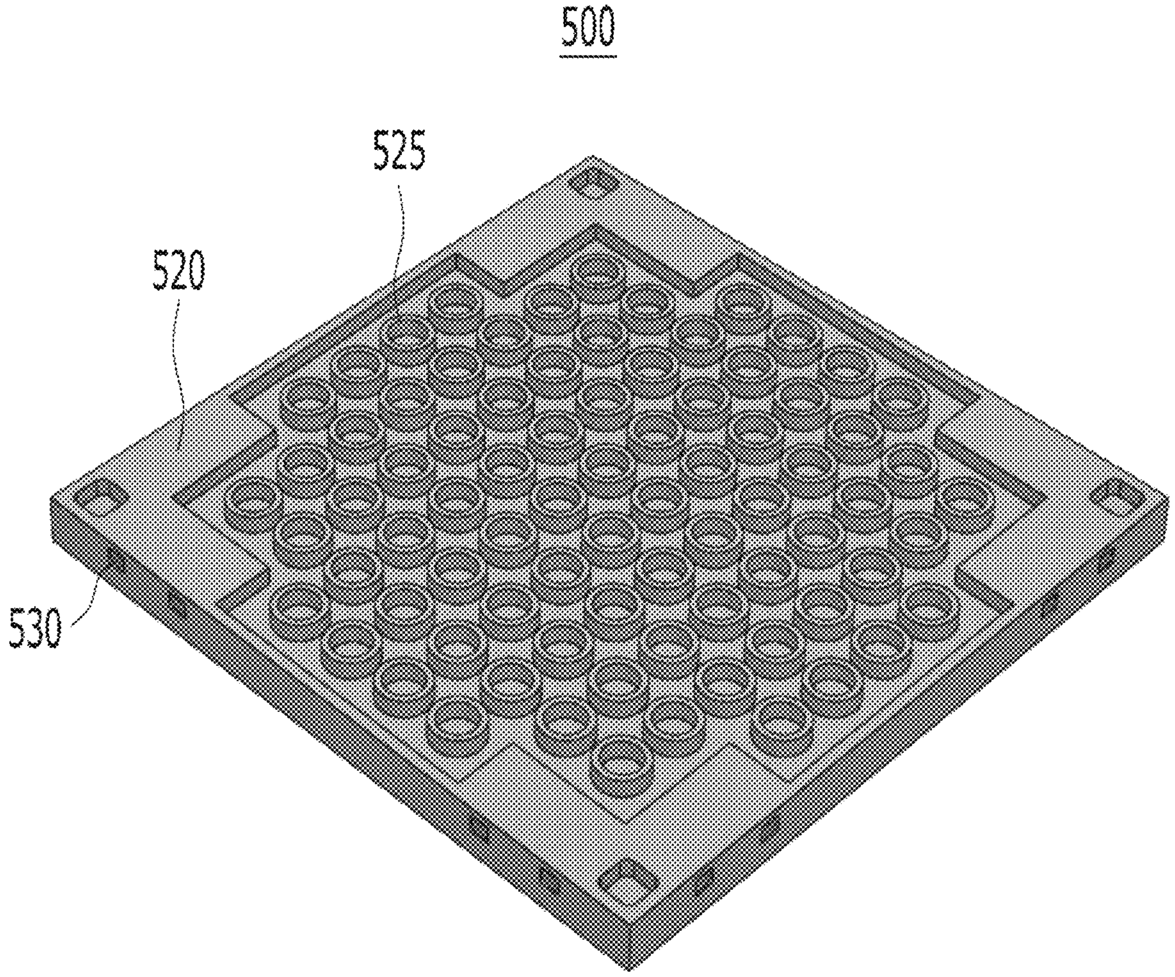

FIG. 19 is a diagram for explaining a structure of the solar panel structure according to an embodiment of the present disclosure. FIG. 20 is a diagram illustrating a rear surface of the solar panel structure according to an embodiment of the present disclosure. FIGS. 21 to 31 are diagrams for explaining a configuration of the solar panel structure according to an embodiment of the present disclosure.

Referring to FIGS. 19 to 31, a solar panel structure 500 according to an embodiment of the present disclosure may be configured to include a solar panel 510, a panel frame 520, a plurality of magnets 530, and a conductor pad 550.

The solar panel 510 is disposed below or above the panel frame 520 and functions to generate energy by receiving sunlight. As shown in FIG. 19, the solar panel 510 may be configured to include a plurality of solar cell pieces 511 arranged on one surface.

The panel frame 520 is a frame which covers all elements including the solar panel 510 configured to receive sunlight, the magnets 530, and the conductor pad 550. In detail, the panel frame 520 in the present disclosure may cover a portion (a side surface and an electrode surface) of the solar panel 510, other than a light-receiving surface configured to receive sunlight. A plurality of pattern grooves 525 may be disposed in a rear surface covering the electrode surface of the solar panel 510.

In addition, the panel frame 520 in the present disclosure may include magnet pockets 523 configured to provide spaces in which the magnets 530 may be arranged inside. The magnet pockets 523 are disposed in an edge portion of the panel frame 520.

The magnets 530 may be located in an edge portion of a solar panel to be combined with another solar panel. The magnets 530 according to an embodiment of the present disclosure may be configured in a circular shape.

Referring to FIG. 20, the pattern grooves 525 capable of being coupled to an assembly block are disposed to be apart from each other in a rear surface of the panel frame 520 according to an embodiment of the present disclosure. The pattern grooves 525 may be disposed in a whole area of the rear surface of the panel frame 520 other than an area in which the magnets 530 are disposed.

Meanwhile, a plurality of exposure grooves for exposing the plurality of magnets 530 arranged in an edge portion of the solar panel 510 to outside may be disposed in a side surface of the panel frame 520. The magnets 530 are exposed to outside through the exposure grooves to be connected to a controller 600 to transmit direct current electricity to a control device. Thus, the controller 600 may collect direct current electricity generated by solar power to connect to an external output terminal (e.g., an external battery) at a constant voltage.

Figure 21:
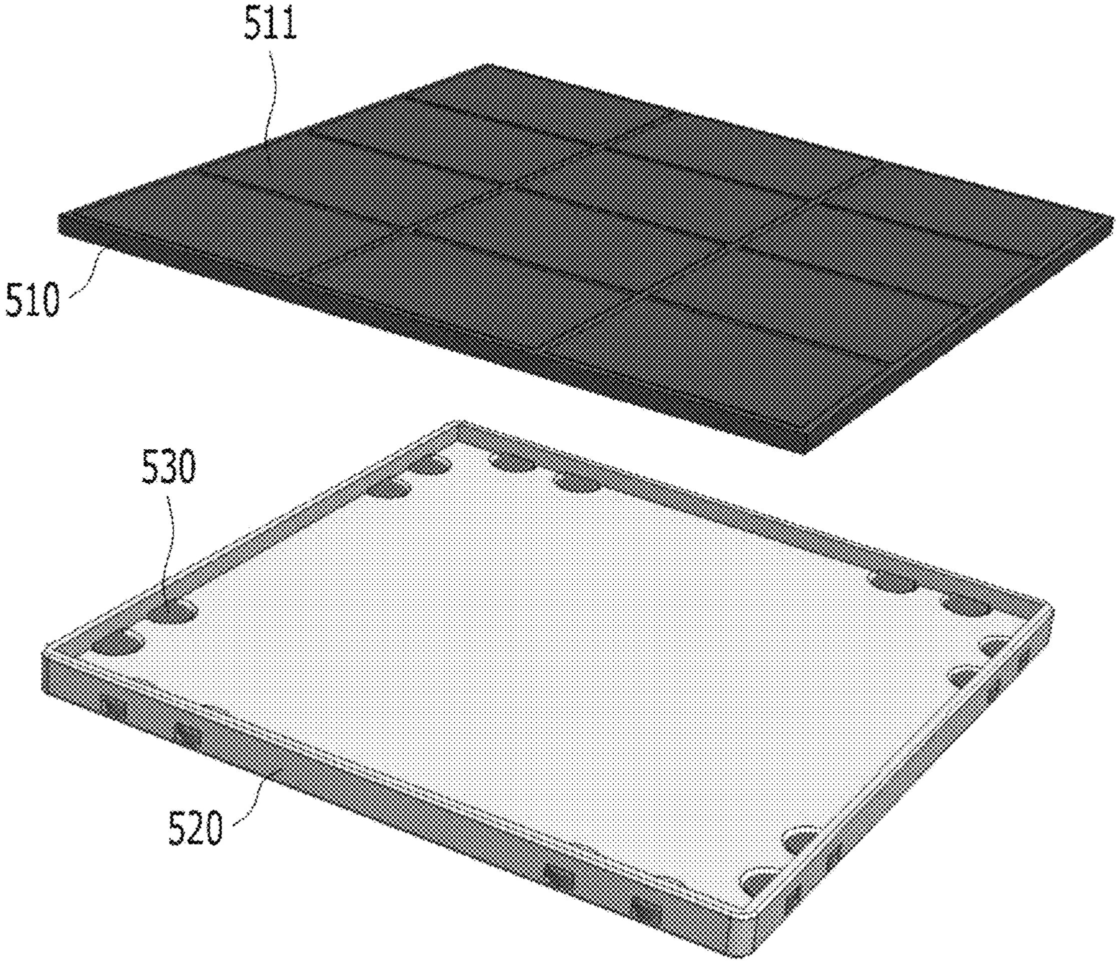

FIG. 21 is a schematic diagram illustrating separation of a solar panel from a panel frame according to an embodiment of the present disclosure. As shown in FIG. 21, the solar panel 510 in the present disclosure may be fastened to be fit into a space provided in a front surface of the panel frame 520.

In addition, the magnets 530 disposed on the panel frame 520 may be exposed in a front surface of the panel frame 520 to be electrically connected to electrodes 513 and 515 on the electrode surface of the solar panel 510.

The magnets 530 according to the present disclosure are located inside the magnet pockets 523 disposed in an edge portion of the panel frame 520.

Figure 22A:
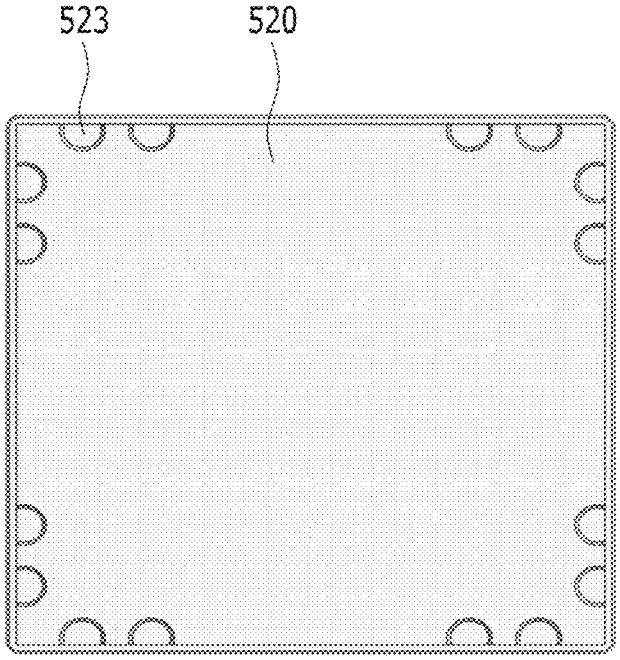
Figure 22B:
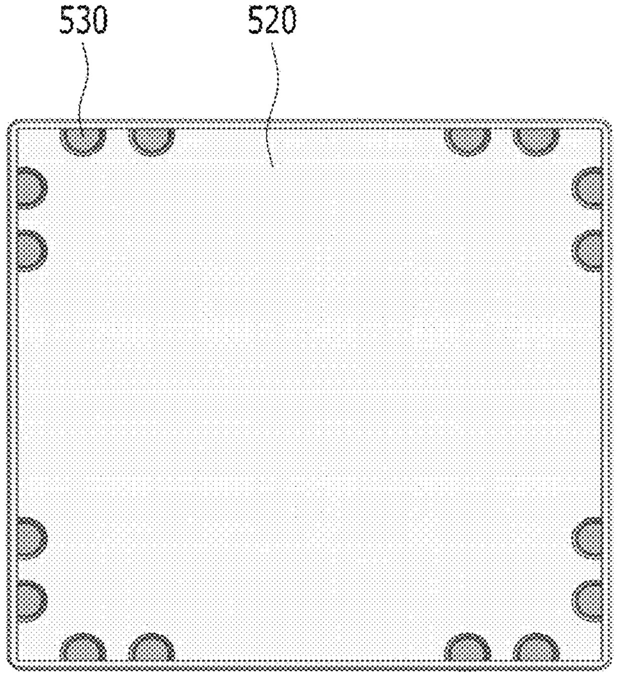

FIG. 22A is a diagram illustrating a front surface portion of the panel frame 120. FIG. 22B is diagram illustrating a state in which the magnets 530 are inserted into the magnet pockets 523.

Referring to FIG. 22A, the magnet pockets 523 provide spaces so that the magnets 530 may be coupled to the panel frame 520. The magnet pockets 523 are disposed on the edge portion of the panel frame 520. More preferably, the magnet pockets 523 according to an embodiment of the present disclosure may be disposed in corner portions of the panel frame 520.

The magnet pockets 523 may be configured to have a circular shape corresponding to a circular shape of the magnets 530 in an inward direction of the panel frame 520, and have a flat shape on a side surface of the panel frame 520.

Figure 23A:
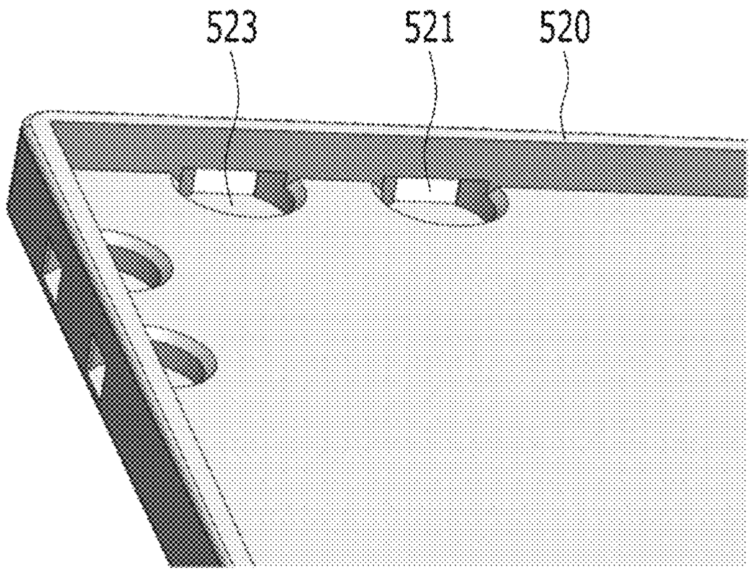
Figure 23B:
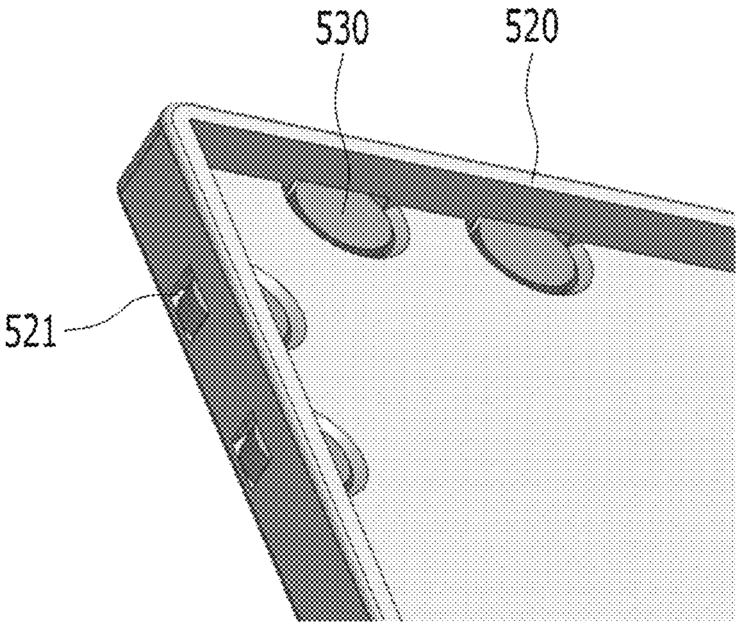

FIG. 23A is an enlarged view of the magnet pockets 523. FIG. 23B is an enlarged view of the magnets 530 inserted into the magnet pockets 523.

According to an embodiment of the present disclosure, exposed grooves 521 are disposed in positions in which the magnet pockets 523 are disposed in a side surface of the panel frame 520.

Referring to FIG. 23B, parts of side surfaces of the magnets 530 are exposed to outside through the exposure grooves 521. The magnets 530 in the present disclosure need to be mechanically and electrically combined with to another external solar panel structure. This mechanical and electrical combination may be performed by being exposed to outside through the exposure grooves 521.

Further, inner spaces of the magnet pockets 523 in which the magnets 530 are arranged are configured to have a size greater than that of the magnets 530. Thus, positions of the magnets 530 in the magnet pockets 523 may be moved by a certain distance depending on whether the magnets 530 are combined with another solar panel.

Figure 24A:
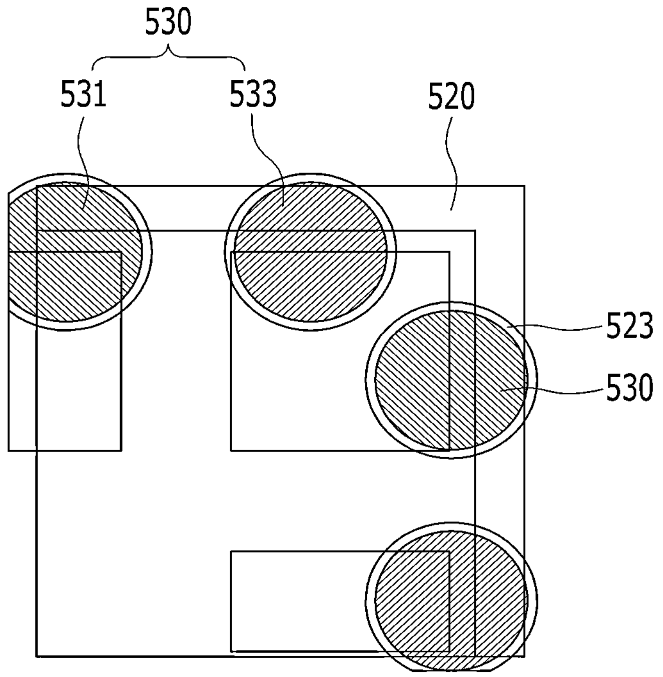
Figure 24B:
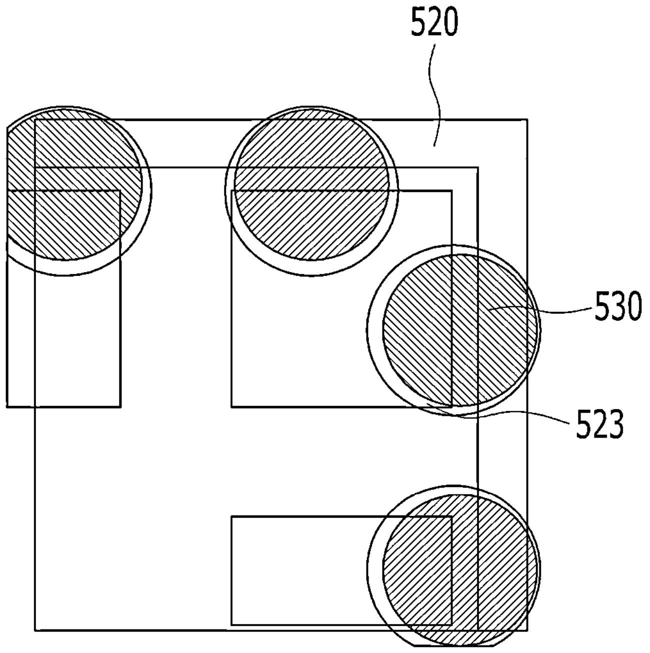
Figure 25:
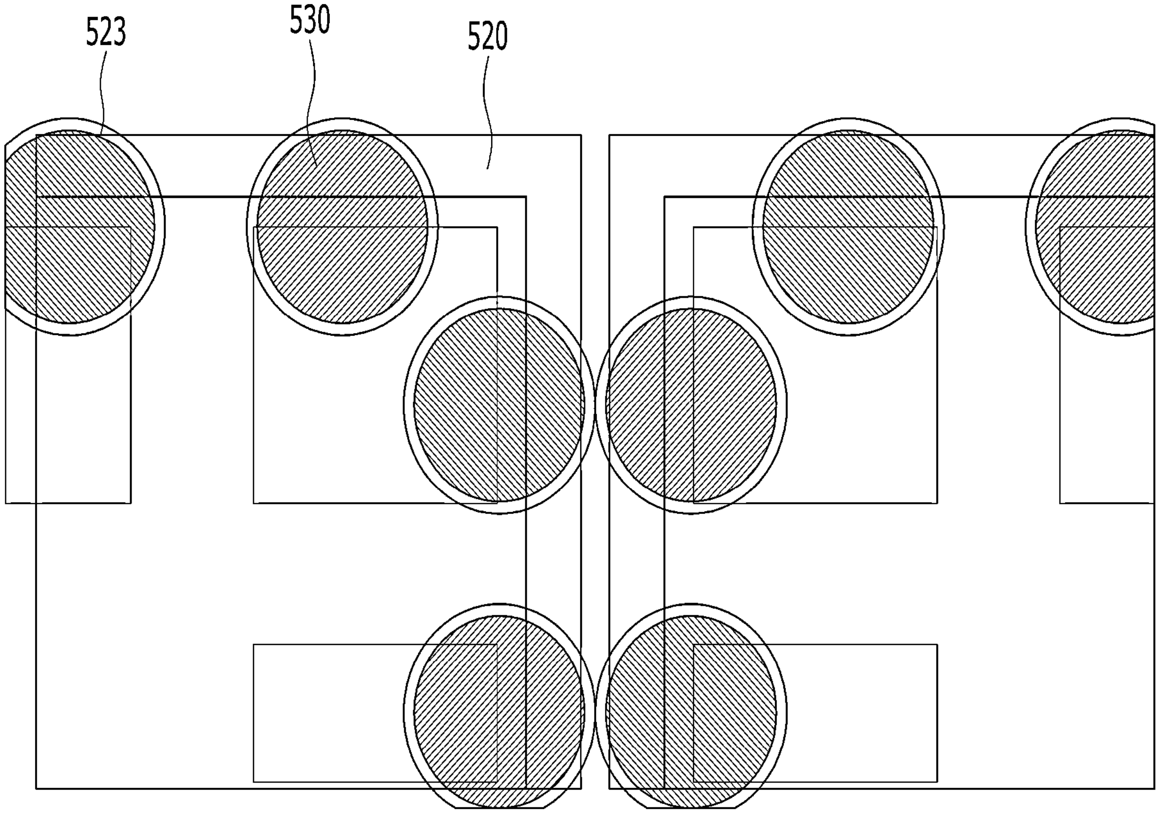

FIG. 24 is a schematic diagram illustrating movement of positions of magnets within magnet pockets according to an embodiment of the present disclosure. FIG. 24A shows that the magnets 530 are inserted into the magnet pockets 523 before being combined with another solar panel structure. FIG. 24B shows that positions of the magnets 530 are moved within the magnet pockets 523 when being combined with another solar panel structure.

In detail, as the solar panel structure 500 is positioned adjacent to another solar panel structure, the magnets 530 move in an outward direction due to occurrence of an attractive force with magnets in the another solar panel structure.

According to an embodiment of the present disclosure, magnets disposed in an edge portion of the panel frame 520 may be alternately arranged so that upper surfaces of adjacent magnets have different polarities.

According to one embodiment, referring to in FIG. 24, the magnets may be preferably arranged, for example, to have a form in which an S pole 533 as a second magnet is arranged next to an N pole 531 as a first magnet.

FIGS. 25 to 28 are diagrams illustrating movement of magnets when different solar panel structures are positioned adjacent to each other.

Figure 26:
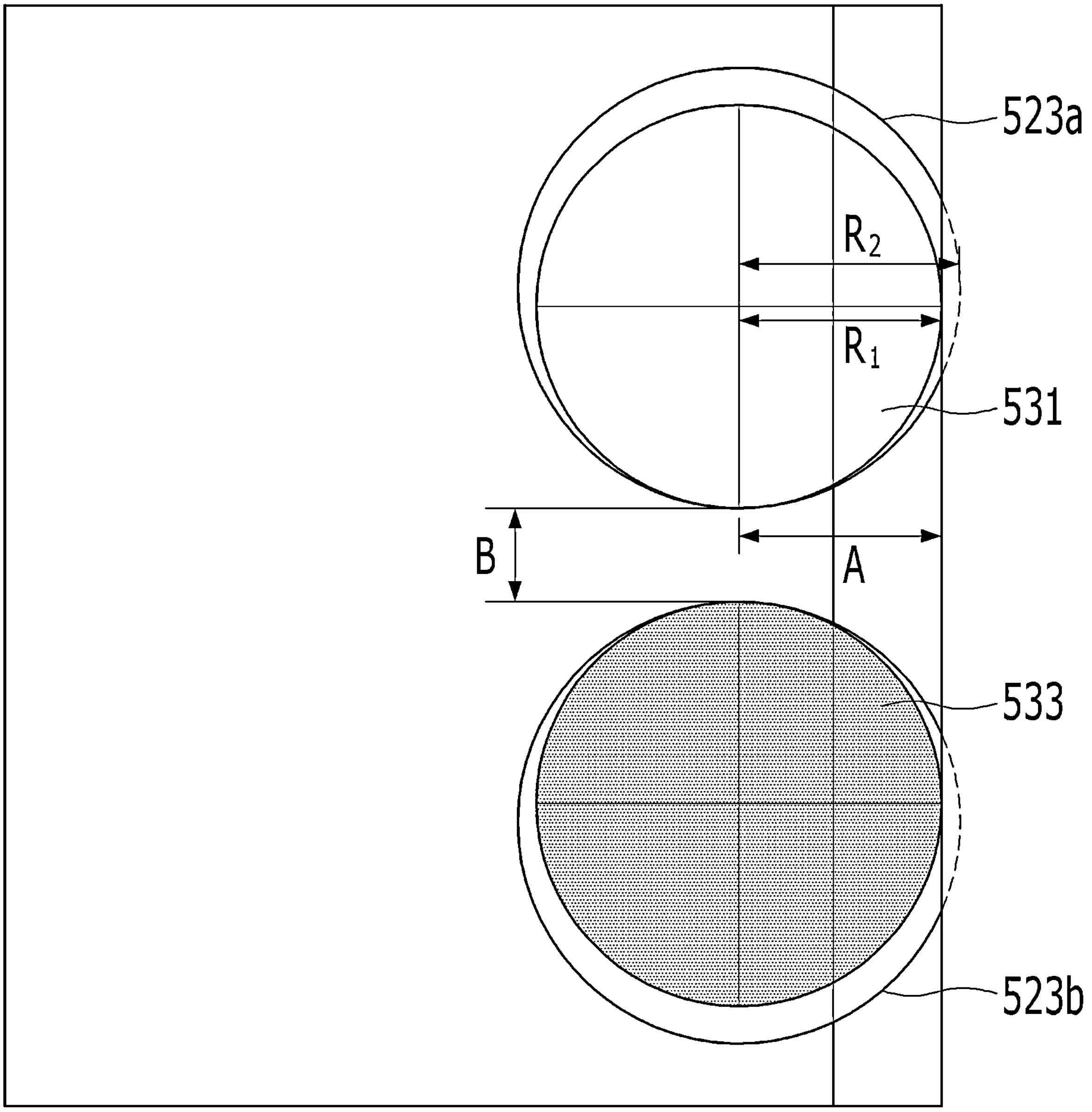

FIG. 26 is a detailed enlarged view for explaining a state in which the magnets 530 are inserted into the magnet pockets 523 before being combined with another solar panel structure.

In detail, referring to FIG. 26, with respect to a state of magnets inside magnet pockets 523*a* and 523*b* before combining with another solar panel structure, since a distance between a first magnet 531 and a second magnet 533 is comparatively small, the magnet 531 and the magnet 533 are located in an inward direction within the magnet pocket 523 due to an attractive force.

According to an embodiment of the present disclosure, a radius $R_1$ of the magnets may be 2.8 mm to 3.2 mm, a radius $R_2$ of the magnet pocket 523 may be 2.9 mm to 3.7 mm, and a distance A from an outer wall (an end) of the panel frame 520 in which the magnet pockets 523 are disposed to a center of the first or second magnet 531 or 533 may be 2.8 mm to 3.2 mm.

In an optimal embodiment of the present disclosure, the radius $R_1$ of the magnets may be 3.0 mm, a radius $R_2$ of the magnet pockets 523 may be 3.1 mm to 3.5 mm, and the distance A from an outer wall (an end) of the frame 520 in which the magnet pockets 523 are disposed to a center of the magnet 131 or 133 may be 3.0 mm.

In this case, in a case when the distance A is equal to or longer than the radius $R_1$ at a point where a distance B between the magnet pockets 523*a* and 523*b* adjacent to each other is shortest, when external magnetic force is not present, such an effect that the magnets 531 and 533 may be moved and positioned in an inward direction may be obtained.

Figure 27:
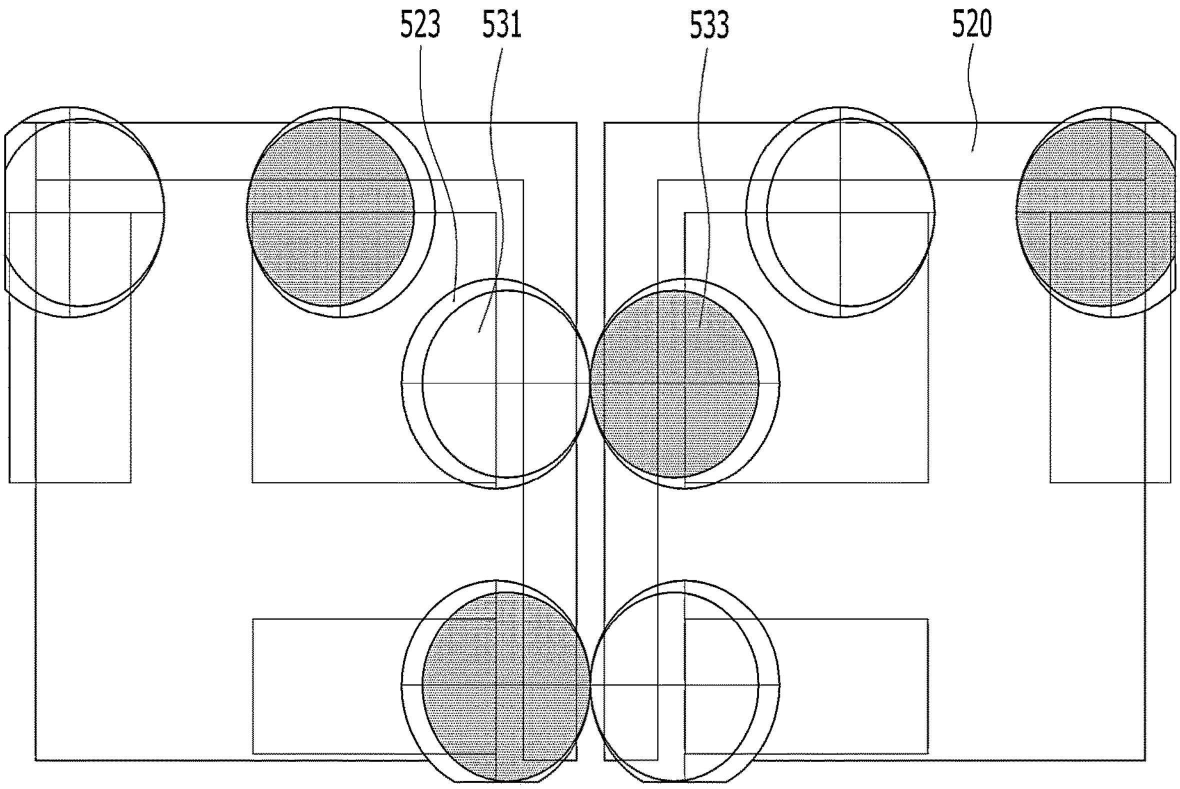
Figure 28:
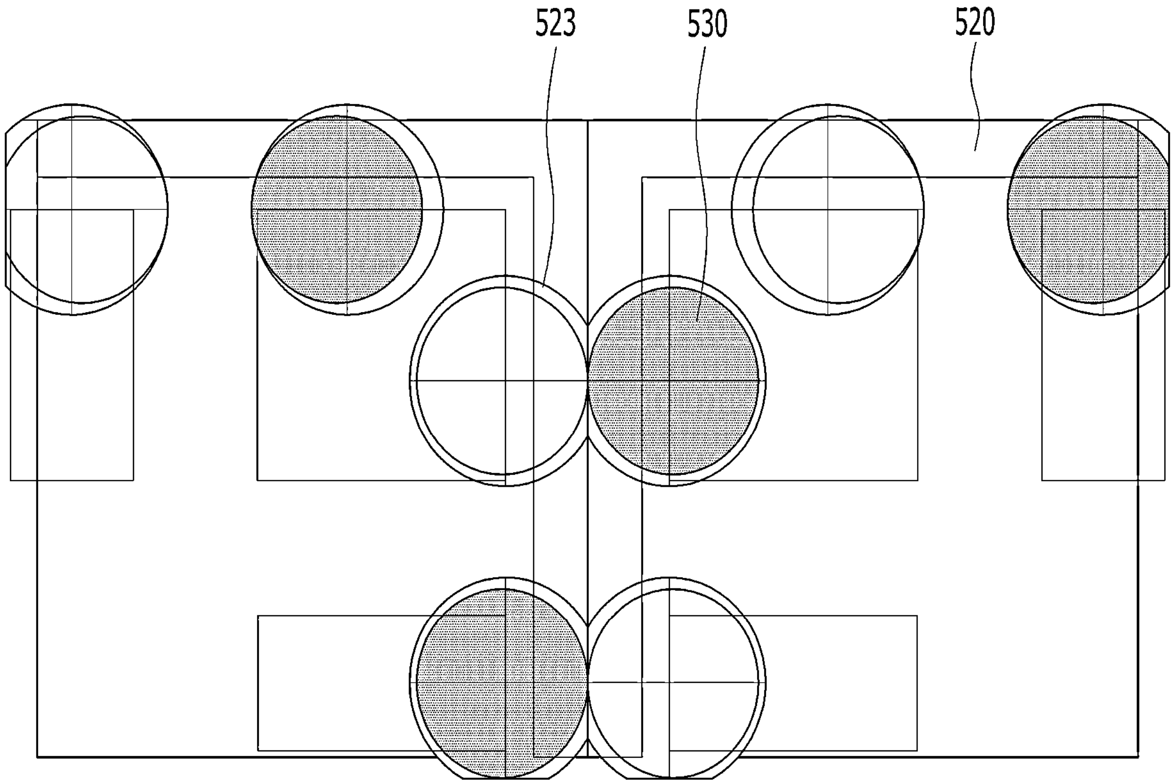

Referring to FIG. 27, as two solar panel structures become adjacent to each other, an attractive force is generated between adjacent magnets. Thus, positions of the magnets 531 and 533 move in an outward direction within the magnet pocket 523. Accordingly, as shown in FIG. 28, panel frames of different solar panel structures come into contact with each other, and thus, the magnets 531 and 533 that have generated an attractive force return to original positions (located in a center) in the magnet pockets 523, respectively, due to relative position movement according to movement of the panel frames 520.

Then, when a combination between the panel frames 520 is released, the magnets 530 inside the magnet pocket 523 will move back in an inner direction of the magnet pockets 523 as illustrated in FIG. 26.

FIG. 29 is a schematic diagram illustrating an electrode surface of a solar panel structure according to various embodiments of the present disclosure.

Electrodes 513 and 515 configured to transmit electric energy generated through solar cell pieces to outside (e.g., a controller or a battery) are disposed on an electrode surface of the solar panel 510. The electrodes 513 and 515 according to an embodiment of the present disclosure may be disposed in an edge portion of the electrode surface.

First electrodes 513 disposed on the electrode surface of the solar panel 510 may be, for example, positive (+) pads (positive electrode pads), and second electrodes 515 may be, for example, negative (−) electrode pads (negative electrode pads).

The first electrodes 513 according to an embodiment of the present disclosure may be connected to first wiring 514, and the second electrodes 515 may be connected to second wiring 516.

Figure 29A:
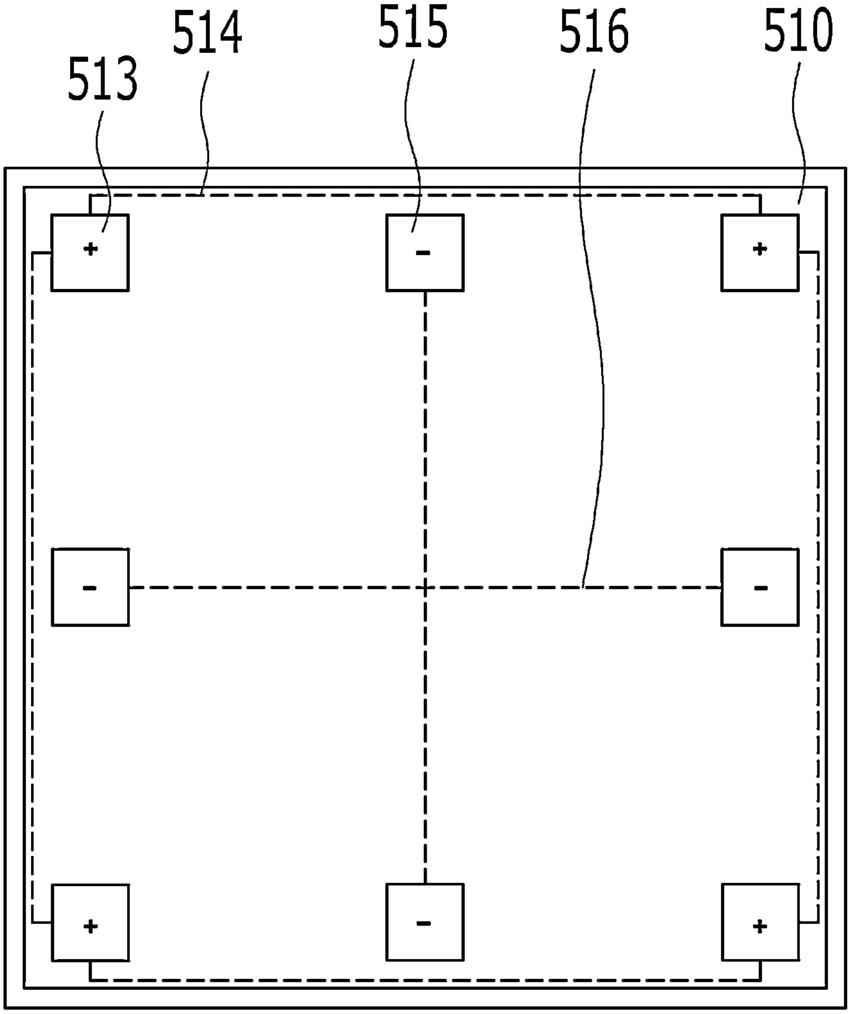

FIG. 29A illustrates an electrode surface according to the first embodiment of the solar panel 510, wherein the first electrodes 513 are located at corners of the solar panel 510, respectively, the second electrodes 515 are located between the first electrodes 513, the first wiring 514 is arranged along an edge of the solar panel 510 to connect the first electrodes 513 with each other, and the second wiring 516 is disposed to cross each other to connect the second electrodes 515 with each other.

Figure 29B:
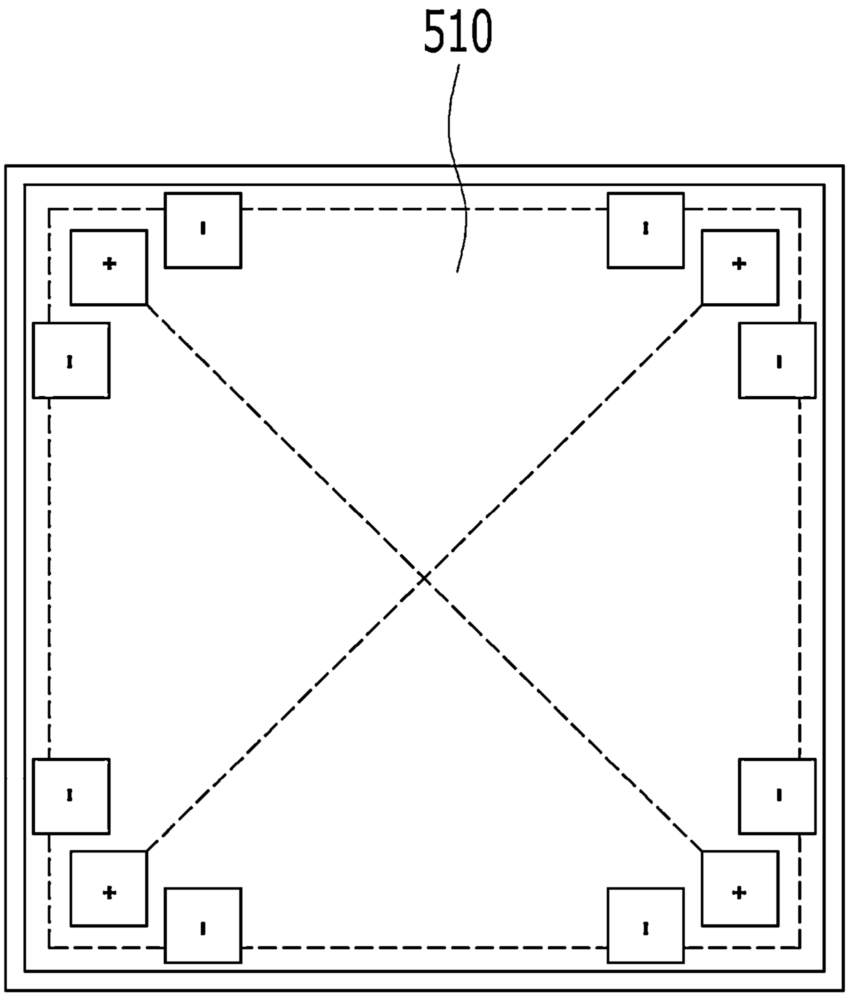

FIG. 29B illustrates an electrode surface according to the second embodiment of the solar panel 510 in the present disclosure, wherein one first electrode 513 and second electrodes 515 at both sides of the one first electrode 513 are arranged at each corner portion of the solar panel 510. In this case, first wiring 514 may be disposed to cross each other in an X shape to connect first electrodes 513 with each other, and second wiring 516 may be arranged along an edge of the solar panel 510 to connect second electrodes 515 with each other. In this second embodiment, positions of the first electrode 513 and the second electrode 515 may be reversed. Likewise, the first wiring 514 and the second wiring 516 may be implemented in a reversed form.

Figure 29C:
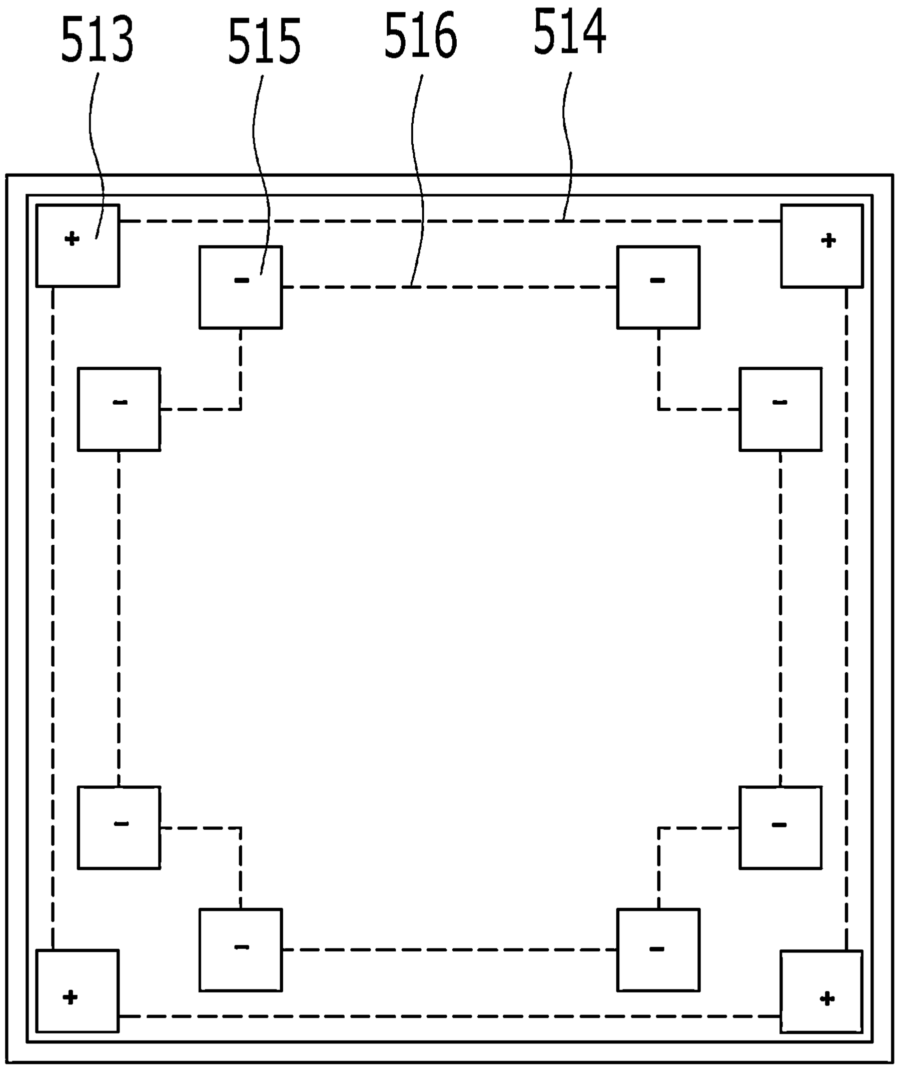

FIG. 29C illustrates an electrode surface according to the third embodiment of the solar panel 510 in the present disclosure, wherein one first electrode 513 and two second electrodes 515 further inwardly disposed compared to the one first electrode 513 are arranged at each corner portion of the solar panel 510. First wiring 514 may be arranged along an edge of the solar panel 510 to connect first electrodes 513 with each other, and second wiring 516 may be arranged along an edge of the solar panel 510 further inwardly compared to the first wiring 514 to connect second electrodes 515 with each other. In this third embodiment, a position of the first electrode 513 and a position the second electrode 515 may be reversed. Likewise, the first wiring 514 and the second wiring 516 may be implemented in a reversed form.

The conductor pad 550 according to an embodiment of the present disclosure is disposed between an electrode surface of the solar panel 510 and the panel frame 520, and connects the electrodes 513 and 515 to the magnet 530. The conductor pad 550 according to the present embodiment may be implemented as, for example, a nickel strip.

The conductor pad 550 according to the present disclosure may include a first conductor pad 551 in contact with a first electrode 513, and a second conductor pad 553 in contact with a second electrode 515. The first conductor pad 551 and the second conductor pad 553 are spaced apart from each other to be provided in a separate form.

Figure 30:
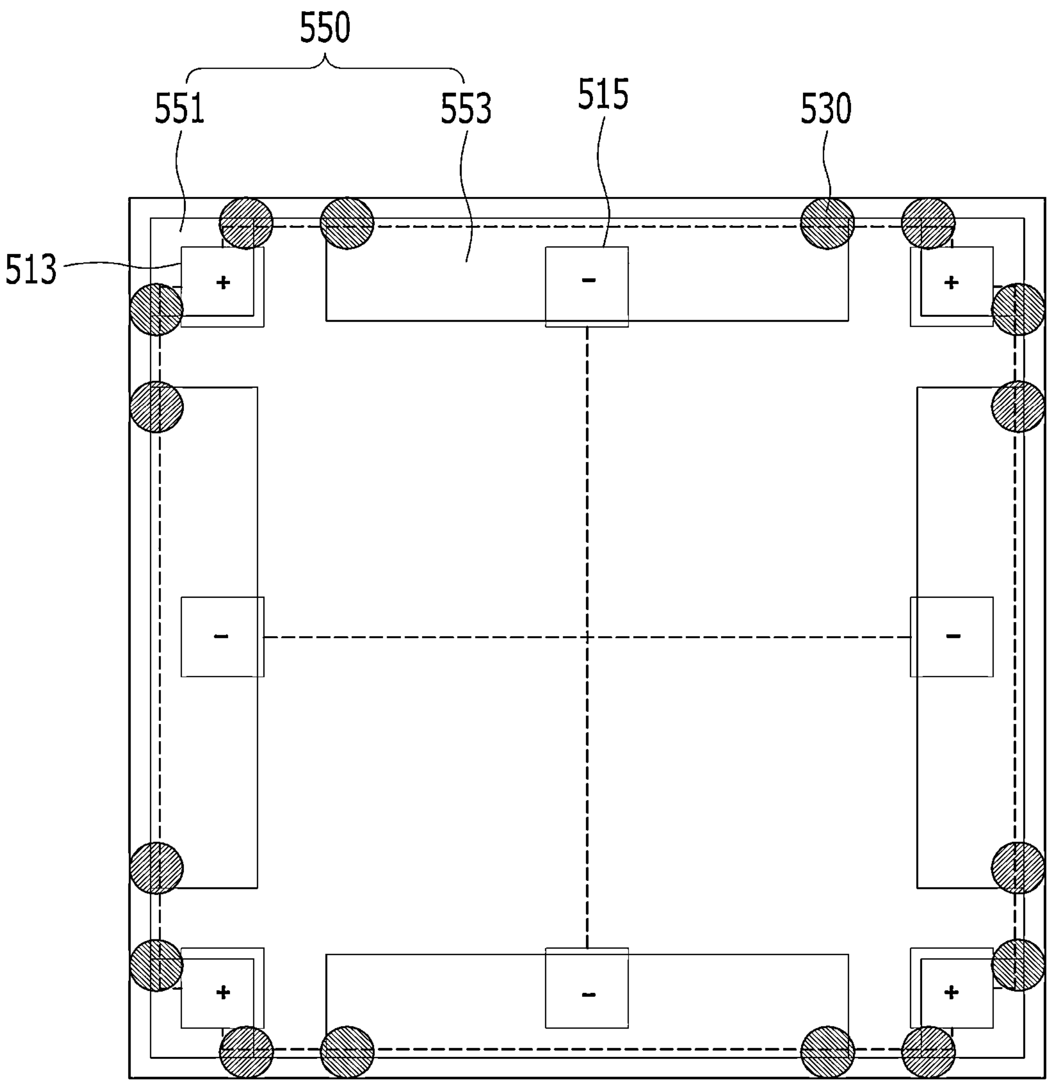

FIGS. 30 to 32 are diagrams illustrating an arrangement form of an electrode surface and conductor pads of a solar panel according to various embodiments of the present disclosure. Referring to FIGS. 30 to 32, the conductor pad 550 in the present disclosure may be configured to have a square shape with a small length or a rectangular shape with a comparatively great length. FIG. 30 is a diagram illustrating an example of the electrode surface as shown in FIG. 29A and a form of the conductor pad 550 disposed between the solar panel 510 and the panel frame 520.

FIG. 31 is a diagram illustrating an example of the electrode surface as shown in FIG. 29B and a form of the conductor pad 550 disposed between the solar panel 510 and the panel frame 520.

Figure 31A:
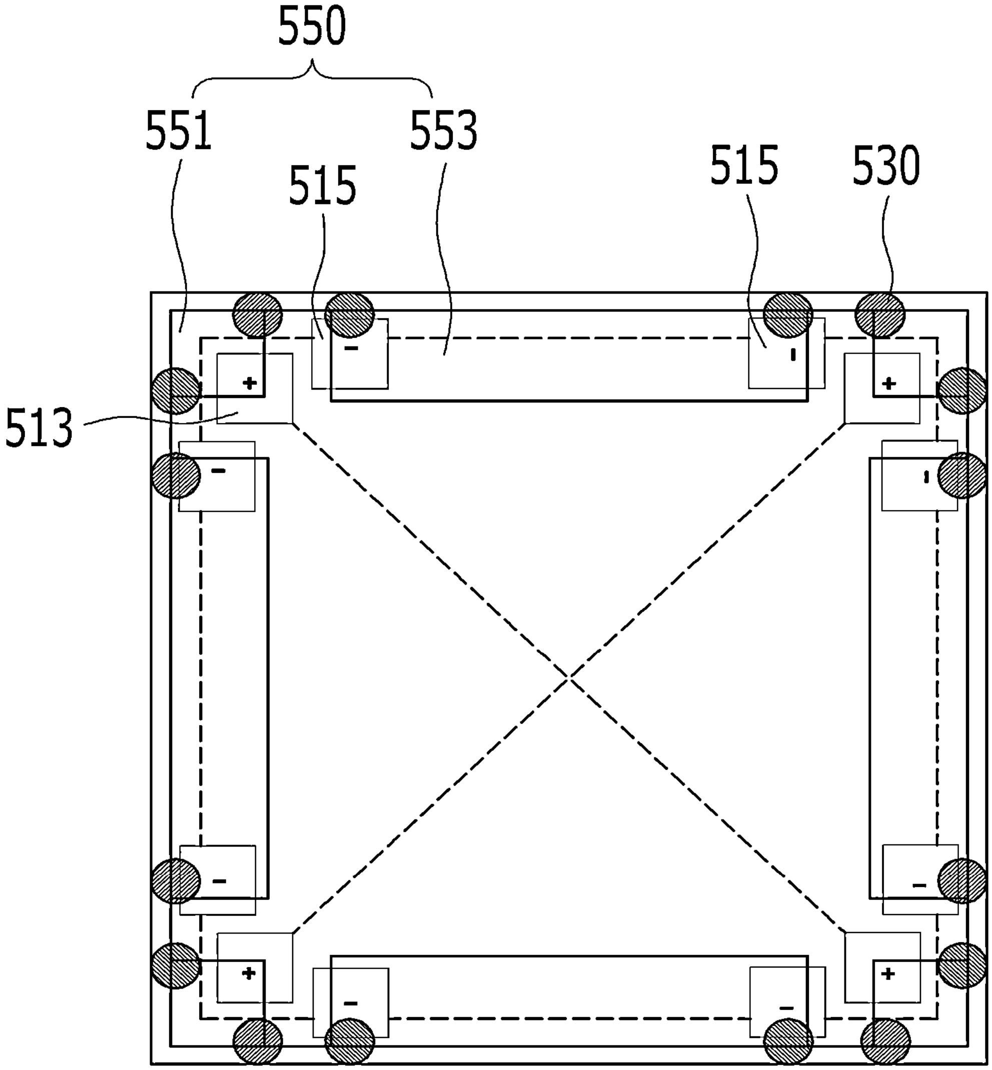

According to an embodiment shown in FIG. 31A, the first electrode 531 positioned at each corner may be provided with the first conductor pad 551 having a small length, and the second conductor pad 553 having a great length and in both contact with second electrodes 515 at different corner portions.

Figure 31B:
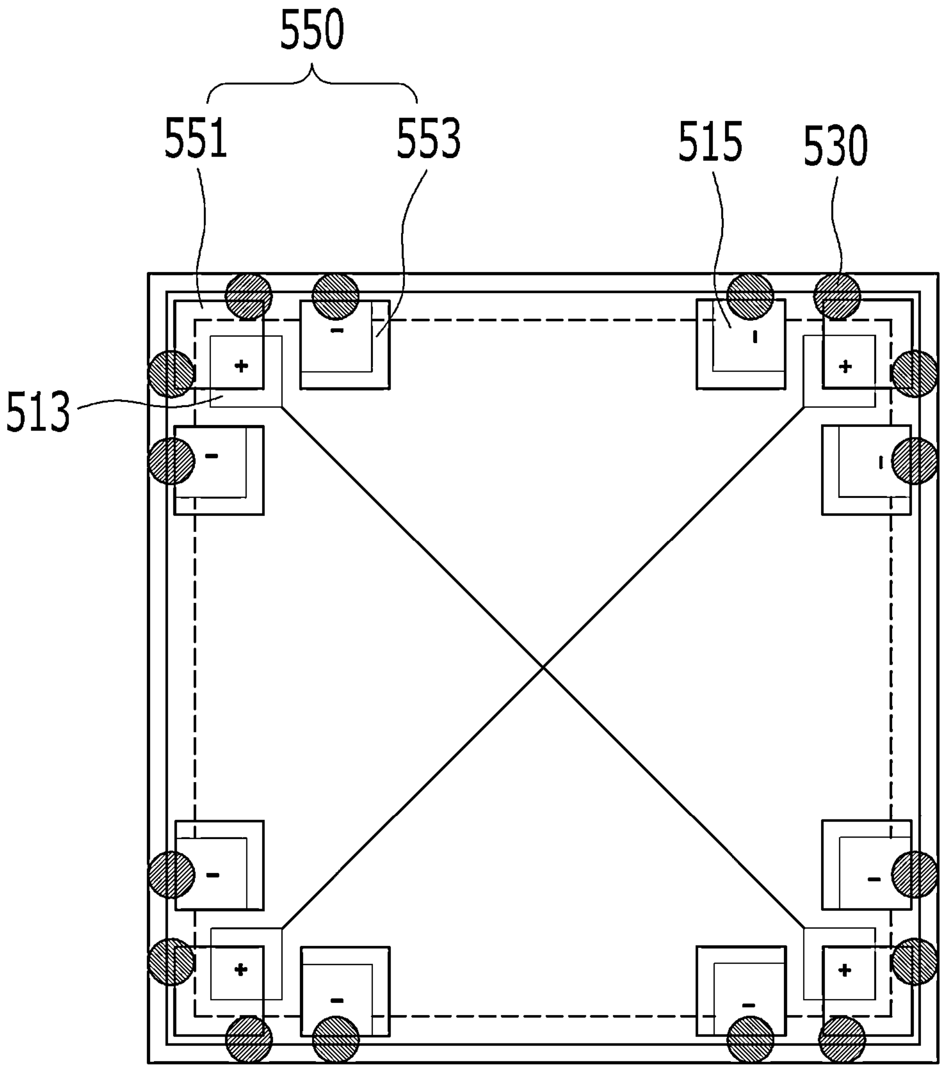

As another embodiment, referring to FIG. 31B, the second conductor pads 553 may be also provided to have a small length to be in contact with second electrodes 515, respectively.

FIG. 32 is a diagram illustrating an example of the electrode surface as shown in FIG. 29C and a form of the conductor pad 550 disposed between the solar panel 510 and the panel frame 520.

Figure 32A:
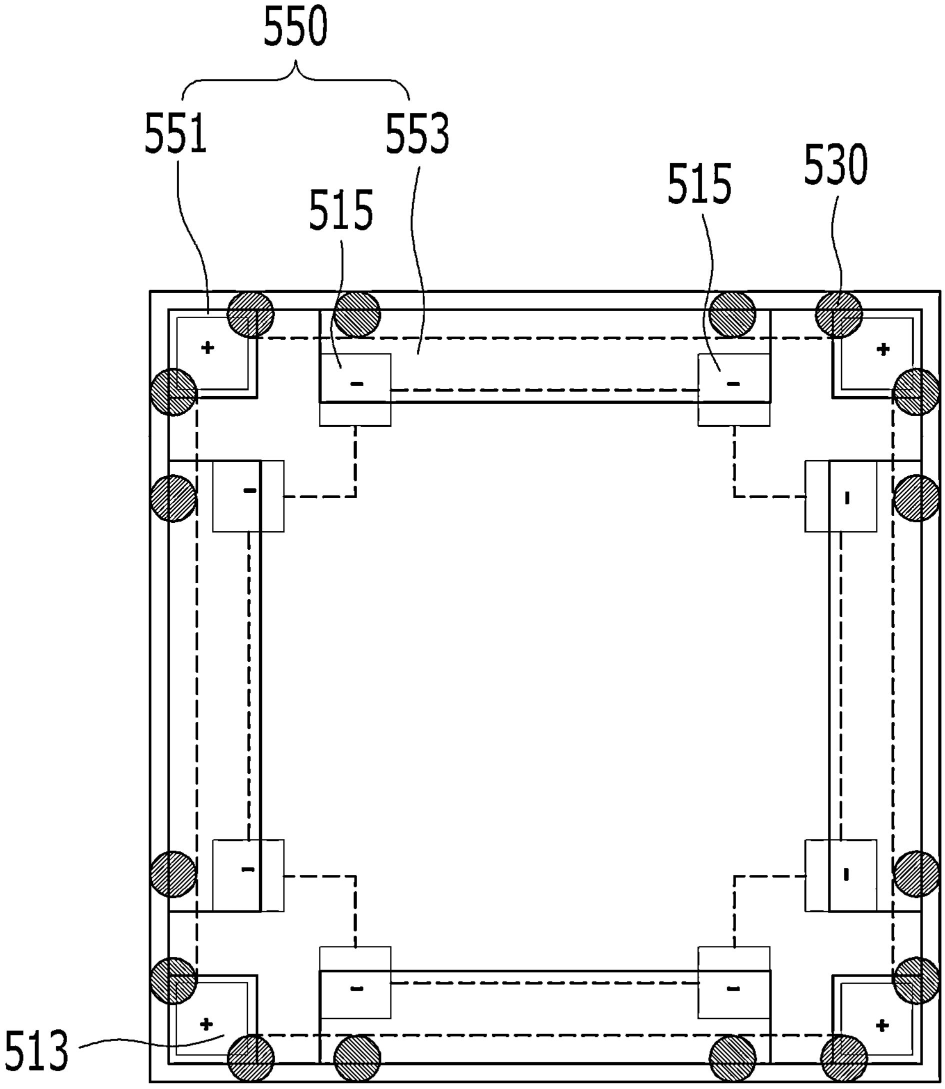

According to the embodiment shown in FIG. 32A, the first electrode 513 positioned at each corner may be provided with the first conductor pad 551 having a small length, and the second conductor pad 553 having a great length and in contact with both second electrodes 515 disposed at different corner portions.

Figure 32B:
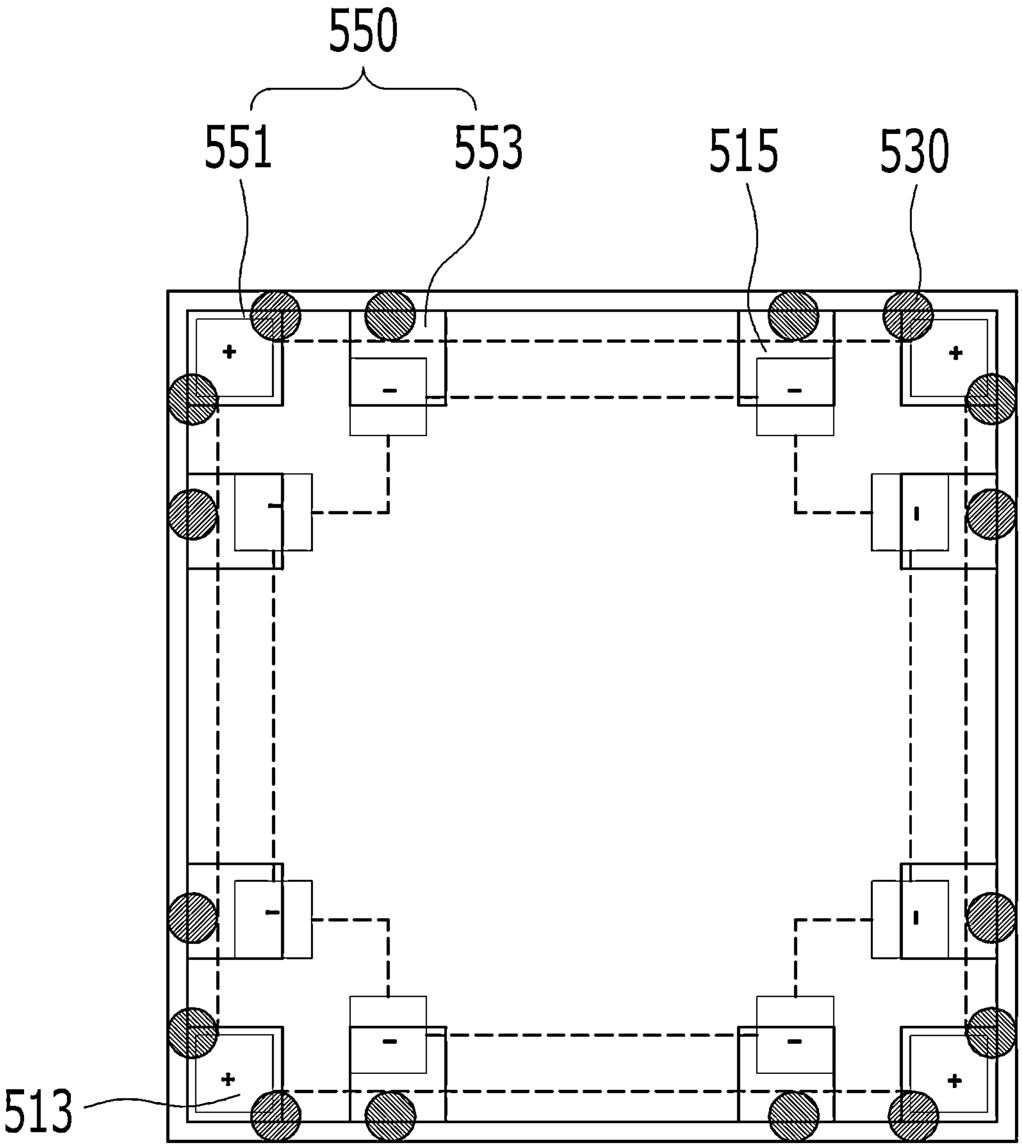

As another embodiment, referring to FIG. 32B, the second conductor pads 553 may be provided to have a small length to be in contact with the second electrodes 515, respectively.

According to another embodiment of the present disclosure, the solar panel structure 500 may be configured to further include an assembly block, although not separately shown in the drawing.

The assembly block (not shown) in the present disclosure may be inserted and coupled into the pattern grooves 525 to be capable of being coupled into or separated from the pattern grooves 525 in the panel frame 520. The assembly block in the present disclosure is fastened with the panel frame 520 by being inserted to be fit into the pattern grooves 525 in a rear surface of the panel frame 520. For example, the assembly block in the present disclosure may be implemented as a Lego block.

In addition, the pattern grooves 525 in the present disclosure may be configured to have a circular shape or a quadrilateral shape. Grooves disposed in a protruding shape on the assembly block are implemented in a shape symmetrical to a shape of the pattern grooves 525.

A part of the assembly block (not shown) may be coupled into a pattern groove in a panel frame of one solar panel structure, and another part (a remaining part) thereof may be coupled into a pattern groove in a panel frame of another solar panel structure to thereby connect different solar panel structures to each other.

In addition, the solar panel structure according to an embodiment of the present disclosure may be configured to further include the controller 600.

Figure 33:
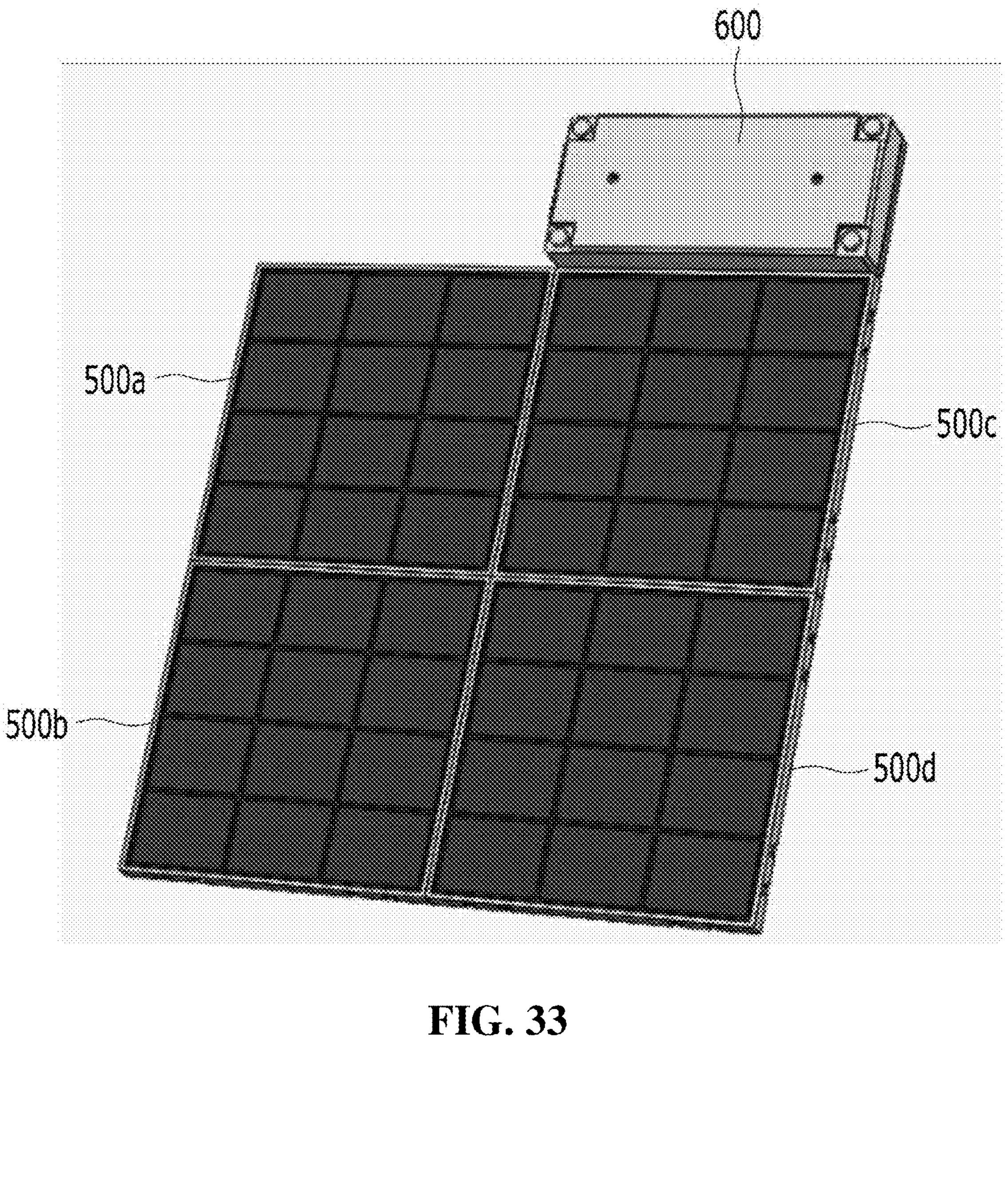
Figure 34A:
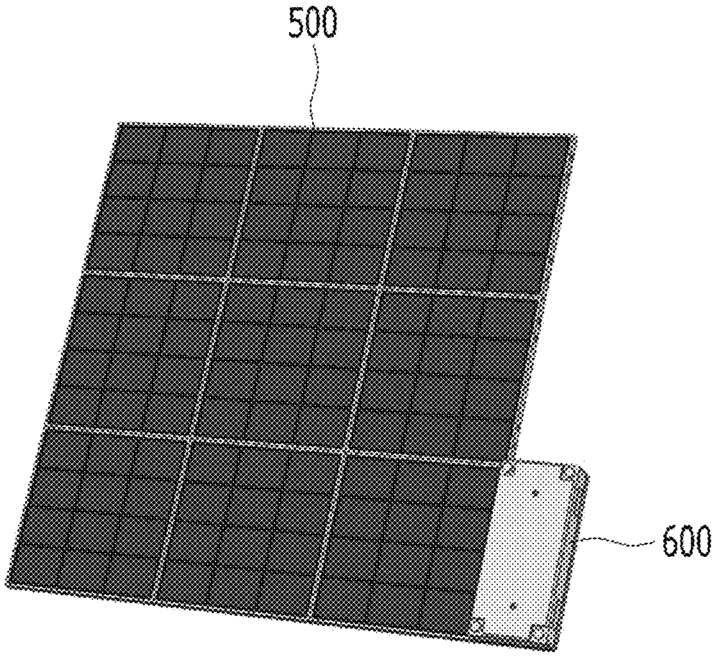
Figure 34B:
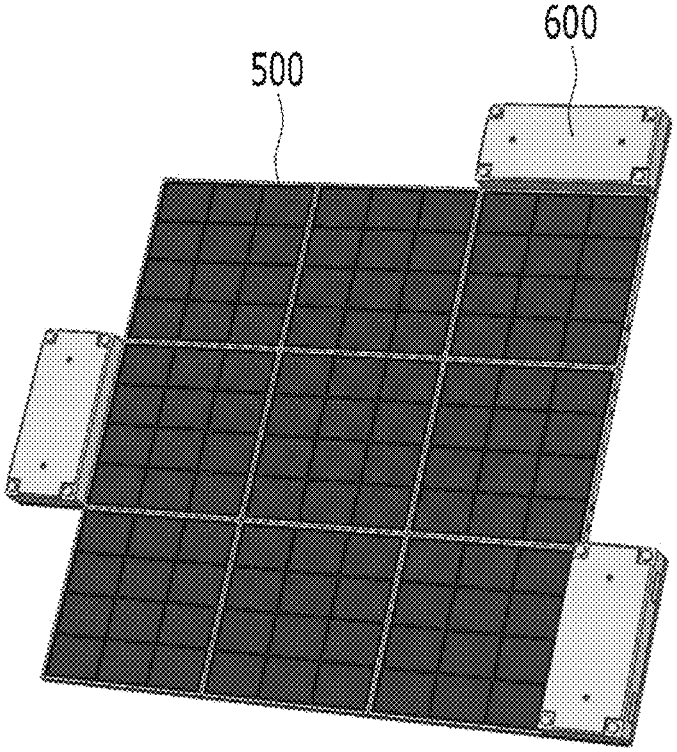
Figure 35:
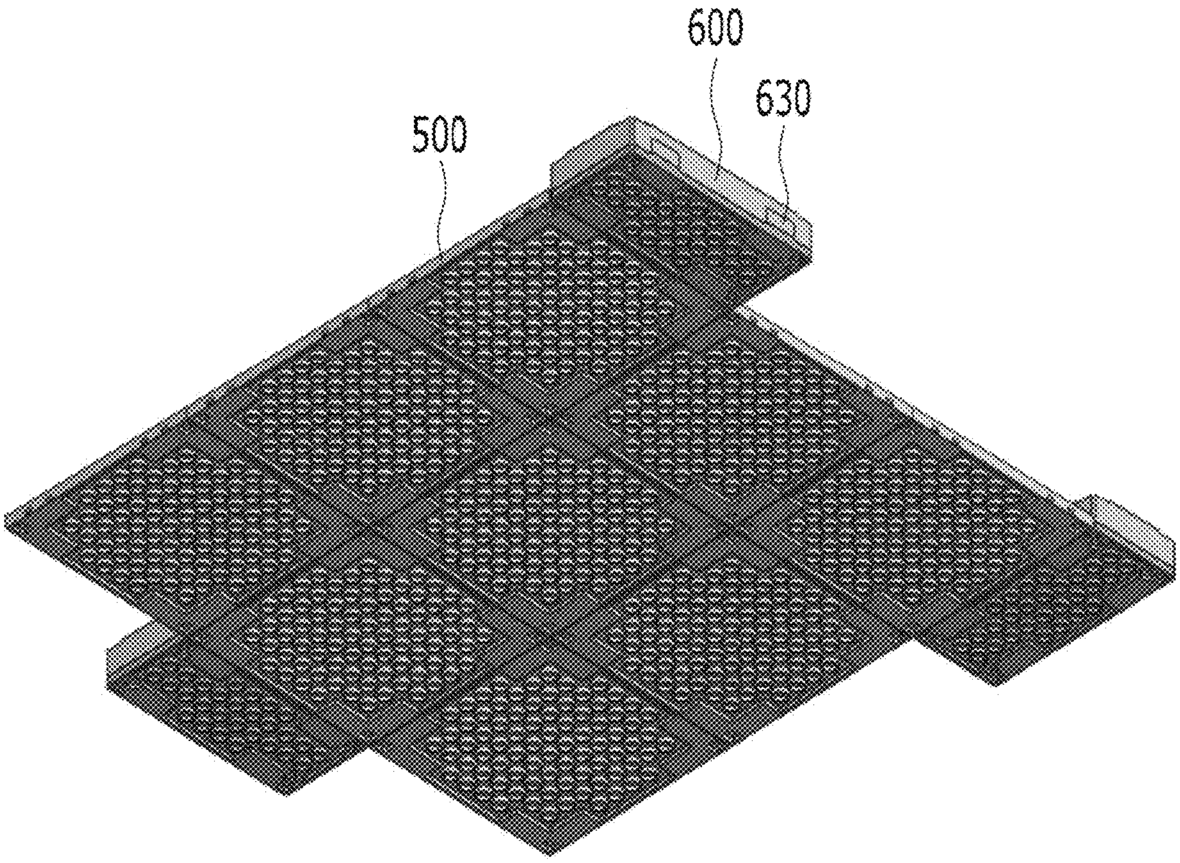

FIGS. 33 to 35 are diagrams illustrating a solar panel assembly combined with a controller according to an embodiment of the present disclosure.

A controller 200 in the present disclosure is a device configured to supply electric energy generated from a solar panel to an external charging device (for example, a secondary battery), and may function as a direct current (DC)/DC converter.

On one side surface of the controller 600, a controller magnet configured to perform electrical and mechanical connections with the magnets 530 on a side surface of the panel frame 520 is arranged. On another side surface of the controller 600, a connection terminal 630 configured to supply electric energy to an external charging device may be arranged.

A controller electrode (not shown) is provided to be exposed to outside through an exposure groove disposed in one side surface of a frame of the controller. The exposed controller electrode may be in contact with the magnets 530 provided in the electrode pockets 523 to thereby receive electric energy produced from the solar panel 510. Accordingly, the controller electrode may supply the received electric energy to an external charging device connected through the connection terminal 630.

The controller 600 in the present disclosure may not fixedly positioned at a particular location, i.e., on one side or a rear surface of a particular solar panel structure, but may be positioned selectively (non-fixed type) on one side of at least one solar panel structure in a solar panel assembly in which a plurality of solar panel structures (solar panels) are connected in parallel to each other to receive electric energy, as shown in FIGS. 33 to 35.

In addition, the controller 600 in the present disclosure may be individually attached, together with other controllers, to a solar panel assembly in which a plurality of solar panel structures are connected in parallel, as shown in FIGS. 34 and 35, to thereby receive electric energy from respective adjacent solar panel structure. That is, the solar panel assembly may be multi-connected to a plurality of controllers.

FIG. 36 is a schematic diagram illustrating a non-fixed and multi-connected type controller according to an embodiment of the present disclosure. The controller in the present disclosure is a device configured to supply electric energy generated from a solar panel to an external charging device (for example, a secondary battery), and may function as a DC/DC converter.

Referring to FIG. 36, the controller in the present disclosure may be configured to include a frame 710, a plurality of controller electrodes 730, a connection terminal 750, a display unit 770, and a controller magnet (not shown).

A plurality of exposure grooves exposing the plurality of controller electrodes 730 to outside may be disposed in a side surface of the frame 710.

The controller electrodes 730 may be arranged in a form exposed to outside through exposure grooves spaced apart from each other by a predetermined distance in a lower end of one side surface of the frame 710 to thereby receive electric energy produced from the solar panel.

According to the present embodiment, the controller electrode 730 may receive electric energy produced from a solar panel by coming into contact with a solar panel electrode in a solar panel structure, and may supply the received electric energy to an external charging device connected through the connection terminal 750.

Figure 36A:
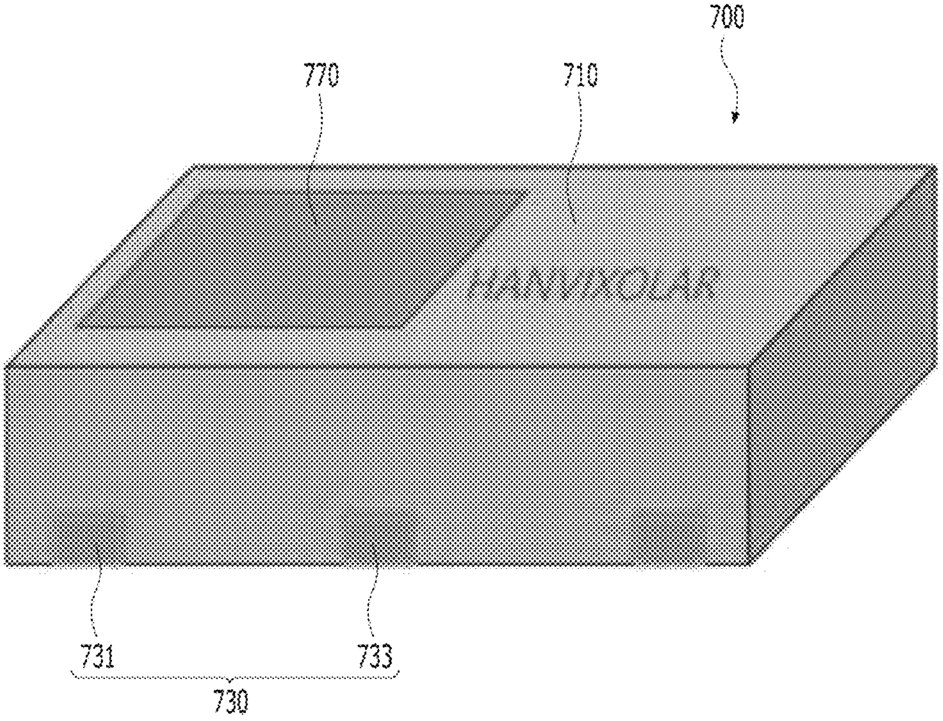
FIGS. 36A to 41 are diagrams related to a controller according to an embodiment of the present disclosure.

At this time, the controller electrode 730 in the present disclosure may have first controller electrodes 731 and second controller electrodes 733 having different polarities and alternately arranged, as shown in FIG. 36A. For example, in the present embodiment, the first controller electrodes 731 may be positive electrodes and the second controller electrodes 733 may be negative electrodes.

According to one embodiment, the first controller electrodes 731 may be disposed at both end portions of one side surface of the frame 710, and the second controller electrodes 733 may be disposed between the first controller electrodes 731 disposed at the both end portions.

In addition, a distance by which the controller electrodes 730 in the present disclosure are spaced apart from each other may be preferably correspond to an arrangement distance between solar panel electrodes disposed on an outer surface of the solar panel. Accordingly, when the controller 700 is located on one side of the solar panel structure 300, the controller electrode 730 may come into contact with the solar panel electrodes 330 to receive electric energy.

Figure 36B:
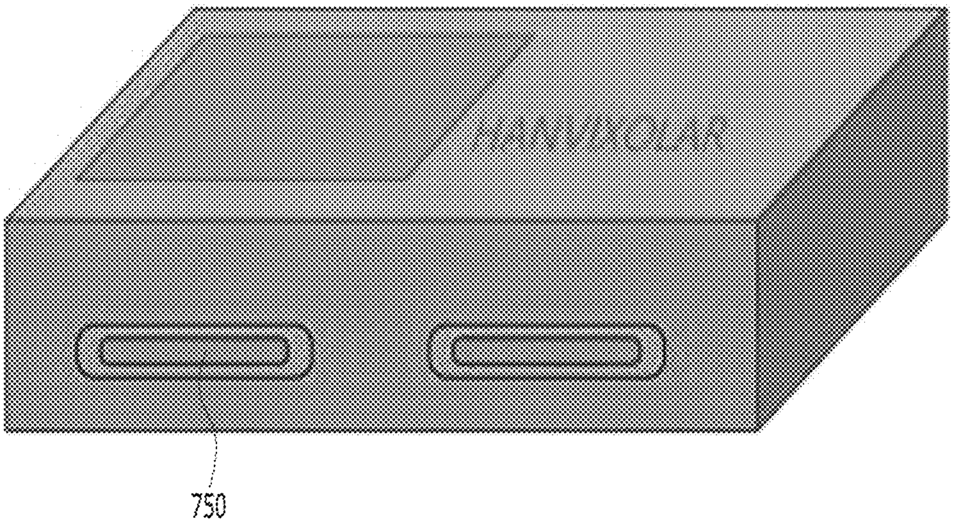

Referring to FIG. 36B, the connection terminal 750 may be disposed on another side surface of the frame 710 to supply electric energy to an external charging device. At least one connection terminal 750 may be disposed on the another side of the frame 710, and for example, the connection terminal may be implemented as a universal serial bus (USB) connection terminal.

The display unit 770 may be disposed on an upper surface of the frame 710 and may display, on a screen, a voltage measurement value or a power measurement value of electric energy received from the solar panel.

According to one embodiment of the present disclosure, the controller 700 may be configured to further include a communication unit (not shown), and transmit a power value measured through the communication unit to an external smart device (a user terminal) to provide the power value to a user so that the user may check the power value of electric energy produced by the solar panel.

A plurality of controller magnets (not shown) in the present disclosure may be provided in a corner portion of the frame 710 to be attached to one side of the solar panel structure 300.

The controller magnet according to the present embodiment may include a first controller magnet and a second controller magnet having different polarities, and one first controller magnet and one second controller magnet may be arranged in one same corner portion of the frame 710.

As an example, the first control magnet may have an N pole, and the second magnet may have an S pole. As such, the controller magnet may enhance a combination with a solar panel structure located on one side and induce an alignment state to facilitate a contact between the controller electrode 330 and the solar panel electrode 330.

Figure 37:
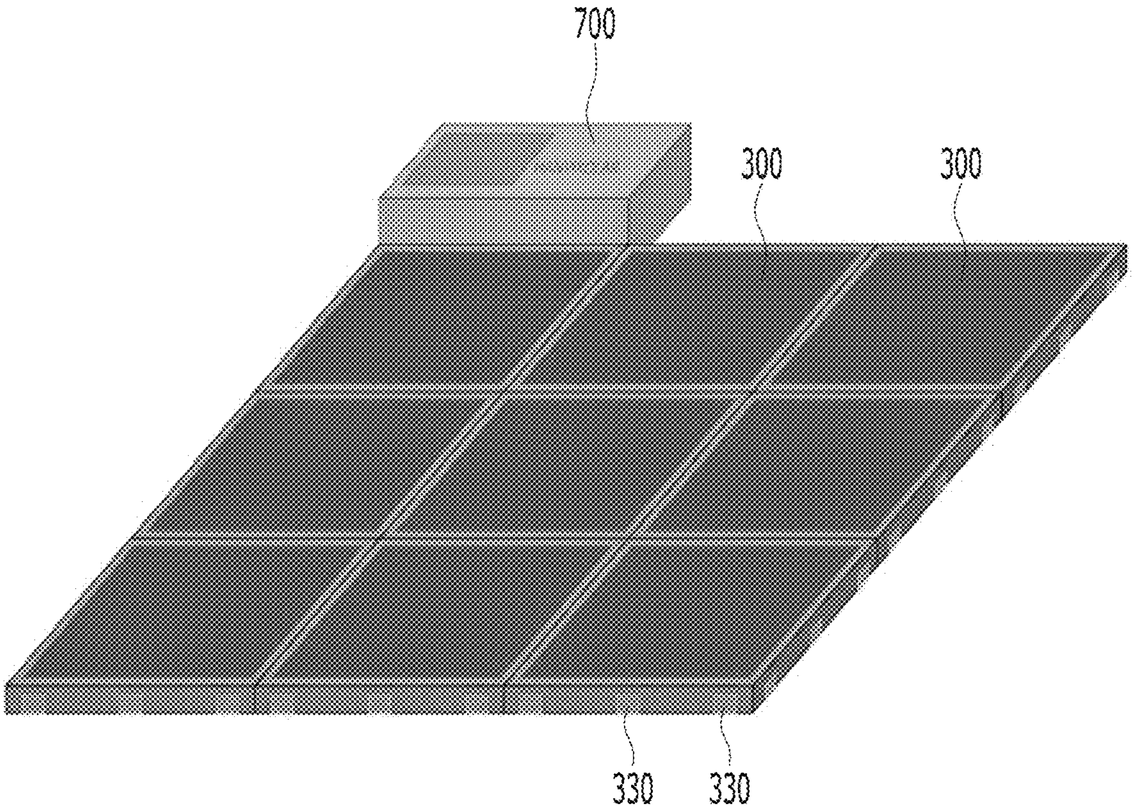

FIG. 37 is a diagram illustrating a solar panel assembly in which the controller 700 is connected to solar panel structures 300 in parallel according to one embodiment of the present disclosure.

The controller 700 in the present disclosure may not fixedly positioned at a particular location, i.e., on one side or a rear surface of a particular solar panel structure, but may be positioned selectively on one side of at least one solar panel structure in a solar panel assembly in which a plurality of solar panel structures (solar panels) are connected in parallel to each other to receive electric energy, as shown in FIG. 37.

Figure 38:
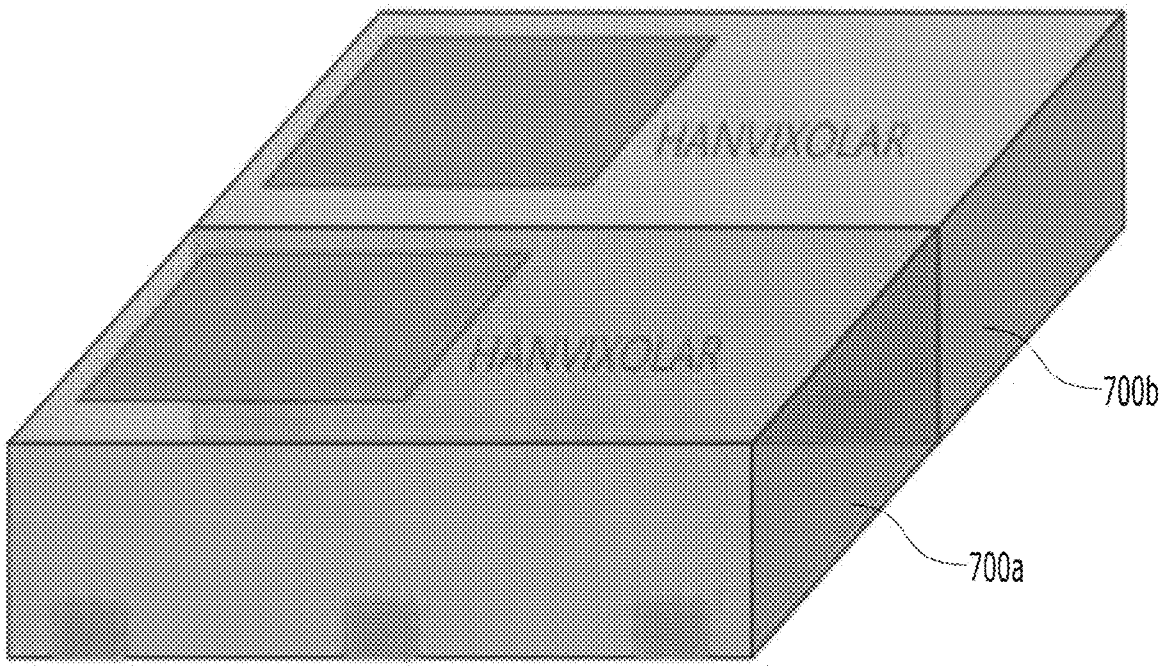

FIG. 38 is a diagram illustrating a plurality of controllers connected to each other according to one embodiment of the present disclosure.

With respect to the controllers in the present disclosure, a plurality of controllers 700*a* and 700*b* may receive electric energy from a solar panel structure in a state of being connected to each other, as illustrated in FIG. 38. At this time, the plurality of controllers 700*a* and 700*b* may be coupled and connected to each other through controller magnets.

Figure 39A:
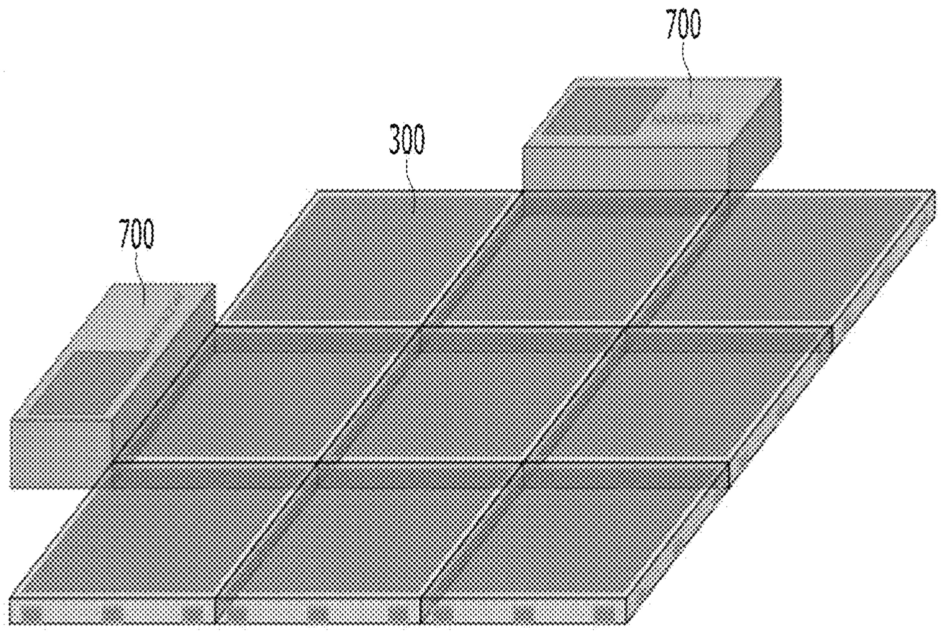
Figure 39B:
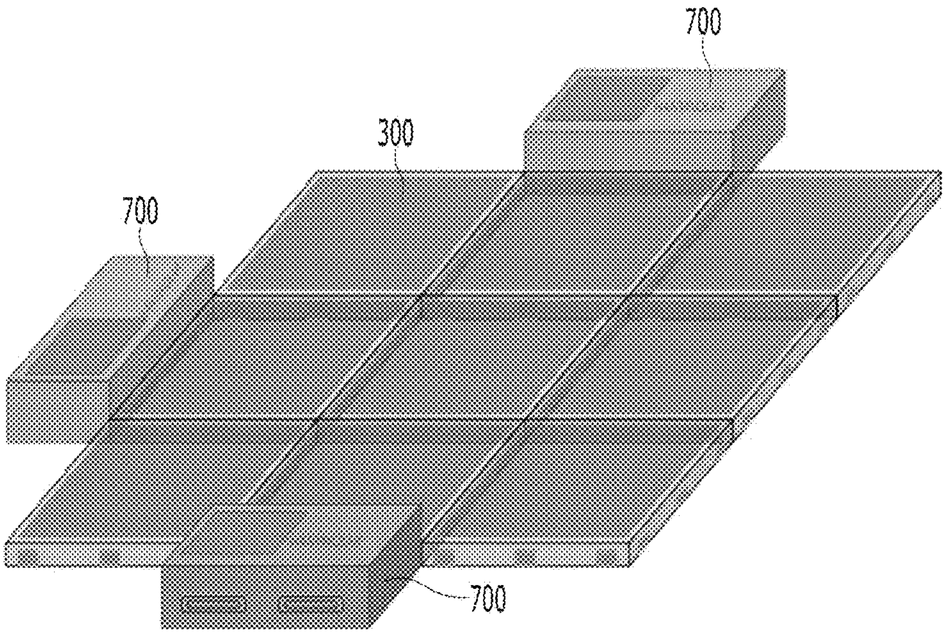
Figure 40A:
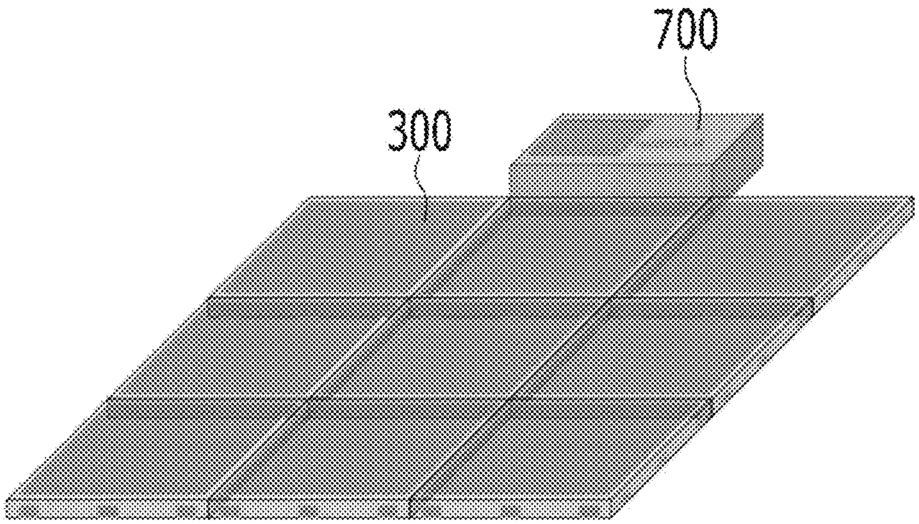
Figure 40B:
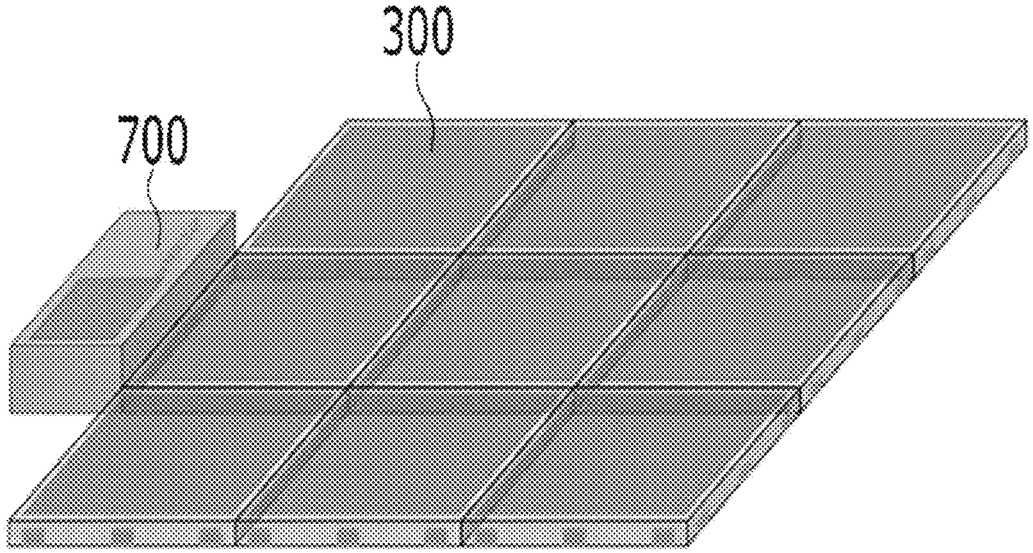
Figure 40C:
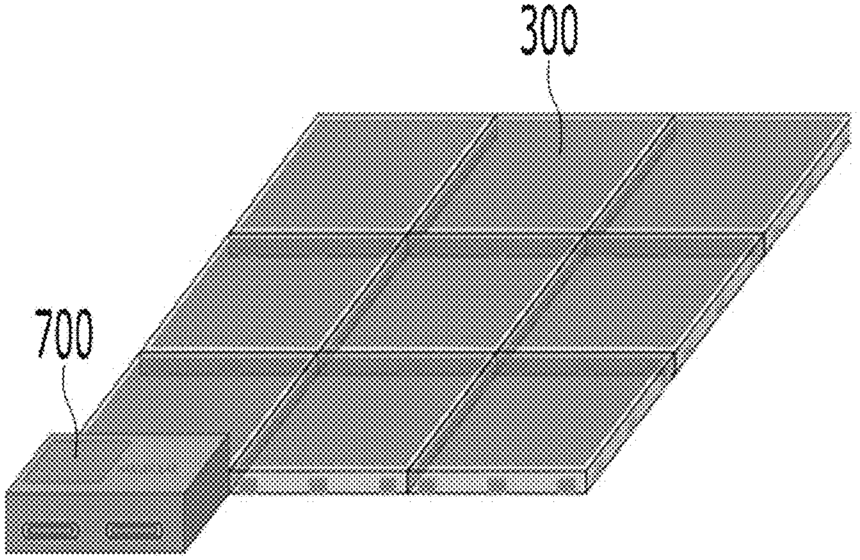
Figure 40D:
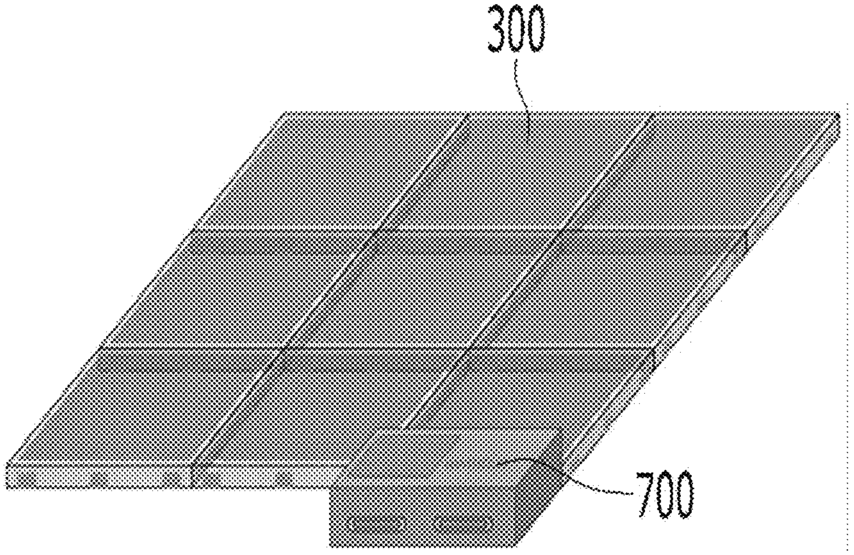

FIG. 39 is a schematic diagram illustrating controllers multi-connected to a solar panel assembly according to another embodiment of the present disclosure.

As shown in FIG. 39, the controller 700 in the present disclosure may be individually attached, together with other controllers, to a solar panel assembly in which a plurality of solar panel structures are connected in parallel to each other to thereby receive electric energy from respective adjacent solar panel structure. That is, a solar panel assembly may be multi-connected to a plurality of controllers.

A solar power generation system according to an embodiment of the present disclosure is configured to include the controller 700 and the solar panel structure 300 as described above.

Figure 41:
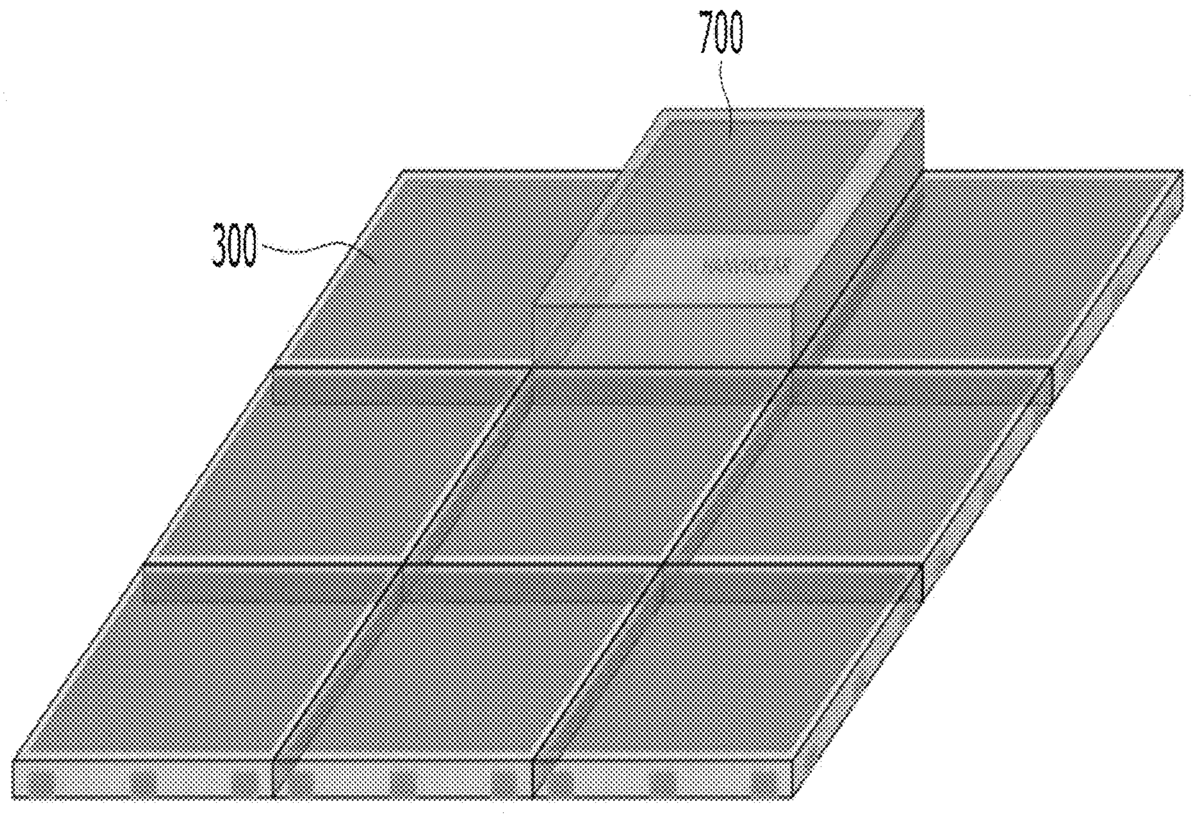

FIGS. 40 and 41 are diagrams illustrating connection of a solar panel structure assembly to a controller according to another embodiment of the present disclosure.

The controller 700 in the present disclosure may be positioned non-fixedly and selectively on one side of one solar panel structure 300 among solar panel structures connected in parallel to each other to receive electric energy, as illustrated in FIG. 40.

In addition, referring to FIG. 41, a solar panel assembly according to an embodiment of the present disclosure may be implemented to have a hollow area between solar panel structures 300 connected in parallel to each other, and the controller 700 may be located in the hollow area to receive electric energy from an adjacent solar panel structure 300.

FIGS. 40 and 41 illustrate an example in which a height (a thickness) of the frame 710 of the controller 700 is greater than a height of the solar panel structures 300. However, the present disclosure is not limited thereto, and a height of the frame 710 of the controller 700 in the present disclosure may be implemented to be identical to a height of the solar panel structures 300. That is, the controller 700 in the present disclosure only needs to be configured such that a height of the controller electrode 730 matches a height of the controller electrodes 730 to be connected to each other. Thus, there is no particular limit in a height implemented in the controller 700.

The above description has been made with reference to the embodiments, but it is merely illustrative. It will be apparent that other changes and applications can be made by those skilled in the art to which the present disclosure belong without departing from substantial features of the embodiments of the present disclosure. Therefore, the above-described embodiments should be considered in a descriptive sense only and not for purposes of limitation. For example, each component described in singular form may be executed in a distributed form. Likewise, components described in a distributed form may be executed in a combined form.

The scope of the present disclosure is to be basically determined by the scope defined by the appended claims, but not only the configurations derived from the claims, but also all changes or variations within the scope of the claims and their equivalents are to be construed as being included in the present disclosure.

What is claimed is:

1. A solar panel assembly comprising:

a solar panel comprising a plurality of solar cell pieces;

a panel frame configured to cover a portion of the solar panel other than a light-receiving surface of the solar panel, the light-receiving surface being configured to receive sunlight;

magnets located in an edge portion of the solar panel to be combined with another solar panel;

a plurality of electrodes arranged in an edge portion of an electrode surface of the solar panel and located between the solar panel and the magnets; and conductor pads arranged in the edge portion of the solar panel to be spaced apart from each other by a certain distance and being in contact with the plurality of electrodes.

2. The solar panel assembly of claim 1, wherein pattern grooves are disposed in a rear surface of the panel frame, the rear surface covering the electrode surface of the solar panel, and the solar panel assembly further comprises an assembly block capable of being separated from or coupled into the pattern grooves.

3. The solar panel assembly of claim 2, wherein the assembly block comprises a plurality of protruding convex portions disposed on one surface, the assembly block connects different solar panel assemblies with each other by inserting and coupling some of the plurality of protruding convex portions into concave grooves in the panel frame, and inserting and coupling others of the plurality of protruding convex portions into pattern grooves in a rear surface of a panel frame of another solar panel assembly, and the pattern grooves are disposed at a predetermined interval in an area of the rear surface of the panel frame other than an area in which the plurality of electrodes are disposed, among a whole area of the rear surface of the panel frame.

4. The solar panel assembly of claim 1, wherein the plurality of electrodes comprise first electrodes and second electrodes having different polarities, arranged alternately with each other, and disposed in a same corner portion of the solar panel, and the magnets comprise a first magnet and a second magnet provided on one surfaces of the first electrodes in contact with a conductor pad disposed in the same corner portion of the solar panel, respectively, to be thereby arranged in the same corner portion of the solar panel.

5. The solar panel assembly of claim 1, wherein a plurality of exposure grooves exposing the plurality of electrodes arranged in the edge portion of the solar panel to outside are comprised in a side surface of the solar panel.

6. The solar panel assembly of claim 1, wherein the panel frame comprises:

magnet pockets disposed in a side surface to have the magnets arranged therein; and exposure grooves disposed in a side surface to be open so that the magnets are exposed to outside and combined with another solar panel, and the magnet pockets are configured to have a circular shape in an inward direction of the panel frame to correspond to a shape of the magnets and a flat shape with respect to a side surface of the panel frame, and inner spaces of the magnet pockets in which the magnets are arranged are configured to have a larger size than a size of the magnets to cause positions of the magnets to move depending on whether the magnets are combined with another solar panel.

7. The solar panel assembly of claim 6, wherein the magnets arranged in the magnetic pocket are each configured to:

when combined with the another solar panel, move within the magnet pockets in an outward direction due to an attractive force generated with a magnet in the another solar panel; and when the combination with the another solar panel is released, move within the magnet pockets in an inward direction due to an attractive force generated with a magnet within another magnet pocket disposed on one side.

8. The solar panel assembly of claim 7, wherein the conductor pads are nickel strips arranged between the electrode surface of the solar panel and the panel frame to connect the plurality of electrodes to the magnets, the magnets, when combined with another solar panel, has one portion protruding toward outside of the panel frame, and when the combination with the another solar panel is released, moves in an inward direction of the panel frame, and adjacent magnets arranged in the edge portion of the panel frame are arranged alternately so that respective contact surfaces in contact with the conductor pads have different polarities.

9. The solar panel assembly of claim 1, wherein the plurality of electrodes comprise first electrodes and second electrodes having different polarities, and at least one first electrode and at least one second electrode are arranged on each edge portion of the electrode surface of the solar panel.

10. The solar panel assembly of claim 9, wherein the first electrodes are arranged at corners of the electrode surface of the solar panel, respectively, and the second electrodes are arranged between the first electrodes arranged at the corners.

11. The solar panel assembly of claim 9, wherein the conductor pads are disposed in positions corresponding to positions of the first electrodes arranged on the electrode surface of the solar panel and positions of the second electrodes, respectively, to be spaced apart from each other such that conductor pads in contact with the first electrodes are separated from conductor pads in contact with the second electrodes.

12. The solar panel assembly of claim 1, further comprising a controller coupled to one side of the panel frame to supply electric energy generated from the solar panel to an external charging device, wherein a controller magnet configured to perform electrical coupling and structural coupling to magnets arranged on a side surface of the panel frame is arranged on one side of the controller, and a connection terminal configured to supply electric energy to the external charging device is disposed on another side of the controller.

13. The solar panel assembly of claim 12, wherein the controller further comprises a display unit disposed on an upper surface and configured to display a voltage measurement value or a power measurement value with respect to electric energy transmitted from the solar panel.

14. The solar panel assembly of claim 12, wherein the controller is a non-fixed type controller positioned selectively on one side of at least one solar panel structure in a solar panel assembly in which a plurality of solar panel structure are arranged by being connected in parallel to each other, to be capable of receiving electric energy, and a multi-connected type controller disposed one side of the solar panel assembly together with another controller, to be capable of receiving electric energy.

* * * * *